US012497428B2

(12) United States Patent
Zetterberg et al.

(10) Patent No.: US 12,497,428 B2
(45) Date of Patent: *Dec. 16, 2025

(54) GALACTOSIDE INHIBITOR OF GALECTINS

(71) Applicant: GALECTO BIOTECH AB, Copenhagen (DK)

(72) Inventors: Fredrik Zetterberg, Askim (SE); Ulf Nilsson, Lund (SE); Thomas Brimert, Blentarp (SE); Kristoffer Peterson, Lund (SE); Karl Jansson, Lund (SE)

(73) Assignee: GALECTO BIOTECH AB, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/285,233

(22) PCT Filed: Oct. 9, 2019

(86) PCT No.: PCT/EP2019/077408
§ 371 (c)(1),
(2) Date: Apr. 14, 2021

(87) PCT Pub. No.: WO2020/078808
PCT Pub. Date: Apr. 23, 2020

(65) Prior Publication Data
US 2021/0380624 A1 Dec. 9, 2021

(30) Foreign Application Priority Data
Oct. 15, 2018 (EP) ..................................... 18200415

(51) Int. Cl.
*C07H 19/056* (2006.01)
(52) U.S. Cl.
CPC .................................. *C07H 19/056* (2013.01)
(58) Field of Classification Search
CPC ... A61K 31/7056; C07H 19/056; C07H 17/02
See application file for complete search history.

(56) References Cited

U.S. PATENT DOCUMENTS

| 7,638,623 | B2 | 12/2009 | Nilsson et al. |
| 7,700,763 | B2 * | 4/2010 | Leffler ................. C07H 19/056 536/55 |
| 8,703,720 | B2 * | 4/2014 | Leffler .................... A61P 37/06 514/23 |
| 10,526,360 | B2 * | 1/2020 | Brimert .................. C07H 17/02 |
| 10,774,102 | B2 * | 9/2020 | Brimert .................... A61P 17/02 |
| 10,889,610 | B2 * | 1/2021 | Zetterberg ............... A61P 35/02 |
| 10,988,502 | B2 * | 4/2021 | Zetterberg ............... A61P 13/12 |
| 11,046,725 | B2 * | 6/2021 | Zetterberg ........... C07H 19/056 |
| 11,377,464 | B2 * | 7/2022 | Brimert .................... A61P 35/00 |
| 11,417,517 | B2 * | 8/2022 | Gandikota ............ H01L 29/518 |
| 11,447,517 | B2 * | 9/2022 | Zetterberg ............... A61P 11/00 |
| 2007/0185041 | A1 | 8/2007 | Forskarpatent et al. |
| 2014/0099319 | A1 | 4/2014 | Traber |
| 2021/0284678 | A1 * | 9/2021 | Zetterberg ............... A61P 11/00 |
| 2021/0380623 | A1 * | 12/2021 | Zetterberg ........... C07H 19/056 |
| 2022/0064204 | A1 * | 3/2022 | Gravelle ................ A61K 9/0053 |
| 2022/0259251 | A1 * | 8/2022 | Zetterberg ............... A61P 29/00 |
| 2022/0281909 | A1 * | 9/2022 | Zetterberg ............... A61P 35/00 |
| 2022/0289783 | A1 * | 9/2022 | Brimert .................... A61P 17/02 |
| 2022/0380401 | A1 * | 12/2022 | Zetterberg ............... C07H 15/26 |
| 2023/0014870 | A1 * | 1/2023 | Zetterberg ........... C07H 19/056 |

FOREIGN PATENT DOCUMENTS

| WO | WO-2018011093 A1 * | 1/2018 | ................ A61P 1/04 |
| WO | WO-2019075045 A1 * | 4/2019 | ................ A61P 1/16 |
| WO | WO-2019241461 A1 * | 12/2019 | ......... A61K 31/7056 |

OTHER PUBLICATIONS

U.S. Appl. No. 17/624,383, filed Jan. 2022, Zetterberg.*
U.S. Appl. No. 17/785,295, filed Jun. 2022, Gravelle, Lise et al.*
U.S. Appl. No. 17/869,107, filed Jul. 2022, Zetterberg, Fredrik et al.*
Morisette et al., "High-throughput crystallization: polymorphs, salts, co-crystals and solvates of pharmaceutical solids" Advanced Drug Delivery Reviews vol. 56 pp. 275-300 (Year: 2004).*
Xin et al., "Solvate Prediction for Pharmaceutical Organic Molecules with Machine Learning" Cryst Growth Des vol. 19 pp. 1903-1911 (Year: 2019).*
Boothroyd et al., "Why Do Some Molecules Form Hydrates or Solvates?" Cryst Growth Des vol. 18 pp. 1903-1908 (Year: 2018).*
U.S. Appl. No. 18/258,656, filed Jun. 2023, Zetterberg; Fredrik.*
Salomonsson, E., Larumbe, A., Tejler, J., Tullberg, E., Rydberg, H., Sundin, A., Khabut, A., Frejd, T., Lobsanov, Y.D., Rini, J.M., Nilsson, U.J., and Leffler, H (2010). "Monovalent interactions of galectin-1" Biochemistry 49: 9518-9532.
Sorme, P., Qian, Y., Nyholm, P.-G., Leffler, H., Nilsson, U. J. (2002) "Low micromolar inhibitors of galectin-3 based on 3'-derivatization of N-acetyllactosamine" ChemBioChem 3:183-189.
Sorme, P., Kahl-Knutsson, B., Wellmar, U., Nilsson, U. J., and Leffler H. (2003a) "Fluorescence polarization to study galectin-ligand interactions" Meth. Enzymol.362: 504-512.
Sorme, P., Kahl-Knutsson, B., Wellmar, U., Magnusson, B.-G., Leffler H., and Nilsson, U. J. (2003b) "Design and synthesis of galectin inhibitors" Meth. Enzymol.363: 157-169.
Sorme, P., Kahl-Knutsson, B., Huflejt, M., Nilsson, U. J., and Leffler H. (2004) "Fluorescence polarization as an analytical tool to evaluate galectin-ligand interactions" Anal. Biochem. 334: 36-47.
International Search Report issued on Dec. 13, 2019 in corresponding International application No. PCT/EP2019/077408; 5 pages.

(Continued)

*Primary Examiner* — Eric Olson
(74) *Attorney, Agent, or Firm* — Maier & Maier, PLLC

(57) ABSTRACT

A compound of the general formula I or II. The compound of formula I or II is suitable for use in a method for treating a disorder relating to the binding of a galectin, such as galectin-3 to a ligand in a mammal, such as a human. Furthermore, a method for treatment of a disorder relating to the binding of a galectin, such as galectin-3 to a ligand in a mammal, such as a human.

12 Claims, No Drawings

(56) References Cited

OTHER PUBLICATIONS

Jarkko Rautio et al: "The expanding role of prodrugs in contemporary drug design and development", Nature Reviews. Drug Discovery, vol. 17, No. 8, Aug. 1, 2018 (Aug. 1, 2018), pp. 559-587.
Daniela Jornada et al: "The Prodrug Approach: A Successful Tool for Improving Drug Solubility", Molecules, vol. 21, No. 1, Dec. 29, 2015 (Dec. 29, 2015), p. 42.
Bundgaard: "A Novel Solution-Stable, Water-Soluble Prodrug Type for Drugs Containing a Hydroxyl or an NH-Acidic Group", Journal of Medicinal Chemistry, American Chemical Society, US, vol. 32, No. 12, Dec. 1, 1989 (Dec. 1, 1989), pp. 2503-2507.
Christopher T. Oberg et al: "Arginine Binding Motifs: Design and Synthesis of Galactose-Derived Arginine Tweezers as Galectin-3 Inhibitors", Journal of Medicinal Chemistry, vol. 51, No. 7, Apr. 1, 2008 (Apr. 1, 2008), pp. 2297-2301.
Geoffrey Masuyer et al: "Inhibition mechanism of human galectin-7 by a novel galactose-benzylphosphate inhibitor", FEBS Journal, vol. 279, No. 2, Nov. 30, 2011 (Nov. 30, 2011), pp. 193-202.
Christopher T. Oberg et al: "Arene-Anion Based Arginine-Binding Motif on a Galactose Scaffold: Structure-Activity Relationships of Interactions with Arginine-Rich Galectins", Chemistry—A European Journal, vol. 17, No. 29, Jun. 7, 2011 (Jun. 7, 2011), pp. 8139-8144.
Thomas S. Elliott et al: "The use of phosphate bioisosteres in medicinal chemistry and chemical biology", M EDCH EM Comm, vol. 3, No. 7, Jan. 1, 2012 (Jan. 1, 2012), p. 735.
Thijssen VL, Heusschen R, Caers J, Griffioen AW. (2015) "Galectin expression in cancer diagnosis and prognosis: A systematic review" Biochim Biophys Acta. Apr. 2015;1855(2):235-47.
Toscano, M.A., Bianco, G.A., Ilarregui, J.M., Croci, D.O., Correale, J., Hernandez, J.D., Zwirner, N.W., Poirier, F., Riley, E.M., Baum, L.G., et al. (2007). "Differential glycosylation of TH1, TH2 and TH-17 effector cells selectively regulates susceptibility to cell death" Nat Immunol 8: 825-834.
Viguier M, Advedissian T, Delacour D, Poirier F, Deshayes F. (2014) "Galectins in epithelial functions" Tissue Barriers. May 6, 2014; 2:e29103.
Aits S, Kricker J, Liu B, Ellegaard AM, Hämälistö S, Tvingsholm S, Corcelle-Termeau E, Høgh S, Farkas T, Holm Jonassen A, Gromova I, Mortensen M, Jäättelä M. (2015) "Sensitive detection of lysosomal membrane permeabilization by lysosomal galectin puncta assay" Autophagy 2015;11(8):1408-24.
Almkvist, J., Fäldt, J., Dahlgren, C., Leffler, H., and Karlsson, A. (2001) "Lipopolysaccharide-induced gelatinase granule mobilization primes neutrophils for activation by galectin-3 and Formylmethionyl-Leu-Phe" Infect. Immun. vol. 69: 832-837.
Arthur CM, Baruffi MD, Cummings RD, Stowell SR. (2015) "Evolving mechanistic insights into galectin functions" Methods Mol Biol. 1207:1-35.
Blanchard H, Yu X, Collins PM, Bum-Erdene K. (2014) "Galectin-3 inhibitors: a patent review (2008-present)" Expert Opin Ther Pat. Oct. 2014;24(10):1053-65.
Blidner AG, Méndez-Huergo SP, Cagnoni AJ, Rabinovich GA. (2015) "Re-wiring regulatory cell networks in immunity by galectin-glycan interactions" FEBS Lett. Sep. 6, 2015. pii: S0014-5793(15)00807-8.
Chen, W.-S., Leffler H., Nilsson, U. J., Panjwani, N. (2012). "Targeting Galectin-1 and Galectin-3 Attenuates VEGF-A-induced Angiogenesis" Mol. Biol. Cell (suppl), Abstract No. 2695.
Clare DK, Magescas J, Piolot T, Dumoux M, Vesque C, Pichard E, Dang T, Duvauchelle B, Poirier F, Delacour D. (2014) "Basal foot MTOC organizes pillar MTs required for coordination of beating cilia" Nat Commun. 5:4888.
Cumpstey, I., Carlsson, S., Leffler, H. and Nilsson, U. J. (2005) "Synthesis of a phenyl thio-β-D-galactopyranoside library from 1,5-difluoro-2,4-dinitrobenzene: discovery of efficient and selective monosaccharide inhibitors of galectin-7" Org. Biomol. Chem. 3: 1922-1932.
Cumpstey, I., Sundin, A., Leffler, H. and Nilsson, U. J. (2005) "C2-Symmetrical thiodigalactoside bis-benzamido derivatives as high-affinity inhibitors of galectin-3: Efficient lectin inhibition through double arginine-arene interactions" Angew. Chem. Int. Ed. 44: 5110-5112.
Cumpstey et al., "Double Affinity Amplification of Galectin-Ligand Interactions through Arginine-Arene Interactions: Synthetic, Thermodynamic, and Computational Studies with Aromatic Diamido Thiodigalactosides", in Chem. Eur. J., vol. 14, 2008, p. 4233-4245.
Delaine, T., Cumpstey, I., Ingrassia, L., Le Mercier, M., Okechukwu, P., Leffler, H., Kiss, R., and Nilsson, U.J. (2008). "Galectin-Inhibitory Thiodigalactoside Ester Derivatives Have Anti-Migratory Effects in Cultured Lung and Prostate Cancer Cells" J Med Chem 51; 8109-8114.
Demotte et al., "A Galectin-3 Ligand Corrects the Impaired Function of Human CD4 and CD8 Tumor-Infiltrating Lymphocytes and Favors Tumor Rejection in Mice", in Cancer Research, vol. 70, 2010, p. 7476-7488; 14 pages.
Ebrahim AH, Alalawi Z, Mirandola L, Rakhshanda R, Dahlbeck S, Nguyen D, Jenkins M1, Grizzi F, Cobos E, "Figueroa JA, Chiriva-Internati M (2014)Galectins in cancer: carcinogenesis, diagnosis and therapy" Ann Transl Med. Sep. 2014;2 (9):88.
Elola MT, Blidner AG, Ferragut F, Bracalente C, Rabinovich GA. (2015) "Assembly, organization and regulation of cell-surface receptors by lectin-glycan complexes" Biochem J. Jul. 1, 2015;469(1):1-16.
Farkas et al., "Synthesis of 1,2-trans-glycopyranosyl chlorides using the dichloromethyl methyl ether-boron trifluoride etherate reagent", in Carbohydrate Research, vol. 48, 1976, p. 136-138; 3 pages.
Funasaka T, Raz A, Nangia-Makker P. (2014) "Nuclear transport of galectin-3 and its therapeutic implications" Seminars in Cancer Biology, Aug. 2014; 27:30-8.
Denis Giguère et al., "Synthesis of stable and selective inhibitors of human galectins-1 and -3", Bioorganic & Medicinal Chemistry 16 (2008) 7811-7823; 13 pgs.
Giguère et al., "Inhibitory potential of chemical substitutions at bioinspired sites of β-D-galactopyranose on neoglycoprotein/cell surface binding of two classes of medically relevant lectins", Bioorganic & Medicinal Chemistry, Mar. 9, 2011, vol. 19, No. 10, p. 3280-3287; 8 pages.
Giguere, D., Patnam, R., Bellefleur, M.-A., St.-Pierre, C., Sato, S., and Roy, R. (2006). "Carbohydrate triazoles and soxazoles as inhibitors of galectins-1 and -3", Chem Commun: 2379-2381.
Glinsky et al., "Inhibition of Human Breast Cancer Metastasis in Nude Mice by Synthetic Glycoamines", in Cancer Research, vol. 56, Dec. 1, 1996, p. 5319-5324.
Glinsky et al., "Synthetic Galectin-3 Inhibitor Increases Metastatic Cancer Cell Sensitivity to Taxol-Induced Apoptosis In Vitro and In Vivo", in Neoplasia, vol. 11, No. 9, Sep. 2009, p. 901-909.
Huflejt et al., "Galectin-4 in normal tissues and cancer", in Glycoconjugate Journal 20, 2004, p. 247-255.
Ingrassia et al. (2006) "A Lactosylated Steroid Contributes in Vivo Therapeutic Benefits in Experimental Models of Mouse Lymphoma and Human Glioblastoma" J. Med. CHem. 49: 1800-1807.
John, C. M., Leffler, H., Kahl-Knutsson, B., Svensson, I., and Jarvis, G. A. (2003) "Truncated Galectin-3 Inhibits Tumor Growth and Metastasis in Orthotopic Nude Mouse Model of Human Breast Cancer" Clin. Cancer Res. 9: 2374-2383.
Kouo et al., "Galectin-3 Shapes Antitumor Immune Responses by Suppressing CD8 T Cells via LAG-3 and Inhibiting Expansion of Plasmacytoid Dendritic Cells", in Cancer Immunology Research, vol. 3, No. 4, Apr. 2015, p. 412-423.
Leffler, H. and Barondes, S. H. (1986) "Specificity of binding of three soluble rat lung lectins to substituted and unsubstituted mammalian β-galactosides" J. Biol. Chem. 261:10119-10126.
Leffler, "Galectins Structure and Function—A Synopsis", in Results and Problems in Cell Differentiation, vol. 33, 2001, p. 57-83.
Leffler et al., "Introduction to galectins", in Glycoconjugate Journal 19, 2004, p. 433-440.
Lepur A, Salomonsson E, Nilsson UJ, Leffler H. (2012) "Ligand induced galectin-3 protein self-association" J Biol Chem. Jun. 22, 2012;287(26):21751-6.
Li LC, Li J, Gao J. (2014) "Functions of galectin-3 and its role in fibrotic diseases" J Pharmacol Exp Ther. Nov. 2014;351(2):336-43.

(56) References Cited

OTHER PUBLICATIONS

MacKinnon, A. C., Farnworth, S. L., Henderson, N. C., Hodkinson, P. S., Kipari, T., Leffler, H., Nilsson, U. J., Haslett, C., Hughes, J., and Sethi T. (2008). "Regulation of alternative macrophage activation by Galectin-3" J. Immun. 180; 2650-2658.

Mackinnon, A., Gibbons, M., Farnworth, S., Leffler, H., Nilsson, U. J., Delaine, T., Simpson, A., Forbes, S., Hirani, N., Gauldie, J., and Sethi T. (2012). "Regulation of Transforming Growth Factor-$\beta$1-driven Lung Fibrosis by Galectin-3" Am. J. Resp. Crit. Care Med., in press.

Massa, S. M., Cooper, D. N. W., Leffler, H., Barondes, S. H. (1993) "L-29, an endogenous lectin, binds to glycoconjugate ligands with positive cooperativity" Biochemistry 32: 260-267.

Melero et al., "Evolving synergistic combinations of targeted immunotherapies to combat cancer", in Nature Reviews, vol. 15, Aug. 2015, p. 457-472.

Partridge, E.A., Le Roy, C., Di Guglielmo, G.M., Pawling, J., Cheung, P., Granovsky, M., Nabi, I.R., Wrana, J.L., and Dennis, J.W. (2004). "Regulation of cytokine receptors by Golgi N-glycan processing and endocytosis" Science 306: 120-124.

Pienta, K.J., Naik, H., Akhtar, A., Yamazaki, K., Replogle, T.S., Lehr, J., Donat, T.L., Tait, L., Hogan, V., and Raz, A. (1995). "Inhibition of spontaneous metastasis in a rat prostate cancer model by oral administration of modified citrus pectin" J Natl Cancer Inst 87, 348-353.

Ramos-Soriano et al., "Synthesis, Biological Evaluation, WAC and NMR Studies of S-Galactosides and Non-Carbohydrate Ligands of Cholera Toxin Based on Polyhydroxyalkylfuroate Moieties", in Chem. Eur. J., vol. 19, 2013, p. 17989-18003; 15 pages.

Ruvolo, P.P. Biochim. Biophys Acta. Molecular cell research (2015) E-pub ahead of print, title: "Galectin-3 as a guardian of the tumor microenvironment" published on-line Apr. 8, 2015: (http://www.sciencedirect.com/science/article/pii/S0167488915002700).

Salameh et al., "3-(1,2,3-Triazol-1-yl)-1-thio-galactosides as small, efficient, and hydrolytically stable inhibitors of galectin-3", in Bioorg. Med. Chem. Lett., vol. 15, 2005, p. 3344-3346.

\* cited by examiner

GALACTOSIDE INHIBITOR OF GALECTINS

FIELD

The present invention relates to novel compounds, the use of said compounds as medicament and for the manufacture of a medicament for the treatment of inflammation; fibrosis; scarring; keloid formation; aberrant scar formation; surgical adhesions; septic shock; cancers; autoimmune diseases; metabolic disorders; heart disease; heart failure; pathological angiogenesis; eye diseases; atherosclerosis; metabolic diseases; asthma and other interstitial lung diseases; and liver disorders in mammals. The invention also relates to pharmaceutical compositions comprising said novel compounds.

BACKGROUND

Galectins are proteins with a characteristic carbohydrate recognition domain (CRD) (Leffler et al., 2004). This is a tightly folded β-sandwich of about 130 amino acids (about 15 kDa) with the two defining features 1) a β-galactose binding site and 2) sufficient similarity in a sequence motif of about seven amino acids, most of which (about six residues) make up the β-galactose binding site. However, sites adjacent to the β-galactose site are required for tight binding of natural saccharides and different preferences of these give galectins different fine specificity for natural saccharides.

The recent completion of the human, mouse and rat genome sequences reveal about 15 galectins and galectin-like proteins in one mammalian genome with slight variation between species (Leffler et al., 2004).

Galectin subunits can contain either one or two CRDs within a single peptide chain. The first category, mono-CRDs galectins, can occur as monomers or dimers (two types) in vertebrates. The by far best studied galectins are the dimeric galectin-1, and galectin-3 that is a monomer in solution but may aggregate and become multimeric upon encounter with ligands (Lepur et al., 2012). These were the first discovered galectins and are abundant in many tissues.

There are now over 5700 publications on galectins in PubMed, with most, as mentioned above, about galectins-1 (>1400) and -3 (>2800). Strong evidence suggests roles for galectins in e.g. inflammation and cancer, and development (Blidner et al., 2015, Ebrahim et al., 2014).

Galectins are synthesized as cytosolic proteins, without a signal peptide on free ribosomes. Their N-terminus is acetylated, a typical modification of cytosolic proteins, and they reside in the cytosol for a long time (not typical of secreted proteins). From there they can be targeted to the nucleus, specific cytososlic sites, or secreted (induced or constitutively) by a non-classical (non-ER-Golgi) pathway, as yet unknown, but possibly similar to the export of e.g. IL-1 (Leffler et al., 2004; Arthur et al., 2015). They can also function in all these compartments; for galectin-3, solid evidence published in well respected journals support roles in RNA splicing in the nucleus, inhibition of apoptosis in the cytosol, accumulation around disrupted vesicles, association with microtubule organizing center of cilia, and a variety of extracellular effects on cell signaling and adhesion (Elola et al. 2015, Funasaka et al., 2014, Aits et al., 2015, Clare et al., 2014). Other galectins also may act in the cytosol by enhancing apoptosis and regulating the cell cycle and differentiation in certain cells. Most galectins act also extracellularly by cross-linking glycoproteins (e.g. laminin, integrins, and IgE receptors) possibly forming supramolecular ordered arrays (Elola et al., 2015) and may thereby modulate cell adhesion and induce intracellular signals. Related to this, recent years have seen the emergence of a molecular mechanism of these galectin functions involving a formation of microdomains (lattices) within membranes, (Elola et al., 2015) which in turn affects intracellular trafficking and cell surface presentation of glycoprotein receptors. This has been documented in cell culture, in null mutant mice, and animals treated with galectin or galectin inhibitors. (Johannes, L.; Jacob, R.; Leffler, H. Galectins at a Glance. *J. Cell. Sci.* 2018, 131 (9), jcs208884.).

Potential Therapeutic Use of Galectin-3 Inhibitors

Galectin-3 has been implicated in diverse phenomena and, hence, inhibitors may have multiple uses (Blanchard et al., 2014). It is easy to perceive this as a lack of specificity or lack of scientific focus. Therefore, the analogy with aspirin and the cyclooxygenases (COX-I and II) is useful. The COXs produce the precursor of a wide variety of prostaglandins and, hence, are involved in a diverse array of biological mechanisms. Their inhibitors, aspirin and other NSAIDs (non-steroid anti-inflammatory drugs), also have broad and diverse effects. Despite this, these inhibitors are very useful medically, and they have several different specific utilities.

So if galectins, like COXs, are part of some basic biological regulatory mechanism (as yet unknown), they are likely to be 'used by nature' for different purpose in different contexts. Galectin inhibitors, like NSAIDs, are not expected to wipe out the whole system, but to tilt the balance a bit.

Inhibition of Inflammation

A pro-inflammatory role of galectin-3 is indicated by its induction in cells at inflammatory sites, a variety of effects on immune cells (e.g. oxidative burst in neutrophils and chemotaxis in monocytes), and decrease of the inflammatory response, mainly in neutrophils and macrophages, in null mutant mice (Blidner et al., 2015, Arthur et al., 2015). Importantly, recent studies have identified galectin-3 as a key rate-limiting factor in macrophage M2 differentiation and myofibroblast activation, which influences the development of fibrosis (Mackinnon et al., 2008; Mackinnon et al., 2012, Li et al., 2014).

Inflammation is a protective response of the body to invading organisms and tissue injury. However, if unbalanced, frequently it is also destructive and occurs as part of the pathology in many diseases. Because of this, there is great medical interest in pharmacological modulation of inflammation. A galectin-3 inhibitor is expected to provide an important addition to the arsenal available for this.

Treatment of Fibrosis-Related Conditions

The idea of a possible role of galectin-3 in fibrosis comes from cell and ex vivo studies on macrophage differentiation (Mackinnon et al., 2008), as well as from in vivo studies on macrophage differentiation and myofibroblast activation (Mackinnon et al., 2012). Briefly, the hypothesis is as follows: Galectin-3 has been shown to prolong cell surface residence and thus enhance responsiveness of certain receptors (Elola et al., 2015), such as the TGF-ß receptor (MacKinnon, 2012), which in turn regulates alternative macrophage differentiation into M2 macrophages and myofibroblast activation.

Hence, as galectin-3 is a good candidate for being an endogenous enhancer of TGF-ß signaling and alternative macrophage differentiation and myofibroblast activation, galectin-3 inhibitors may be very useful in treating fibrosis and adverse tissue remodeling.

Treatment of Cancer

A large number of immunohistochemical studies show changed expression of certain galectins in cancer (Thijssen et al, 2015; Ebrahim et al., 2014) and for example galectin-3 is now an established histochemical marker of thyroid cancer. The direct evidence for a role of galectin-3 in cancer comes mainly from mouse models. In paired tumor cell lines (with decreased or increased expression of galectin-3), the induction of galectin-3 gives more tumors and metastasis and suppression of galectin-3 gives less tumors and metastasis. Galectin-3 has been proposed to enhance tumor growth by being anti-apoptotic, promote angiogenesis, or to promote metastasis by affecting cell adhesion. Further, recent evidence have shown that galectin-3 plays a critical role in the tumor microenvironment (Ruvolo, 2015). Galectin-3 is also believed to regulate the interaction between the tumor cells and immune cells, such as T-lymphocytes (T-cells), and inhibition of galectin-3 has been shown to restore T-cell activity (Demotte et al. 2010, Kouo et al. 2015, Menero et al. 2015). From the above it is clear that inhibitors of galectin-3 might have valuable anti-cancer effects. Indeed, saccharides claimed but not proven to inhibit galectin-3 have been reported to have anti-cancer effects. In our own study a fragment of galectin-3 containing the CRD inhibited breast cancer in a mouse model by acting as a dominant negative inhibitor (John et al., 2003). More recently, inhibition of galectin-3 with small molecules have been demonstrated to indeed greatly enhance tumor cell sensitivity towards radiation and standard pro-apoptotic drugs in cell assays and ex vivo (Blanchard et al., 2015).

Also other galectins are frequently over-expressed in low differentiated cancer cells, or induced in specific cancer types (Thijssen et al, 2015; Ebrahim et al. 2014). Galectin-1 induces apoptosis in activated T-cells and has a remarkable immunosuppressive effect on autoimmune disease in vivo (Blidner et al., 2015). Therefore, the over-expression of these galectins in cancers might help the tumor to defend itself against the T-cell response raised by the host.

Null mutant mice for galectins-1, -3, -7 and -9 have been established and are healthy and reproduce apparently normally in animal house conditions. However, further studies have revealed subtle phenotypes under different type of challenge, mainly in function of immune cells (Blidner et al., 2015), but also other cells types (Viguier et al., 2014). The differences in site of expression, specificity and other properties make it unlikely that different galectins can replace each other functionally. The observations in the null mutant mice would indicate that galectins are not essential for basic life supporting functions as can be observed in normal animal house conditions. Instead they may be optimizers of normal function and/or essential in stress conditions not found in animal house conditions. The lack of strong effect in null mutant mice may make galectin inhibitors more favorable as drugs. If galectin activity contributes to pathological conditions as suggested above but less to normal conditions, then inhibition of them will have less unwanted side effects.

Treatment of Angiogenesis

Vascular endothelial growth factors (VEGFs) signaling through VEGF receptor-2 (VEGFR-2) is the primary angiogenic pathway. Studies have been published demonstrating that both galectin-1 (Gal-1) and galectin-3 (Gal-3) are important modulators for VEGF/VEGFR-2 signaling pathway (Croci et al., 2014). It has also been published that a galectin inhibitor, TDX, is expected have efficacy against pathological angiogenesis. (Chen 2012)

Known Inhibitors

Natural Ligands

Solid phase binding assays and inhibition assays have identified a number of saccharides and glycoconjugates with the ability to bind galectins (reviewed by Leffler, 2001 and Leffler et al., 2004). All galectins bind lactose with a $K_d$ of 0.5-1 mM. The affinity of D-galactose is 50-100 times lower. N-Acetyllactosamine and related disaccharides bind about as well as lactose, but for certain galectins, they can bind either worse or up to 10 times better. The best small saccharide ligands for galectin-3 were those carrying blood group A-determinants attached to lactose or LacNAc-residues and were found to bind up to about 50 times better than lactose. Galectin-1 shows no preference for these saccharides.

Larger saccharides of the polylactosamine type have been proposed as preferred ligands for galectins. In solution, using polylactosamine-carrying glycopeptides, there was evidence for this for galectin-3, but not galectin-1 (Leffler and Barondes, 1986). A modified plant pectin polysaccharide has been reported to bind galectin-3 (Pienta et al., 1995).

The above-described natural saccharides that have been identified as galectin-3 ligands are not suitable for use as active components in pharmaceutical compositions, because they are susceptible to acidic hydrolysis in the stomach and to enzymatic degradation. In addition, natural saccharides are hydrophilic in nature, and are not readily absorbed from the gastrointestinal tract following oral administration.

Galectin Specificity

The studies of galectin specificity using inhibition by small natural saccharides mentioned above indicated that all galectins bound lactose, LacNAc and related disaccharides, but that galectin-3 bound certain longer saccharides much better (Leffler and Barondes, 1986). These longer saccharides were characterized by having an additional sugar residue added to the C-3 position of galactose (in e.g. lactose or LacNAc) that bound an extended binding groove. The shape of this groove varies between galectins, suggesting that the same extensions would not be bound equally by the different galectins.

Synthetic Inhibitors

Saccharides coupled to amino acids with anti-cancer activity were first identified as natural compounds in serum, but subsequently, synthetic analogues have been made (Glinsky et al., 1996). Among them, those with lactose or galactose coupled to the amino acid inhibit galectins, but only with about the same potency as the corresponding underivatized sugar. A chemically modified form of citrus pectin (Platt and Raz, 1992) that inhibits galectin-3 shows anti-tumor activity in vivo (Pienta et al., 1995; Nangia-Makker et al., 2002).

Cluster molecules having up to four lactose moieties showed a strong multivalency effect when binding to galectin-3, but not to galectin-1 and galectin-5 (Vrasidas et al., 2003). Cyclodextrin-based glycoclusters with seven galactose, lactose, or N-acetyllactosamine residues also showed a strong multivalency effect against galectin-3, but less so against galectins-1 and -7 (André et al., 2004). Starburst dendrimers (André et al., 1999) and glycopolymers (Pohl et al., 1999; David et al., 2004), made polyvalent in lactose-residues, have been described as galectin-3 inhibitors with marginally improved potency as compared to lactose. The aforementioned synthetic compounds that have been identified as galectin-3 ligands are not suitable for use as active components in pharmaceutical compositions, because they are hydrophilic in nature and are not readily absorbed from the gastrointestinal tract following oral administration.

Natural oligosaccharides, glycoclusters, glycodendrimers, and glycopolymers described above are too polar and too large to be absorbed and in some cases are large enough to produce immune responses in patients. Furthermore, they are susceptible to acidic hydrolysis in the stomach and to enzymatic hydrolysis. Thus, there is a need for small synthetic molecules.

Thiodigalactoside is known to be a synthetic and hydrolytically stable, yet polar inhibitor, approximately as efficient as N-acetyllactosamine (Leffler and Barondes, 1986). N-Acetyllactosamine derivatives carrying aromatic amides or substituted benzyl ethers at C-3' have been demonstrated to be highly efficient inhibitors of galectin-3, with unprecedented $IC_{50}$ values as low as 4.8 µM, which is a 20-fold improvement in comparison with the natural N-acetyllactosamine disaccharide (Sörme et al., 2002; Sörme et al., 2003b). These derivatives are less polar overall, due to the presence of the aromatic amido moieties and are thus more suitable as agents for the inhibition of galectins in vivo. Furthermore, C3-triazolyl galactosides have been demonstrated to be as potent inhibitors as the corresponding C3-amides of some galectins. Hence, any properly structured galactose C3-substituent may confer enhanced galectin affinity.

However, the C3-amido- and C3-triazolyl-derivatised compounds are still susceptible to hydrolytic degradation in vivo, due to the presence of a glycosidic bond in the galactose and N-acetyllactosamine saccharide moiety and, although they are potent small molecule inhibitors of galectin-3, even further improved affinity and stability is desirable. Accordingly, inhibitors based on 3,3'-diamido- or 3,3'-ditriazolyl-derivatization of thiodigalactoside have been developed, (Cumpstey et al., 2005b; Cumpstey et al., 2008; Salameh et al., 2010; WO/2005/113569 and US2007185041; WO/2005/113568, U.S. Pat. No. 7,638,623 B2, T. Delaine, 2016, ChemBioChem 10.1002/cbic.201600285)) which lack O-glycosidic hydrolytically and enzymatically labile linkages. These inhibitors also displayed superior affinity for several galectins (down to $K_d$ in the low nM range). Nevertheless, although displaying high affinity for galectins, the 3,3'-derivatized thiodigalactosides still comprise a disadvantage in their multistep synthesis involving double inversion reaction to reach at 3-N-derivatized galactose building blocks. Furthermore, cyclohexane replacement of one galactose ring in thiodigalactoside has been evidenced to mimic the galactose ring and hence to provide galectin-1 and -3 inhibitors with efficiency approaching those of the diamido- and ditriazolyl-thiodigalactoside derivatives (WO/2010/126435). Replacement of a D-galactopyranose unit with a substituted cyclohexane decreases polarity and most likely also metabolic susceptibility, thus improving drug-like properties.

Some earlier described compounds have the following general formulas

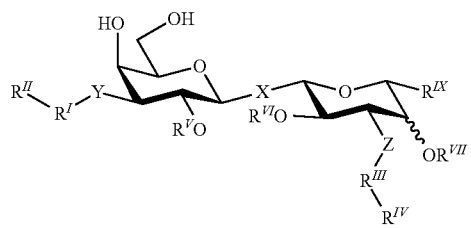

as described in WO/2005/113568, and

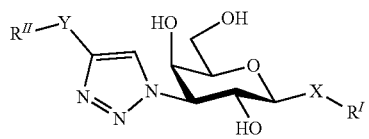

as described in WO/2005/113569, in which $R^I$ can be a D-galactose.

In recently published US20140099319, WO2014067986 and (T. Delaine, 2016, ChemBioChem 10.1002/cbic.201600285) are disclosed a compound of formula

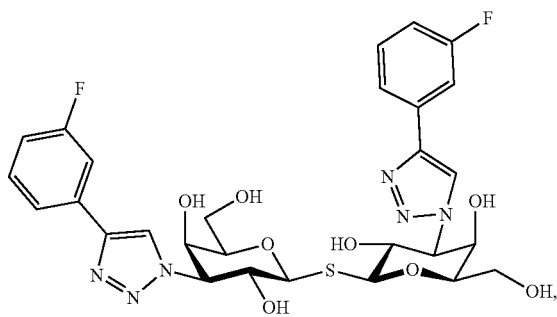

having fluorine (F) in the meta position on both the phenyl rings in relation to the triazole rings. This compound has been shown to be a promising drug candidate for lung fibrosis, and in particular is very selective on galectin-3 with high affinity.

A series of small C1 or C1 and C3-substituted galactopyranosides have been disclosed showing affinity towards galectin-3 and 1. The beta-D-galactopyranosides were reported as having affinity in the same range or less than lactose, which has a Kd of about 91 µM towards galectin-3 and 190 µM towards galectin-1. (Giguere, D et. al. 2011, 2008, 2006).

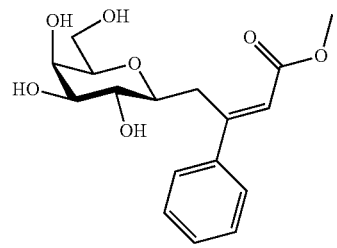

Gal-1 313 µM
Gal-3 > 5000

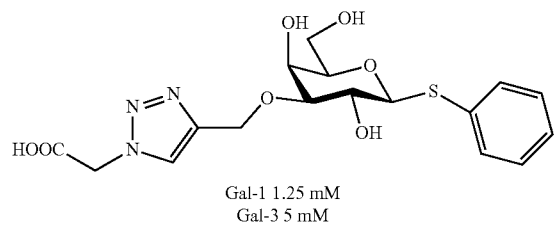

Gal-1 1.25 mM
Gal-3 5 mM

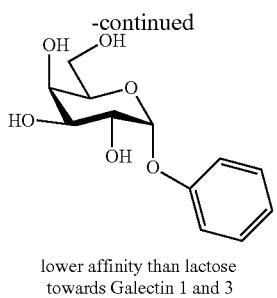

lower affinity than lactose
towards Galectin 1 and 3

There is no disclosure or mentioning of corresponding alpha-anomers having affinity towards galectin-3 or galectin-1 better than lactose.

SUMMARY

The compounds of the present invention are novel galactopyranose compounds that unexpectedly have good solubility and can be used to increase the maximum dose resulting in dose correlated bioavailability. The compounds of the present invention have high affinity to galectin 3 and inhibits galectin 3. Here compounds have been developed in which one modifying group is introduced at the C2 oxygen of a galactopyranose.

In broad aspect the present invention concerns a compound of formula (I)

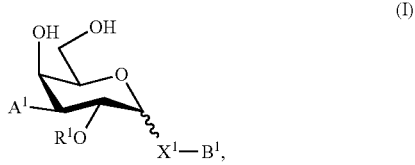

wherein the pyranose ring is α- or β-D-galactopyranose (as indicated by wavy line);
wherein:

$A^1$ is selected from the group consisting of i) an aryl; ii) an aryl substituted with at least one from the group consisting of a halogen; CN; $C_{2-6}$ alkenyl; $C_{2-6}$ alkynyl; carboxyl; $C_{1-6}$ alkoxy; $C_{1-6}$ thio alkyl; $C_{1-6}$ alkyl; nitro; thio; $C_{1-6}$ alkylthio; amino; hydroxy; $C_{1-6}$ carbonyl; an amino; and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; iii) a $C_{1-6}$ alkoxy; iv) a $C_{1-6}$ alkoxy substituted with at least one from the group consisting of a halogen; a $C_{1-6}$ alkyl; a heteroaryl; a heteroaryl substituted with at least one from the group consisting of halogen, CN, $C_{2-6}$ alkenyl, $C_{2-6}$ alkynyl, carboxyl, $C_{1-6}$ alkoxy, $C_{1-6}$ thioalkyl, amino, $C_{1-6}$ alkyl, $C_{1-6}$ alkyl substituted with at least one halogen, $C_{1-6}$ alkoxy, $C_{1-6}$ alkoxy substituted with at least one halogen, a five or six membered heteroaromatic ring, a five or six membered heteroaromatic ring substituted with at least one from the group consisting of halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, $C_{1-6}$ alkyl substituted with at least one halogen, $C_{1-6}$ alkoxy, and $C_{1-6}$ alkoxy substituted with at least one halogen, an aryl, and an aryl substituted with at least one from the group consisting of halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, $C_{1-6}$ alkyl substituted with at least one halogen, $C_{1-6}$ alkoxy, and $C_{1-6}$ alkoxy substituted with at least one halogen; an amino; and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; v) a $C_{1-6}$ alkylamino; vi) a $C_{1-6}$ alkylamino substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; vii) a heteroaryl; viii) a heteroaryl substituted with at least one from the group consisting of a halogen; CN; $C_{2-6}$ alkenyl; $C_{2-6}$ alkynyl; carboxyl; $C_{1-6}$ alkoxy; $C_{1-6}$ thioalkyl; an amino; an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; an aryl; an aryl substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{1-6}$ alkyl, $C_{1-6}$ alkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; a heteroaryl; a heteroaryl substituted with at least one from the group consisting of halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{1-6}$ alkyl, $C_{1-6}$ alkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, nitro, thio, $C_{1-6}$ alkylthio, amino, hydroxy, $C_{1-6}$ carbonyl, an amino substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl, $C_{3-7}$ cycloalkyl, $C_{3-7}$ cycloalkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{3-7}$ cycloalkoxy, and $C_{3-7}$ cycloalkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; a $C_{1-6}$ carbonyl; a $C_{1-6}$ carbonyl substituted with at least one from the group consisting of halogen, $C_{1-6}$ alkoxy, $C_{1-6}$ alkyl, $C_{1-6}$ alkyl substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl, nitro, thio, $C_{1-6}$ alkylthio, amino, and an amino substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl; ix) a heterocycle; x) a heterocycle substituted with at least one from the group consisting of halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{1-6}$ alkyl, $C_{1-6}$ alkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, nitro, thio, $C_{1-6}$ alkylthio, amino, hydroxy, $C_{1-6}$ carbonyl, an amino substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl, $C_{3-7}$ cycloalkyl, $C_{3-7}$ cycloalkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{3-7}$ cycloalkoxy, and $C_{3-7}$ cycloalkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; a $C_{1-6}$ carbonyl; a $C_{1-6}$ carbonyl substituted with at least one from the group consisting of halogen, $C_{1-6}$ alkoxy, $C_{1-6}$ alkyl, $C_{1-6}$ alkyl substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl, nitro, thio, $C_{1-6}$ alkylthio, amino, and an amino substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl; xi) a $C_{1-6}$ alkyl; xii) a $C_{1-6}$ alkyl substituted with at least one from the group consisting of halogen; $C_{1-6}$ alkoxy; $C_{1-6}$ alkyl; $C_{3-7}$ cycloalkyl; nitro; thio; $C_{1-6}$ alkylthio; amino; hydroxy; and $C_{1-6}$ carbonyl; xiii) a $C_{1-6}$ carbonyl; xiv) a $C_{1-6}$ carbonyl substituted with at least one from the group consisting of a $C_{1-6}$ alkyl; a $C_{2-6}$ alkenyl; an aryl; a heteroaryl; and a heterocycle; xv) a $C_{1-6}$ alkyl-CONH—; xvi) a $C_{1-6}$ alkyl-CONH— substituted on one or more alkyl carbon with at least one from the group consisting of a heteroaryl; a heteroaryl substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkoxy substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl; $C_{1-6}$ alkyl, $C_{1-6}$ alkyl substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl; nitro, thio, $C_{1-6}$ alkylthio, amino, hydroxy, $C_{1-6}$ carbonyl, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; an aryl; and an aryl substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkoxy substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl, $C_{1-6}$ alkyl, $C_{1-6}$ alkyl substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl, nitro, thio, $C_{1-6}$ alkylthio, amino, hydroxy, $C_{1-6}$ carbonyl, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl;

$X^1$ is selected from the group consisting of O, S, SO, $SO_2$, C=O, amino, amino substituted with a $C_{1-6}$ alkyl, and CR'R" wherein R' and R" are independently selected from hydrogen, OH, or halogen;

$B^1$ is selected from the group consisting of a) a $C_{1-6}$ alkyl, b) a $C_{1-6}$ alkyl substituted with at least one from the group consisting of a five or six membered heteroaromatic ring; a five or six membered heteroaromatic ring substituted with at least one from the group consisting of cyano, halogen, $C_{1-6}$ alkyl, $C_{1-6}$ alkyl substituted with at least one from the group consisting of halogen, hydroxy and $C_{1-6}$ alkyl, $C_{1-6}$ alkoxy, $C_{1-6}$ alkoxy substituted with at least one from the group consisting of halogen, hydroxy and $C_{1-6}$ alkyl, hydroxy, and $R^\#$—CONH— wherein $R^\#$ is selected from the group consisting $C_{1-6}$ alkyl and $C_{1-6}$ cycloalkyl; an aryl; and an aryl substituted with at lest one from the group consisting of cyano, halogen, $C_{1-6}$ alkyl, $C_{1-6}$ alkyl substituted with at least one from the group consisting of halogen, hydroxy and $C_{1-6}$ alkyl, $C_{1-6}$ alkoxy, $C_{1-6}$ alkoxy substituted with at least one from the group consisting of halogen, hydroxy and $C_{1-6}$ alkyl, hydroxy, and $R^\unicode{x00A4}$—CONH— wherein $R^\unicode{x00A4}$ is selected from the group consisting $C_{1-6}$ alkyl and $C_{1-6}$ cycloalkyl; c) an aryl; d) an aryl substituted with at least one from the group consisting of halogen; cyano; hydroxy; carboxyl; carboxamid; carboxamid substituted with at least one from the group consisting of $C_{1-6}$ alkyl and $C_{3-6}$ cycloalkyl; $C_{1-6}$ alkyl; $C_{1-6}$ alkyl substituted with at least one from the group consisting of halogen, hydroxy, and $R^\&$—CONH— wherein $R^\&$ is selected from the group consisting $C_{1-6}$ alkyl and $C_{1-6}$ cycloalkyl; $C_{1-6}$ cycloalkyl; $C_{1-6}$ cycloalkyl substituted with at least one from the group consisting of halogen, hydroxy, and $R^{\%}$—CONH— wherein $R^{\%}$ is selected from the group consisting $C_{1-6}$ alkyl and $C_{1-6}$ cycloalkyl; $C_{1-6}$ alkoxy; $C_{1-6}$ alkoxy substituted with at least one from the group consisting of halogen, hydroxy, and $R^\S$ —CONH— wherein $R^\S$ is selected from the group consisting $C_{1-6}$ alkyl and $C_{1-6}$ cycloalkyl; $C_{3-6}$ cycloalkoxy; $C_{3-6}$ cycloalkoxy substituted with at least one from the group consisting of halogen, hydroxy, and $R^*$—CONH— wherein $R^*$ is selected from the group consisting $C_{1-6}$ alkyl and $C_{1-6}$ cycloalkyl; amino; amino substituted with at least one from the group consisting of $C_{1-6}$ alkyl and $C_{1-6}$ cycloalkyl; and $R^{}$—CONH— wherein $R^{}$ is selected from the group consisting $C_{1-6}$ alkyl and $C_{1-6}$ cycloalkyl; e) a $C_{4-10}$ cycloalkyl, f) a $C_{4-10}$ cycloalkyl substituted with at least one from the group consisting of cyano, halogen, $C_{1-6}$ alkyl, $C_{1-6}$ alkyl substituted with at least one from the group consisting of halogen, hydroxy and $C_{1-6}$ alkyl, $C_{1-6}$ alkoxy, $C_{1-6}$ alkoxy substituted with at least one from the group consisting of halogen, hydroxy and $C_{1-6}$ alkyl, hydroxy, and $R^{\#\#\#}$—CONH— wherein $R^{\#\#\#}$ is selected from the group consisting $C_{1-6}$ alkyl and $C_{1-6}$ cycloalkyl; and g) a heterocycle substituted with at least one from the group consisting of halogen; cyano; hydroxy; carboxyl; carboxamid; carboxamid substituted with at least one from the group consisting of $C_{1-6}$ alkyl and $C_{3-6}$ cycloalkyl; $C_{1-6}$ alkyl; $C_{1-6}$ alkyl substituted with at least one from the group consisting of halogen, hydroxy, and $R^{\&\&}$—CONH— wherein $R^{\&\&}$ is selected from the group consisting $C_{1-6}$ alkyl and $C_{1-6}$ cycloalkyl; $C_{1-6}$ cycloalkyl; $C_{1-6}$ cycloalkyl substituted with at least one from the group consisting of halogen, hydroxy, and $R^{\%\%}$—CONH— wherein $R^{\%\%}$ is selected from the group consisting $C_{1-6}$ alkyl and $C_{1-6}$ cycloalkyl; $C_{1-6}$ alkoxy; $C_{1-6}$ alkoxy substituted with at least one from the group consisting of halogen, hydroxy, and $R^{\S\S}$ —CONH— wherein $R^{\S\S}$ is selected from the group consisting $C_{1-6}$ alkyl and $C_{1-6}$ cycloalkyl; $C_{3-6}$ cycloalkoxy; $C_{3-6}$ cycloalkoxy substituted with at least one from the group consisting of halogen, hydroxy, and $R^a$—CONH— wherein Ra is selected from the group consisting $C_{1-6}$ alkyl and $C_{1-6}$ cycloalkyl; amino; amino substituted with at least one from the group consisting of $C_{1-6}$ alkyl and $C_{1-6}$ cycloalkyl; $R^{aa}$—CONH— wherein $R^{aa}$ is selected from the group consisting $C_{1-6}$ alkyl and $C_{1-6}$ cycloalkyl; a heteroaryl substituted with at least one from the group consisting of a halogen; an amino; an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; an aryl; an aryl substituted with at least one from the group consisting of a halogen, cyano, $C_{1-6}$ alkoxy, $C_{1-6}$ alkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{1-6}$ alkyl, $C_{1-6}$ alkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; a heteroaryl; a heteroaryl substituted with at least one from the group consisting of halogen, cyano, $C_{1-6}$ alkoxy, $C_{1-6}$ alkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{1-6}$ alkyl, $C_{1-6}$ alkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy, $C_{1-6}$ carbonyl, nitro, thio, $C_{1-6}$ alkylthio, amino, hydroxy, $C_{1-6}$ carbonyl, an amino substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl, $C_{3-7}$ cycloalkyl, $C_{3-7}$ cycloalkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{3-7}$ cycloalkoxy, and $C_{3-7}$ cycloalkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; a $C_{1-6}$ carbonyl; and a $C_{1-6}$ carbonyl substituted with at least one from the group consisting of halogen, $C_{1-6}$ alkoxy, $C_{1-6}$ alkyl, $C_{1-6}$ alkyl substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl, nitro, thio, $C_{1-6}$ alkylthio, amino, and an amino substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl;

$R^1$ is an acid isostere having one or two lone pairs or an acidic proton, or both; or a pharmaceutically acceptable salt or solvate thereof.

In a still further embodiment of the present invention the compound is selected from a compound of formula II

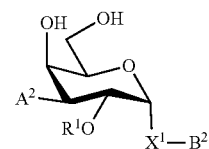

(II)

wherein the pyranose ring is α-D-galactopyranose, wherein $A^2$ is selected from

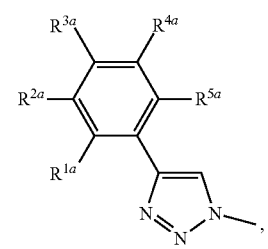

2a

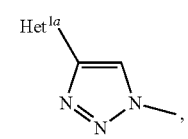

3a

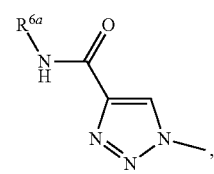

4a

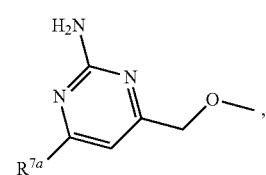

5a

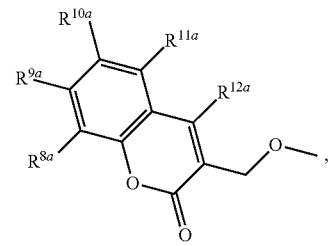

6a

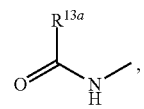

7a

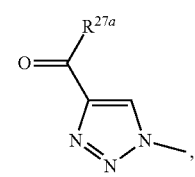

8a wherein $Het^{1a}$ is selected from a five or six membered heteroaromatic ring, optionally substituted with a group selected from Br; F; Cl; CN; $NR^{19a}R^{20a}$, wherein $R^{19a}$ and $R^{20a}$ are independently selected from H, $C_{1-3}$ alkyl, cyclopropyl, iso-propyl, —C(=O)—$R^{21a}$, wherein $R^{21a}$ is selected from H and $C_{1-3}$ alkyl; $C_{1-3}$ alkyl, optionally substituted with a F; cyclopropyl, optionally substituted with a F; iso-propyl, optionally substituted with a F; O-cyclopropyl optionally substituted with a F; O-isopropyl optionally substituted with a F; and $OC_{1-3}$ alkyl optionally substituted with a F;

wherein $R^{1a}$—$R^{5a}$ are independently selected from H, CN, $NH_2$, Cl, F, methyl optionally substituted with a F, and $OCH_3$ optionally substituted with a F;

wherein $R^{6a}$ is selected from $C_{1-6}$ alkyl optionally substituted with a halogen, branched $C_{3-6}$ alkyl and $C_{3-7}$ cycloalkyl;

wherein $R^{7a}$ is selected from a five or six membered heteroaromatic ring, optionally substituted with a group selected from Br, F, Cl, methyl optionally substituted with a F, and $OCH_3$ optionally substituted with a F, and a phenyl optionally substituted with a group selected from Br, F, Cl, methyl optionally substituted with a F, and $OCH_3$ optionally substituted with a F;

wherein $R^{8a}$—$R^{12a}$ are independently selected from H, F, methyl optionally substituted with a F, and $OCH_3$ optionally substituted with a F;

wherein $R^{13a}$ is a five or six membered heteroaromatic ring optionally substituted with a group selected from H, OH, F, methyl optionally substituted with a F, and $OCH_3$ optionally substituted with a F, or an aryl, such as phenyl or naphthyl, optionally substituted with a group selected from H, OH, F, methyl optionally substituted with a F, and $OCH_3$ optionally substituted with a F;

$X^1$ is selected from S, SO, $SO_2$, O, C=O, and $CR^{32a}R^{33a}$ wherein $R^{32a}$ and $R^{33a}$ are independently selected from hydrogen, OH, or halogen;

wherein $R^{27a}$ is selected from a $C_{1-6}$ alkyl, branched $C_{3-6}$ alkyl, $C_{1-6}$ alkoxy and branched $C_{3-6}$ alkoxy;

$B^2$ is selected from a) a $C_{1-6}$ alkyl or branched $C_{3-6}$ alkyl substituted with a five or six membered heteroaromatic ring, optionally substituted with a substituent selected from CN, a halogen, methyl optionally substituted with a F, $OCH_3$ optionally substituted with a F, $OCH_2CH_3$ optionally substituted with a F, OH, and $R^{14a}$—CONH— wherein $R^{14a}$ is selected from $C_{1-3}$ alkyl and cyclopropyl; or a $C_{1-6}$ alkyl substituted with a phenyl, optionally substituted with a substituent selected from CN, a halogen, methyl optionally substituted with a F, $OCH_3$ optionally substituted with a F, $OCH_2CH_3$ optionally substituted with a F, OH, and $R^{15a}$—CONH— wherein $R^{15a}$ is selected from $C_{1-3}$ alkyl and cyclopropyl; b) an aryl, such as phenyl or naphthyl, optionally substituted with a group selected from a halogen; CN; —COOH; —$CONR^{22a}R^{23a}$, wherein $R^{22a}$ and $R^{23a}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; $OC_{1-3}$ alkyl, optionally substituted with a F; O-cyclopropyl, optionally substituted with a F; O-isopropyl, optionally substituted with a F; $NR^{28a}R^{29a}$, wherein $R^{28a}$ and $R^{29a}$ are independently selected from H, $C_{1-3}$ alkyl and isopropyl; OH; and $R^{16a}$—CONH— wherein $R^{16a}$ is selected from $C_{1-3}$ alkyl and cyclopropyl; c) a $C_{5-7}$ cycloalkyl, optionally substituted with a substituent selected from a halogen, CN, methyl optionally substituted with a F, $OCH_3$ optionally substituted with a F, $OCH_2CH_3$ optionally substituted with a F, OH, and $R^{17a}$—CONH— wherein $R^{17a}$ is selected from $C_{1-3}$ alkyl and cyclopropyl; and d) a heterocycle, such as heteroaryl or heterocycloalkyl, optionally substituted with a group selected from a halogen; CN; —COOH; —$CONR^{24a}R^{25a}$, wherein $R^{24a}$ and $R^{25a}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; $OC_{1-3}$ alkyl, optionally substituted with a F; O-cyclopropyl, optionally substituted with a F; O-isopropyl, optionally substituted with a F; $NR^{30a}R^{31a}$, wherein $R^{30a}$ and $R^{31a}$ are independently selected from H, $C_{1-3}$ alkyl and isopropyl; OH; and $R^{18a}$—CONH— wherein $R^{18a}$ is selected from $C_{1-3}$ alkyl and cyclopropyl; e) a $C_{1-6}$ alkyl or branched $C_{3-6}$ alkyl;

$R^1$ is an acid isostere having one or two lone pairs or an acidic proton, or both; or a pharmaceutically acceptable salt or solvate thereof.

In a further embodiment of the present invention the compound is selected from a compound of formula II

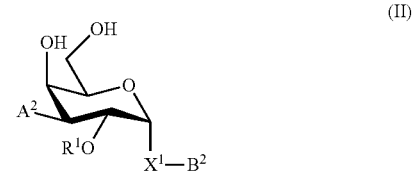

(II)

wherein the pyranose ring is α-D-galactopyranose, $A^2$ is

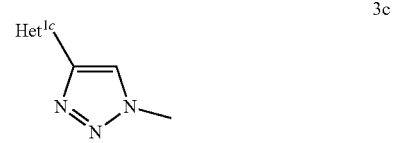

3c wherein $Het^{1c}$ is a five or six membered heteroaromatic ring selected from the group consisting of formulas 2 to 9:

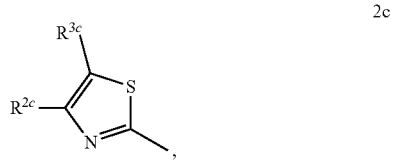

2c

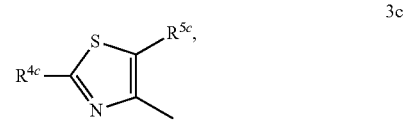

3c

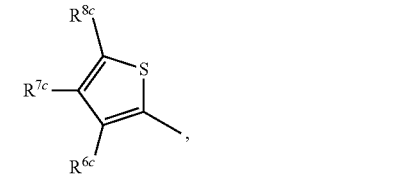

4c

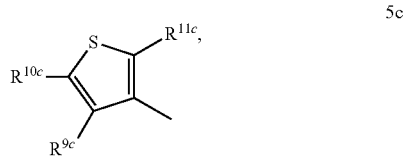

5c

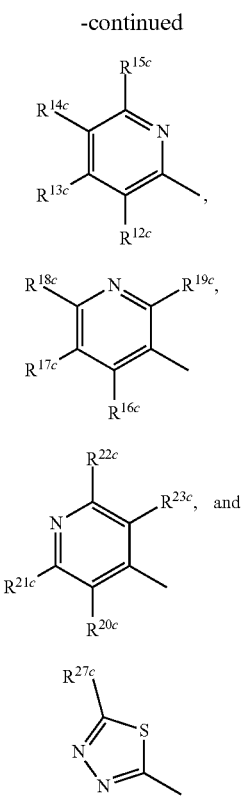

wherein $R^{2c}$ to $R^{23c}$ and $R^{27c}$ are independently selected from H; halogen; OH; CN; SH; S—$C_{1-3}$ alkyl; $C_{1-3}$ alkyl, optionally substituted with a F; cyclopropyl, optionally substituted with a F; iso-propyl, optionally substituted with a F; O-cyclopropyl optionally substituted with a F; O-isopropyl optionally substituted with a F; $OC_{1-3}$ alkyl optionally substituted with a F; $NR^{24c}R^{25c}$, wherein $R^{24c}$ is selected from H, and $C_{1-3}$ alkyl, and $R^{25c}$ is selected from H, $C_{1-3}$ alkyl, and $COR^{26c}$, wherein $R^{26c}$ is selected from H, and $C_{1-3}$ alkyl;

$X^1$ is selected from S, SO, $SO_2$;

$B^2$ is selected from a) a $C_{1-6}$ alkyl or branched $C_{3-6}$ alkyl substituted with a five or six membered heteroaromatic ring, optionally substituted with a substituent selected from CN, a halogen, methyl optionally substituted with a F, $OCH_3$ optionally substituted with a F, $OCH_2CH_3$ optionally substituted with a F, OH, and $R^{2741}$—CONH— wherein $R^{27\#}$ is selected from $C_{1-3}$ alkyl and cyclopropyl; or a $C_{1-6}$ alkyl substituted with a phenyl, optionally substituted with a substituent selected from CN, a halogen, methyl optionally substituted with a F, $OCH_3$ optionally substituted with a F, $OCH_2CH_3$ optionally substituted with a F, OH, and $R^{28c}$—CONH— wherein $R^{28c}$ is selected from $C_{1-3}$ alkyl and cyclopropyl; b) an aryl, such as phenyl or naphthyl, optionally substituted with a group selected from a halogen; CN; —COOH; —$CONR^{29c}R^{30c}$, wherein $R^{29c}$ and $R^{30c}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; $OC_{1-3}$ alkyl, optionally substituted with a F; O-cyclopropyl, optionally substituted with a F; O-isopropyl, optionally substituted with a F; $NR^{31c}R^{32c}$, wherein $R^{31c}$ and $R^{32c}$ are independently selected from H, $C_{1-3}$ alkyl and isopropyl; OH; and $R^{33c}$—CONH—, wherein $R^{33c}$ is selected from $C_{1-3}$ alkyl and cyclopropyl; c) a $C_{5-7}$ cycloalkyl, optionally substituted with a substituent selected from a halogen, CN, methyl optionally substituted with a F, $OCH_3$ optionally substituted with a F, $OCH_2CH_3$ optionally substituted with a F, OH, and $R^{34c}$—CONH— wherein $R^{34c}$ is selected from $C_{1-3}$ alkyl and cyclopropyl; and d) a heterocycle, such as heteroaryl or heterocycloalkyl, optionally substituted with a group selected from a halogen; CN; —COOH; —$CONR^{35c}R^{36c}$, wherein $R^{35c}$ and $R^{36c}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; $OC_{1-3}$ alkyl, optionally substituted with a F; O-cyclopropyl, optionally substituted with a F; O-isopropyl, optionally substituted with a F; $NR^{37c}R^{38c}$, wherein $R^{37c}$ and $R^{38c}$ are independently selected from H, $C_{1-3}$ alkyl and isopropyl; OH; and $R^{39c}$—CONH— wherein $R^{39c}$ is selected from $C_{1-3}$ alkyl and cyclopropyl; e) a $C_{1-6}$ alkyl or branched $C_{3-6}$ alkyl;

$R^1$ is an acid isostere having one or two lone pairs or an acidic proton, or both; or a pharmaceutically acceptable salt or solvate thereof.

In a still further embodiment of the present invention the compound is selected from a compound of formula II

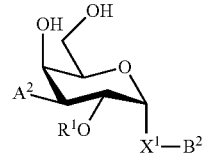

(II)

wherein the pyranose ring is α-D-galactopyranose, $A^2$ is

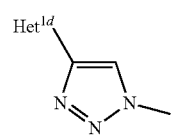

3d wherein the pyranose ring is α-D-galactopyranose, $Het^{1d}$ is selected from the group consisting of

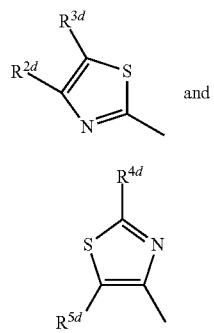

2d and

3d wherein $R^{2d}$ is selected from the group consisting of OH and halogen;

$R^{3d}$ is selected from the group consisting of hydrogen, $C_{1-6}$ alkyl and halogen;

$R^{4d}$ is selected from the group consisting of OH and halogen;

$R^{5d}$ is selected from the group consisting of hydrogen, $C_{1-6}$ alkyl and halogen;

$X^1$ is S;

$B^2$ is selected from a) an aryl, such as phenyl or naphthyl, optionally substituted with a group selected from a halogen; CN; —COOH; —CONR$^{29d}$R$^{30d}$, wherein R$^{29d}$ and R$^{30d}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; OC$_{1-3}$ alkyl, optionally substituted with a F; SC$_{1-3}$ alkyl, optionally substituted with a F; O-cyclopropyl, optionally substituted with a F; O-isopropyl, optionally substituted with a F; NR$^{31d}$R$^{32d}$, wherein R$^{31d}$ and R$^{32d}$ are independently selected from H, $C_{1-3}$ alkyl and isopropyl; OH; and R$^{33d}$—CONH—, wherein R$^{33d}$ is selected from $C_{1-3}$ alkyl and cyclopropyl; b) a heterocycle, such as heteroaryl or heterocycloalkyl, optionally substituted with a group selected from a halogen; CN; —COOH; —CONR$^{35d}$R$^{36d}$, wherein R$^{35d}$ and R$^{36d}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; OC$_{1-3}$ alkyl, optionally substituted with a F; O-cyclopropyl, optionally substituted with a F; SC$_{1-3}$ alkyl, optionally substituted with a F; O-isopropyl, optionally substituted with a F; NR$^{37d}$R$^{38d}$, wherein R$^{37d}$ and R$^{38d}$ are independently selected from H, $C_{1-3}$ alkyl and isopropyl; OH; and R$^{39d}$—CONH— wherein R$^{3911}$ is selected from $C_{1-3}$ alkyl and cyclopropyl;

$R^1$ is an acid isostere having one or two lone pairs or an acidic proton, or both; or a pharmaceutically acceptable salt or solvate thereof.

In a further embodiment of the present invention the compound is selected from a compound of formula II

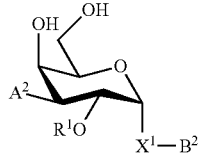

(II)

wherein the pyranose ring is α-D-galactopyranose,
$A^2$ is selected from

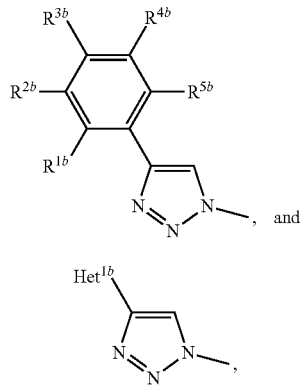

2b

3b wherein Het$^{1b}$ is selected from a pyridinyl, optionally substituted with a group selected from H, CN, Br, Cl, I, F, methyl optionally substituted with a F, OCH$_3$ optionally substituted with a F, and SCH$_3$ optionally substituted with a F; or a pyrimidyl, optionally substituted with a group selected from H, CN, Br, Cl, I, F, methyl optionally substituted with a F, OCH$_3$ optionally substituted with a F, and SCH$_3$ optionally substituted with a F;

wherein R$^{1b}$—R$^{5b}$ are independently selected from a group consisting of H, CN, Br, Cl, I, F, methyl optionally substituted with a F, OCH$_3$ optionally substituted with a F, and SCH$_3$ optionally substituted with a F;

$X^1$ is selected from S, SO, and SO$_2$;

$B^2$ is selected from a) a $C_{1-6}$ alkyl or branched $C_{3-6}$ alkyl substituted with a five or six membered heteroaromatic ring, optionally substituted with a substituent selected from CN, a halogen, methyl optionally substituted with a F, OCH$_3$ optionally substituted with a F, OCH$_2$CH$_3$ optionally substituted with a F, OH, and R$^{14b}$—CONH— wherein R$^{14b}$ is selected from $C_{1-3}$ alkyl and cyclopropyl; or a $C_{1-6}$ alkyl substituted with a phenyl, optionally substituted with a substituent selected from CN, a halogen, methyl optionally substituted with a F, OCH$_3$ optionally substituted with a F, OCH$_2$CH$_3$ optionally substituted with a F, OH, and R$^{15b}$—CONH— wherein R$^{15b}$ is selected from $C_{1-3}$ alkyl and cyclopropyl; b) an aryl, such as phenyl or naphthyl, optionally substituted with a group selected from a halogen; CN; —COOH; —CONR$^{22b}$R$^{23b}$, wherein R$^{22b}$ and R$^{23b}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; OC$_{1-3}$ alkyl, optionally substituted with a F; O-cyclopropyl, optionally substituted with a F; O-isopropyl, optionally substituted with a F; NR$^{28b}$R$^{29b}$, wherein R$^{28b}$ and R$^{29b}$ are independently selected from H, $C_{1-3}$ alkyl and isopropyl; OH; and R$^{16b}$—CONH— wherein R$^{16b}$ is selected from $C_{1-3}$ alkyl and cyclopropyl; c) a $C_{5-7}$ cycloalkyl, optionally substituted with a substituent selected from a halogen, CN, methyl optionally substituted with a F, OCH$_3$ optionally substituted with a F, OCH$_2$CH$_3$ optionally substituted with a F, OH, and R$^{17b}$—CONH— wherein R$^{17b}$ is selected from $C_{1-3}$ alkyl and cyclopropyl; and d) a heterocycle, such as heteroaryl or heterocycloalkyl, optionally substituted with a group selected from a halogen; CN; —COOH; —CONR$^{24b}$R$^{25b}$, wherein R$^{24b}$ and R$^{25b}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; OC$_{1-3}$ alkyl, optionally substituted with a F; O-cyclopropyl, optionally substituted with a F; O-isopropyl, optionally substituted with a F; NR$^{30b}$R$^{31b}$, wherein R$^{30b}$ and R$^{31b}$ are independently selected from H, $C_{1-3}$ alkyl and isopropyl; OH; and R$^{18b}$—CONH— wherein R$^{18b}$ is selected from $C_{1-3}$ alkyl and cyclopropyl; e) a $C_{1-6}$ alkyl or branched $C_{3-6}$ alkyl;

$R^1$ is an acid isostere having one or two lone pairs or an acidic proton, or both; or a pharmaceutically acceptable salt or solvate thereof. In a particular embodiment of the above compound of formula II $A^2$ is

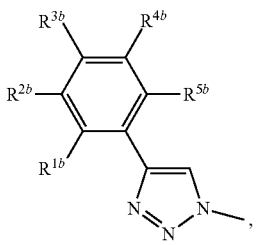

wherein $R^{1b}$—$R^{5b}$ are independently selected from a group consisting of H, CN, Br, Cl, I, F, methyl optionally substituted with a F, $OCH_3$ optionally substituted with a F, and $SCH_3$ optionally substituted with a F;

$X^1$ is S;

$B^2$ is selected from b) a phenyl, optionally substituted with a group selected from a halogen; CN; —COOH; —$CONR^{22b}R^{23b}$, wherein $R^{22b}$ and $R^{23b}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; $OC_{1-3}$ alkyl, optionally substituted with a F; O-cyclopropyl, optionally substituted with a F; O-isopropyl, optionally substituted with a F; $NR^{28b}R^{29b}$, wherein $R^{28b}$ and $R^{29b}$ are independently selected from H, $C_{1-3}$ alkyl and isopropyl; OH; and $R^{16b}$—CONH— wherein $R^{16b}$ is selected from $C_{1-3}$ alkyl and cyclopropyl; d) a heteroaryl, optionally substituted with a group selected from a halogen; CN; —COOH; —$CONR^{24b}R^{25b}$, wherein $R^{24b}$ and $R^{25b}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; $OC_{1-3}$ alkyl, optionally substituted with a F; O-cyclopropyl, optionally substituted with a F; O-isopropyl, optionally substituted with a F; $NR^{30b}R^{31b}$, wherein $R^{30b}$ and $R^{31b}$ are independently selected from H, $C_{1-3}$ alkyl and isopropyl; OH; and $R^{18b}$—CONH— wherein $R^{18b}$ is selected from $C_{1-3}$ alkyl and cyclopropyl;

$R^1$ is an acid isostere having one or two lone pairs or an acidic proton, or both;

or a pharmaceutically acceptable salt or solvate thereof. In a more preferred embodiment of the above compound of formula II $A^2$ is

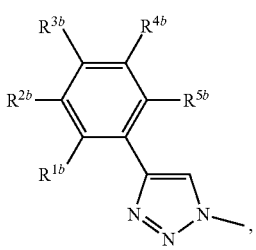

wherein

K $R^{5b}$ are independently selected from a group consisting of H, Cl and F;

$X^1$ is S;

$B^2$ is selected from b) a phenyl substituted with a halogen; and d) a heteroaryl substituted with a halogen;

$R^1$ is an acid isostere having one or two lone pairs or an acidic proton, or both; or a pharmaceutically acceptable salt or solvate thereof. In a most preferred embodiment of the above compound of formula II $A^2$ is

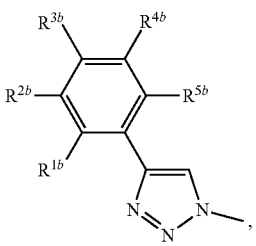

wherein $R^{1b}$ and $R^{5b}$ are hydrogen, and at least one of $R^{2b}$—$R^{4b}$ is independently selected from Cl and F, and the rest is hydrogen;

$X^1$ is S;

$B^2$ is selected from b) a phenyl substituted with a Cl; and d) a pyridinyl substituted with a Br;

$R^1$ is an acid isostere having one or two lone pairs or an acidic proton, or both; or a pharmaceutically acceptable salt or solvate thereof.

In a further embodiment of the compound of formula I or II of the present invention $R^1$ is selected from the group consisting of a) a phosphate, b) a sulphate, c) a $C_{1-6}$ alkyl substituted with a group selected from a phosphate, an oxy phosphonyl, a —COOH, a —$CONHR^2$ wherein $R^2$ is selected from hydrogen, $C_{1-6}$ alkyl, and methylsulphonyl; a heterocycle, such as a heteroaryl or heterocycloalkyl, optionally substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; a —$SO_2$—$NHR^3$ wherein $R^3$ is selected from a heterocycle optionally substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, and a —CO—$R^4$ wherein $R^4$ is selected from a hydrogen and a heterocycle optionally substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; an aryl optionally substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; and d) a branched $C_{3-6}$ alkyl substituted with a group selected from a phosphate, an oxy phosphonyl, a —COOH, a —$CONHR^2$ wherein $R^2$ is selected from hydrogen, $C_{1-6}$ alkyl, and methylsulphonyl; a heterocycle, such as a heteroaryl or heterocycloalkyl, optionally substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; a —$SO_2$—$NHR^3$ wherein $R^3$ is selected from a heterocycle optionally substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, and a —CO—$R^4$ wherein $R^4$ is selected from a hydrogen and a heterocycle optionally substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; an aryl optionally substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl. Each of these groups a) to d) can be made subject of individual embodiments in connection with any one of the above embodiments and aspects of the present invention.

In a still further embodiment of the compound of formula I or II of the present invention $R^1$ is selected from the group consisting of a) a phosphate, b) a sulphate, c) a $C_{1-3}$ alkyl substituted with a group selected from a phosphate, an oxy phosphonyl, a —COOH, a —$CONHR^2$ wherein $R^2$ is selected from hydrogen, $C_{1-3}$ alkyl, and methylsulphonyl; a heteroaryl, optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl; a —$SO_2$—$NHR^3$ wherein $R^3$ is selected from a heterocycle optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl, and a —CO—$R^4$ wherein $R^4$ is selected from a hydrogen and a heterocycle optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl; an aryl optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl; and d) a branched $C_{3-6}$ alkyl substituted with a group selected from a phosphate, an oxy phosphonyl, a —COOH, a —$CONHR^2$ wherein $R^2$ is selected from hydrogen, $C_{1-3}$ alkyl, and methylsulphonyl; a heteroaryl, optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl; a —$SO_2$—$NHR^3$ wherein $R^3$ is selected from a heterocycle optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl, and a —CO—$R^4$ wherein $R^4$ is selected from a hydrogen and a heterocycle optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl; an aryl optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl. Each of these groups a) to d) can be made subject of individual embodiments in connection with any one of the above embodiments and aspects of the present invention.

In a further embodiment of the compound of formula I or II of the present invention $R^1$ is selected from the group consisting of a phosphate, a sulphate and a methyl substituted with a group selected from a phosphate, an oxy phosphonyl, a —COOH, a —$CONHR^2$ wherein $R^2$ is selected from hydrogen, methyl, and methylsulphonyl; oxazolyl; tetrazolyl; a phenyl substituted with at least one from the group consisting of a halogen and hydroxy. Each of these $R^1$ groups can be made subject of individual embodiments in connection with any one of the above embodiments and aspects of the present invention, such as in an embodiment $R^1$ is selected from an oxazolyl; a tetrazolyl; a phenyl substituted with at least one from the group consisting of a halogen and hydroxy. Another embodiment $R^1$ is selected from the group consisting of a phosphate, a sulphate and a methyl substituted with a group selected from a phosphate, an oxy phosphonyl. In a further embodiment $R^1$ is selected from a —COOH, a —$CONHR^2$ wherein $R^2$ is selected from hydrogen, methyl, and methylsulphonyl.

In a further embodiment of the compound of formula I or II of the present invention $R^1$ is selected from the group consisting of a phosphate, a sulphate and a methyl substituted with a group selected from a phosphate, an oxy phosphonyl, a —COOH, a —$CONHR^2$ wherein $R^2$ is methylsulphonyl; oxazolyl; tetrazolyl; a phenyl substituted with at least one from the group consisting of a halogen and hydroxy. Each of these $R^1$ groups can be made subject of individual embodiments in connection with any one of the above embodiments and aspects of the present invention In a still further embodiment of the present invention the compound is selected from the group consisting of 5-Bromopyridin-3-yl 3-deoxy-3-[4-(3,4,5-trifluorophenyl)-1H-1,2,3-triazol-1-yl]-2-O-phospho-1-thio-α-D-galactopyranoside, 3,4-Dichlorphenyl 3-deoxy-3-[4-(3,4,5-trifluorophenyl)-1H-1,2,3-triazol-1-yl]-2-O-phospho-1-thio-α-D-galactopyranoside, 3,4-Dichlorphenyl 3-Deoxy-3-[4-(3,4,5-trifluorophenyl)-1H-1,2,3-triazol-1-yl]-2-O-sulfo-1-thio-α-D-galactopyranoside, 5-Bromopyridin-3-yl 3-Deoxy-3-[4-(3,4,5-trifluorophenyl)-1H-1,2,3-triazol-1-yl]-2-O-sulfo-1-thio-α-D-galactopyranoside, 5-Bromopyridin-3-yl 3-deoxy-3-[4-(3,4,5-trifluorophenyl)-1H-1,2,3-triazol-1-yl]-2-O-[(phosphonooxy)methyl]-1-thio-α-D-galactopyranoside, 3,4-Dichlorphenyl 2-O-carboxymethyl-3-deoxy-3-[4-(3,4,5-trifluorophenyl)-1H-1,2,3-triazol-1-yl]-1-thio-α-D-galactopyranoside, 3,4-Dichlorphenyl 2-O-carboxymethyl-3-deoxy-3-[4-(4-chloro-3,5-difluorophenyl)-1H-1,2,3-triazol-1-yl]-1-thio-α-D-galactopyranoside, 5-Bromopyridin-3-yl 2-O-Carboxymethyl-3-Deoxy-3-[4-(3,4,5-trifluorophenyl)-1H-1,2,3-triazol-1-yl]-1-thio-α-D-galactopyranoside, 3,4-Dichlorphenyl 3-Deoxy-3-[4-(4-chloro-3,5-difluorophenyl)-1H-1,2,3-triazol-1-yl]-2-O-[2-(methylsulfonamido)-2-oxoethyl]-1-thio-α-D-galactopyranoside, 5-Bromopyridin-3-yl 3-Deoxy-3-[4-(3,4,5-trifluorophenyl)-1H-1,2,3-triazol-1-yl]-2-O-(oxazol-4-ylmethyl)-1-thio-α-D-galactopyranoside, 5-Bromopyridin-3-yl 3-Deoxy-3-[4-(3,4,5-difluorophenyl)-1H-1,2,3-triazol-1-yl]-2-O-(3,5-difluoro-4-hydroxybenzyl)-1-thio-α-D-galactopyranoside, 5-Bromopyridin-3-yl 3-Deoxy-3-[4-(3,4,5-trifluorophenyl)-1H-1,2,3-triazol-1-yl]-2-O-[(1H-tetrazol-5-yl)methyl]-1-thio-α-D-galactopyranoside, 3,4-Dichlorphenyl 3-Deoxy-3-[4-(4-chloro-3,5-difluorophenyl)-1H-1,2,3-triazol-1-yl]-2-O-[(1H-tetrazol-5-yl)methyl]-1-thio-α-D-galactopyranoside, 3,4-Dichlorphenyl 3-deoxy-3-[4-(3,4,5-trifluorophenyl)-1H-1,2,3-triazol-1-yl]-2-O-[(1H-tetrazol-5-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(1H-imidazol-2-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(1-methyl-1H-imidazol-2-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(oxazol-2-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(oxazol-5-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(isoxazol-3-yl)methyl]-1-thio-α-D-galactopyranoside, 3,4-Dichlorphenyl 3-[4-(4-chloro-3,5-difluorophenyl)-1H-1,2,3-triazol-1-yl]-3-deoxy-2-O-[(oxazol-4-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(thiazol-4-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(thiazol-5-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(thiazol-2-yl)methyl]-1-thio-α-D-galactopyranoside, 4-Chloro-N,N-dimethyl-benzamide-2-yl 3-deoxy-3-[4-(3,4,5-trifluorophenyl)-1H-1,2,3-triazol-1-yl]-2-O-[(thiazol-4-yl)methyl]-1-thio-α-D-galactopyranoside, 4-Chloro-N,N-dimethyl-benzamide-2-yl 3-deoxy-3-[4-(3,4,5-trifluorophenyl)-1H-1,2,3-triazol-1-yl]-2-O-[(1H-tetrazol-5-yl)methyl]-1-thio-α-D-galactopyranoside, 5-Bromopyridin-3-yl 2-O-carboxypropyl-3-deoxy-3-[4-(3,4,5-trifluorophenyl)-1H-1,2,3-triazol-1-yl]-1-thio-α-D-galactopyranoside, 5-Bromopyridin-3-yl 2-O-(1-carboxy)ethyl)-3-deoxy-3-[4-(3,4,5-trifluorophenyl)-1H-1,2,3-triazol-1-yl]-1-thio-α-D-galactopyranoside (Diastereomer 1), and 5-Bromopyridin-3-yl 2-O-(1-carboxy)ethyl)-3-deoxy-3-[4-(3,4,5-trifluorophenyl)-1H-1,2,3-triazol-1-yl]-1-thio-α-D-galactopyranoside (Diastereomer 2); or a pharmaceutically acceptable salt or solvate thereof.

In a further aspect the present invention relates to a compound of formula I or II of the present invention for use as a medicine.

In a still further aspect the present invention relates to a pharmaceutical composition comprising the compound of formula I or II of the present invention and optionally a pharmaceutically acceptable additive, such as a carrier and/or excipient.

In a further aspect the present invention relates to a compound of formula I or II of the present invention for use in a method for treating a disorder relating to the binding of a galectin-3 to a ligand in a mammal, such as a human. In a further embodiment the disorder is selected from the group consisting of inflammation; fibrosis, such as pulmonary fibrosis, liver fibrosis, kidney fibrosis, ophthalmological fibrosis and fibrosis of the skin and heart; scarring; keloid formation; aberrant scar formation; surgical adhesions; septic shock; cancer, such as carcinomas, sarcomas, leukemias and lymphomas, such as T-cell lymphomas; metastasising cancers; autoimmune diseases, such as psoriasis, rheumatoid arthritis, Crohn's disease, ulcerative colitis, ankylosing spondylitis, systemic lupus erythematosus; metabolic disorders; heart disease; heart failure; pathological angiogenesis, such as ocular angiogenesis or a disease or condition associated with ocular angiogenesis, e.g. neovascularization related to cancer; and eye diseases, such as age-related macular degeneration and corneal neovascularization; atherosclerosis; metabolic diseases such as diabetes; type 2 diabetes; insulin resistens; obesity; Diastolic HF; asthma and other interstitial lung diseases, including Hermansky-Pudlak syndrome, mesothelioma; liver disorders, such as non-alcoholic steatohepatitis.

In a still further aspect the present invention relates to a method for treatment of a disorder relating to the binding of a galectin-3 to a ligand in a mammal, such as a human, wherein a therapeutically effective amount of at least one compound of formula I or II of the present invention is administered to a mammal in need of said treatment. In a further embodiment of the present invention, the disorder is selected from the group consisting of inflammation; fibrosis, such as pulmonary fibrosis, liver fibrosis, kidney fibrosis, ophthalmological fibrosis and fibrosis of the skin and heart; scarring; keloid formation; aberrant scar formation; surgical adhesions; septic shock; cancer, such as carcinomas, sarcomas, leukemias and lymphomas, such as T-cell lymphomas;

metastasising cancers; autoimmune diseases, such as psoriasis, rheumatoid arthritis, Crohn's disease, ulcerative colitis, ankylosing spondylitis, systemic lupus erythematosus; metabolic disorders; heart disease; heart failure; pathological angiogenesis, such as ocular angiogenesis or a disease or condition associated with ocular angiogenesis, e.g. neovascularization related to cancer; and eye diseases, such as age-related macular degeneration and corneal neovascularization; atherosclerosis; metabolic diseases such as diabetes; type 2 diabetes; insulin resistens; obesity; Diastolic HF; asthma and other interstitial lung diseases, including Hermansky-Pudlak syndrome, mesothelioma; liver disorders, such as non-alcoholic steatohepatitis.

Another aspect of the present invention concerns combination therapy involving administering a compound of formula I or II of the present invention together with a therapeutically active compound different from the compound of the present invention (interchangeable with "a different therapeutically active compound"). In one embodiment the present invention relates to a combination of a compound of formula I or II of the present invention and a different therapeutically active compound for use in treatment of a disorder relating to the binding of a galectin-3 to a ligand in a mammal. Such disorders are disclosed below.

In an embodiment of the present invention, a therapeutically effective amount of at least one compound of formula I or II of the present invention is administered to a mammal in need thereof in combination with a different therapeutically active compound. In a further embodiment, said combination of a compound together with a different therapeutically active compound is administered to a mammal suffering from a disorder selected from the group consisting of inflammation; fibrosis, such as pulmonary fibrosis, liver fibrosis, kidney fibrosis, ophthalmological fibrosis and fibrosis of the skin and heart; scarring; keloid formation; aberrant scar formation; surgical adhesions; septic shock; cancer, such as carcinomas, sarcomas, leukemias and lymphomas, such as T-cell lymphomas; metastasising cancers; autoimmune diseases, such as psoriasis, rheumatoid arthritis, Crohn's disease, ulcerative colitis, ankylosing spondylitis, systemic lupus erythematosus; metabolic disorders; heart disease; heart failure; pathological angiogenesis, such as ocular angiogenesis or a disease or condition associated with ocular angiogenesis, e.g. neovascularization related to cancer; and eye diseases, such as age-related macular degeneration and conical neovascularization; atherosclerosis; metabolic diseases such as diabetes; type 2 diabetes; insulin resistens; obesity; Diastolic heart failure (HF); asthma and other interstitial lung diseases, including Hermansky-Pudlak syndrome, mesothelioma; liver disorders, such as non-alcoholic steatohepatitis.

A non-limiting group of cancers given as examples of cancers that may be treated, managed and/or prevented by administration of a compound of formula I or II of the present invention in combination with a different therapeutically active compound is selected from: colon carcinoma, breast cancer, pancreatic cancer, ovarian cancer, prostate cancer, fibrosarcoma, myxosarcoma, liposarcoma, chondrosarcoma, osteogenic sarcoma, chordoma, angiosarcoma, endotheliosarcoma, lymphangeosarcoma, lymphangeoendothelia sarcoma, synovioma, mesothelioma, Ewing's sarcoma, leiomyosarcoma, rhabdomyosarcoma, squamous cell carcinoma, basal cell carcinoma, adenocarcinoma, sweat gland carcinoma, sebaceous gland carcinoma, papillary carcinoma, papillary adenocarcinomas, cystandeocarcinoma, medullary carcinoma, bronchogenic carcinoma, renal cell carcinoma, hepatoma, bile duct carcinoma, choriocarcinoma, seminoma, embryonal carcinoma, Wilms' tumor, cervical cancer, testicular tumor, lung carcinoma, small cell lung carcinoma, bladder carcinoma, epithelial carcinoma, glioblastomas, neuronomas, craniopharingiomas, schwannomas, glioma, astrocytoma, medulloblastoma, craniopharyngioma, ependymoma, pinealoma, hemangioblastoma, acoustic neuroama, oligodendroglioma, meningioma, melanoma, neuroblastoma, retinoblastoma, leukemias and lymphomas, acute lymphocytic leukemia and acute myelocytic polycythemia vera, multiple myeloma, Waldenstrom's macroglobulinemia, and heavy chain disease, acute nonlymphocytic leukemias, chronic lymphocytic leukemia, chronic myelogenous leukemia, Hodgkin's Disease, non-Hodgkin's lymphomas, rectum cancer, urinary cancers, uterine cancers, oral cancers, skin cancers, stomach cancer, brain tumors, liver cancer, laryngeal cancer, esophageal cancer, mammary tumors, childhood-null acute lymphoid leukemia (ALL), thymic ALL, B-cell ALL, acute myeloid leukemia, myelomonocytoid leukemia, acute megakaryocytoid leukemia, Burkitt's lymphoma, acute myeloid leukemia, chronic myeloid leukemia, and T cell leukemia, small and large non-small cell lung carcinoma, acute granulocytic leukemia, germ cell tumors, endometrial cancer, gastric cancer, cancer of the head and neck, chronic lymphoid leukemia, hairy cell leukemia and thyroid cancer.

In some aspects of the present invention, the administration of at least one compound of formula I or II of the present invention and at least one additional therapeutic agent demonstrates therapeutic synergy. In some aspects of the methods of the present invention, a measurement of response to treatment observed after administering both at least one compound of formula I or II of the present invention and the additional therapeutic agent is improved over the same measurement of response to treatment observed after administering either the at least one compound of formula I or II of the present invention or the additional therapeutic agent alone.

A further aspect of the present invention concerns combination therapy involving administering a compound of formula I or II of the present invention together with an anti-fibrotic compound different from the compound of formula I or II of the present invention to a mammal in need thereof. In a further embodiment, such anti-fibrotic compound may be selected from the following non-limiting group of anti-fibrotic compounds: pirfenidone, nintedanib, simtuzumab (GS-6624, AB0024), BG00011 (STX100), PRM-151, PRM-167, PEG-FGF21, BMS-986020, FG-3019, MN-001, IW001, SAR156597, GSK2126458, and PBI-4050.

A still further aspect of the present invention concerns combination therapy involving administering a compound of formula I or II of the present invention in combination with a further conventional cancer treatment such as chemotherapy or radiotherapy, or treatment with immunostimulating substances, gene therapy, treatment with antibodies and treatment using dendritic cells, to a mammal in need thereof.

In an embodiment the compound of the present invention is administered together with at least one additional therapeutic agent selected from an antineoplastic chemotherapy agent. In a further embodiment, the antineoplastic chemotherapeutic agent is selected from: all-trans retinoic acid, Actimide, Azacitidine, Azathioprine, Bleomycin, Carboplatin, Capecitabine, Cisplatin, Chlorambucil, Cyclophosphamide, Cytarabine, Daunorubicin, Docetaxel, Doxifluridine, Doxorubicin, Epirubicin, Etoposide, Fludarabine, Fluorouracil, Gemcitabine, Hydroxyurea, Idarubicin, Irinotecan, Lenalidomide, Leucovorin, Mechlorethamine, Melphalan, Mercaptopurine, Methotrexate, Mitoxantrone, Oxaliplatin, Paclitaxel, Pemetrexed, Revlimid, Temozolomide, Teniposide, Thioguanine, Valrubicin, Vinblastine, Vincristine, Vindesine and Vinorelbine. In one embodiment, a chemotherapeutic agent for use in the combination of the present agent may, itself, be a combination of different chemotherapeutic agents. Suitable combinations include FOLFOX and IFL. FOLFOX is a combination which includes 5-fluorouracil (5-FU), leucovorin, and oxaliplatin. IFL treatment includes irinotecan, 5-FU, and leucovorin.

In a further embodiment of the present invention, the further conventional cancer treatment includes radiation therapy. In some embodiments, radiation therapy includes localized radiation therapy delivered to the tumor. In some embodiments, radiation therapy includes total body irradiation.

In other embodiments of the present invention the further cancer treatment is selected from the group of immunostimulating substances e.g. cytokines and antibodies. Such cytokines may be selected from the group consisting of, but not limited to: GM-CSF, type I IFN, interleukin 21, interleukin 2, interleukin 12 and interleukin 15. The antibody is preferably an immunostimulating antibody such as anti-CD40 or anti-CTLA-4 antibodies. The immunostimulatory substance may also be a substance capable of depletion of immune inhibitory cells (e.g. regulatory T-cells) or factors, said substance may for example be E3 ubiquitin ligases. E3 ubiquitin ligases (the HECT, RING and U-box proteins) have emerged as key molecular regulators of immune cell function, and each may be involved in the regulation of immune responses during infection by targeting specific inhibitory molecules for proteolytic destruction. Several HECT and RING E3 proteins have now also been linked to the induction and maintenance of immune self-tolerance: c-Cbl, Cbl-b, GRAIL, Itch and Nedd4 each negatively regulate T cell growth factor production and proliferation.

In some embodiments of the present invention the compound of formula I or II of the present invention is administered together with at least one additional therapeutic agent selected from a checkpoint inhibitor. In some embodiments of the invention, the checkpoint inhibitor is acting on one or more of the following, non-limiting group of targets: CEACAM1, galectin-9, TIM3, CD80, CTLA4, PD-1, PD-L1, HVEM, BTLA, CD160, VISTA, B7-H4, B7-2, CD155, CD226, TIGIT, CD96, LAGS, GITF, OX40, CD137, CD40, IDO, and TDO. These are known targets and some of these targets are described in Melero et al., Nature Reviews Cancer (2015).

In some embodiments of the present invention the compound of formula I or II of the present invention is administered together with at least one additional therapeutic agent selected from an inhibitor of indoleamine-2,3-dioxygenase (IDO).

In some embodiments of the present invention the compound of formula I or II of the present invention is administered together with at least one additional therapeutic agent selected from one or more inhibitors of the CTLA4 pathway. In some embodiments, the inhibitor of the CTLA4 pathway is selected from one or more antibodies against CTLA4.

In some embodiments of the present invention the compound of formula I or II of the present invention is administered together with at least one additional therapeutic agent selected from one or more inhibitors of the PD-1/PD-L pathway. In some embodiments, the one or more inhibitors of the PD-1/PD-L pathway are selected from one or more antibodies against PD-1, PD-L1, and/or PD-L2.

In a still further aspect the present invention relates to a process of preparing a compound of formula I and II defined as above under formula I and II, or a pharmaceutically acceptable salt thereof comprising the step a1):

a1) Reacting a compound of Formula I or II, wherein the OH in the 4 and 6-position of the galactoside ring is protected with a protection group such as benzylidene and $R^1$ is a hydrogen, with a reagent such as $POCl_3$ in the presence of a base such as DIEA to give an intermediate which is treated with water to give a compound of formula I or II wherein $R^1$ is phosphate ester ($—OP(=O)OH_2$); or with a reagent such as sulfurtrioxide-triethylamine complex to give a compound of formula I or II wherein $R^1$ is sulfate ($—SO_2OH$); or with a reagent such as paraformaldehyde followed by tetrabutylammouniumphosphate to give a compound of formula I or II wherein $R^1$ is methylphosphate ($CH_2OP(=O)OH_2$); or with a reagent such as di-tertbutyl chloromethylphosphate in the presence of AgO and NaI to give an intermediate which is treated with TFA to give a compound of formula I or II wherein $R^1$ is methylphosphate ($CH_2OP(=O)OH_2$); or with a compound of formular $R^1Y^1$ wherein $R^1$ is defined as for formula I or II and $Y^1$ is a leaving group, such as an halide, tosyl- or methanesulfonyl.

DETAILED DESCRIPTION

The compounds of the present invention are novel galactopyranose compounds that unexpectedly have good solubility and can be used to increase the maximum dose resulting in dose correlated bioavailability. The compounds of the present invention have high affinity to galectin 3 and inhibits galectin 3. As further shown the compounds of the present invention have high selectivity towards galectin 3 over galectin 1. Here compounds have been developed in which one modifying group is introduced at the C2 oxygen of a galactopyranose.

Preferably, the pyranose ring is α-D-galactopyranose which compounds have very good solubility and suitability as galectin 3 inhibitors. In particular, the galactopyranose ring with a $C_2$ modification have aqueous solubility above 1.5 mg/ml, and in some instances above 10 mg/ml.

In broad aspect the present invention concerns a compound of formula (I)

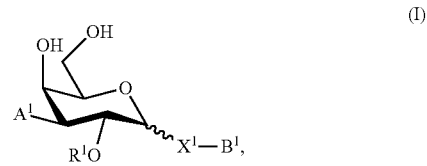

wherein the pyranose ring is α- or β-D-galactopyranose (as indicated by wavy line); and wherein $R^1$, $A^1$, $X^1$ and $B^1$ are as defined above.

In one embodiment $A^1$ is selected from a heteroaryl substituted with at least one from the group consisting of a halogen; CN; $C_{2-6}$ alkenyl; $C_{2-6}$ alkynyl; carboxyl; $C_{1-6}$ alkoxy; $C_{1-6}$ thioalkyl; an amino; an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; an aryl; an aryl substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{1-6}$ alkyl, $C_{1-6}$ alkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; a heteroaryl; a heteroaryl substituted with at least one from the group consisting of halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{1-6}$ alkyl, $C_{1-6}$ alkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, nitro, thio, $C_{1-6}$ alkylthio, amino, hydroxy, $C_{1-6}$ carbonyl, an amino substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl, $C_{3-7}$ cycloalkyl, $C_{3-7}$ cycloalkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{3-7}$ cycloalkoxy, and $C_{3-7}$ cycloalkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; a $C_{1-6}$ carbonyl; a $C_{1-6}$ carbonyl substituted with at least one from the group consisting of halogen, $C_{1-6}$ alkoxy, $C_{1-6}$ alkyl, $C_{1-6}$ alkyl substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl, nitro, thio, $C_{1-6}$ alkylthio, amino, and an amino substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl. In a more specific embodiment $A^1$ is a heteroaryl substituted with an aryl substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl. In a still more specific embodiment $A^1$ is a triazolyl, such as a 1,2,3-triazolyl, substituted with a phenyl substituted with at least one halogen, such a 1, 2 or 3 F, or 2F and one Cl.

In another embodiment $X^1$ is selected from the group consisting of O and S. Preferably $X^1$ is S.

In a further embodiment $B^1$ is selected from the group consisting of d) an aryl substituted with at least one from the group consisting of halogen; cyano; hydroxy; carboxyl; carboxamid; carboxamid substituted with at least one from the group consisting of $C_{1-6}$ alkyl and $C_{3-6}$ cycloalkyl; $C_{1-6}$ alkyl; $C_{1-6}$ alkyl substituted with at least one from the group consisting of halogen, hydroxy, and $R^\&$—CONH— wherein $R^\&$ is selected from the group consisting $C_{1-6}$ alkyl and $C_{1-6}$ cycloalkyl; $C_{1-6}$ cycloalkyl; $C_{1-6}$ cycloalkyl substituted with at least one from the group consisting of halogen, hydroxy, and $R^{\%}$-CONH— wherein $R^{\%}$ is selected from the group consisting $C_{1-6}$ alkyl and $C_{1-6}$ cycloalkyl; $C_{1-6}$ alkoxy; $C_{1-6}$ alkoxy substituted with at least one from the group consisting of halogen, hydroxy, and $R^\S$ —CONH— wherein $R^\S$ is selected from the group consisting $C_{1-6}$ alkyl and $C_{1-6}$ cycloalkyl; $C_{3-6}$ cycloalkoxy; $C_{3-6}$ cycloalkoxy substituted with at least one from the group consisting of halogen, hydroxy, and $R^*$—CONH— wherein $R^*$ is selected from the group consisting $C_{1-6}$ alkyl and $C_{1-6}$ cycloalkyl; amino; amino substituted with at least one from the group consisting of $C_{1-6}$ alkyl and $C_{1-6}$ cycloalkyl; and $R^{}$—CONH— wherein $R^{}$ is selected from the group consisting $C_{1-6}$ alkyl and $C_{1-6}$ cycloalkyl; and g) a heteroaryl substituted with at least one from the group consisting of halogen; cyano; hydroxy; carboxyl; carboxamid; carboxamid substituted with at least one from the group consisting of $C_{1-6}$ alkyl and $C_{3-6}$ cycloalkyl; $C_{1-6}$ alkyl; $C_{1-6}$ alkyl substituted with at least one from the group consisting of halogen, hydroxy, and $R^{\&\&}$—CONH— wherein $R^{\&\&}$ is selected from the group consisting $C_{1-6}$ alkyl and $C_{1-6}$ cycloalkyl; $C_{1-6}$ cycloalkyl; $C_{1-6}$ cycloalkyl substituted with at least one from the group consisting of halogen, hydroxy, and $R^{\%\%}$—CONH— wherein $R^{\%\%}$ is selected from the group consisting $C_{1-6}$ alkyl and $C_{1-6}$ cycloalkyl; $C_{1-6}$ alkoxy; $C_{1-6}$ alkoxy substituted with at least one from the group consisting of halogen, hydroxy, and $R''$—CONH— wherein $R''$ is selected from the group consisting $C_{1-6}$ alkyl and $C_{1-6}$ cycloalkyl; $C_{3-6}$ cycloalkoxy; $C_{3-6}$ cycloalkoxy substituted with at least one from the group consisting of halogen, hydroxy, and $R^a$— CONH— wherein W; is selected from the group consisting $C_{1-6}$ alkyl and $C_{1-6}$ cycloalkyl; amino; amino substituted with at least one from the group consisting of $C_{1-6}$ alkyl and $C_{1-6}$ cycloalkyl; $R^{aa}$—CONH— wherein $R^{aa}$ is selected from the group consisting $C_{1-6}$ alkyl and $C_{1-6}$ cycloalkyl; a heteroaryl substituted with at least one from the group consisting of a halogen; an amino; an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; an aryl; an aryl substituted with at least one from the group consisting of a halogen, cyano, $C_{1-6}$ alkoxy, $C_{1-6}$ alkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{1-6}$ alkyl, $C_{1-6}$ alkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; a heteroaryl; a heteroaryl substituted with at least one from the group consisting of halogen, cyano, $C_{1-6}$ alkoxy, $C_{1-6}$ alkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{1-6}$ alkyl, $C_{1-6}$ alkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, nitro, thio, $C_{1-6}$ alkylthio, amino, hydroxy, $C_{1-6}$ carbonyl, an amino substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl, $C_{3-7}$ cycloalkyl, $C_{3-7}$ cycloalkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{3-7}$ cycloalkoxy, and $C_{3-7}$ cycloalkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; a $C_{1-6}$ carbonyl; and a $C_{1-6}$ carbonyl substituted with at least one from the group consisting of halogen, $C_{1-6}$ alkoxy, $C_{1-6}$ alkyl, $C_{1-6}$ alkyl substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl, nitro, thio, $C_{1-6}$ alkylthio, amino, and an amino substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl. Preferably $B^1$ is selected from the group consisting of d) a phenyl substituted with at least one from the group consisting of halogen; cyano; hydroxy; carboxyl; carboxamid; carboxamid substituted with at least one from the group consisting of $C_{1-6}$ alkyl and $C_{3-6}$ cycloalkyl; $C_{1-6}$ alkyl; $C_{1-6}$ alkyl substituted with at least one from the group consisting of halogen, hydroxy, and $R^{\&}$—CONH— wherein $R^{\&}$ is selected from the group consisting $C_{1-6}$ alkyl and $C_{1-6}$ cycloalkyl; $C_{1-6}$ cycloalkyl; $C_{1-6}$ cycloalkyl substituted with at least one from the group consisting of halogen, hydroxy, and R %—CONH— wherein R % is selected from the group consisting $C_{1-6}$ alkyl and $C_{1-6}$ cycloalkyl; $C_{1-6}$ alkoxy; $C_{1-6}$ alkoxy substituted with at least one from the group consisting of halogen, hydroxy, and $R^{\S}$ —CONH— wherein $R^{\S}$ is selected from the group consisting $C_{1-6}$ alkyl and $C_{1-6}$ cycloalkyl; $C_{3-6}$ cycloalkoxy; $C_{3-6}$ cycloalkoxy substituted with at least one from the group consisting of halogen, hydroxy, and R*—CONH— wherein R* is selected from the group consisting $C_{1-6}$ alkyl and $C_{1-6}$ cycloalkyl; amino; amino substituted with at least one from the group consisting of $C_{1-6}$ alkyl and $C_{1-6}$ cycloalkyl; and R—CONH— wherein R is selected from the group consisting $C_{1-6}$ alkyl and $C_{1-6}$ cycloalkyl; and g) a pyridinyl substituted with at least one from the group consisting of halogen; cyano; hydroxy; carboxyl; carboxamid; carboxamid substituted with at least one from the group consisting of $C_{1-6}$ alkyl and $C_{3-6}$ cycloalkyl; $C_{1-6}$ alkyl; $C_{1-6}$ alkyl substituted with at least one from the group consisting of halogen, hydroxy, and $R^{\&\&}$—CONH— wherein $R^{\&\&}$ is selected from the group consisting $C_{1-6}$ alkyl and $C_{1-6}$ cycloalkyl; $C_{1-6}$ cycloalkyl; $C_{1-6}$ cycloalkyl substituted with at least one from the group consisting of halogen, hydroxy, and $R^{\%\%}$—CONH— wherein $R^{\%\%}$ is selected from the group consisting $C_{1-6}$ alkyl and $C_{1-6}$ cycloalkyl; $C_{1-6}$ alkoxy; $C_{1-6}$ alkoxy substituted with at least one from the group consisting of halogen, hydroxy, and $R^{\S\S}$ —CONH— wherein $R^{\S\S}$ is selected from the group consisting $C_{1-6}$ alkyl and $C_{1-6}$ cycloalkyl; $C_{3-6}$ cycloalkoxy; $C_{3-6}$ cycloalkoxy substituted with at least one from the group consisting of halogen, hydroxy, and $R^{a}$—CONH— wherein W; is selected from the group consisting $C_{1-6}$ alkyl and $C_{1-6}$ cycloalkyl; amino; amino substituted with at least one from the group consisting of $C_{1-6}$ alkyl and $C_{1-6}$ cycloalkyl; $R^{aa}$—CONH— wherein $R^{aa}$ is selected from the group consisting $C_{1-6}$ alkyl and $C_{1-6}$ cycloalkyl; a heteroaryl substituted with at least one from the group consisting of a halogen; an amino; an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; an aryl; an aryl substituted with at least one from the group consisting of a halogen, cyano, $C_{1-6}$ alkoxy, $C_{1-6}$ alkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{1-6}$ alkyl, $C_{1-6}$ alkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; a heteroaryl; a heteroaryl substituted with at least one from the group consisting of halogen, cyano, $C_{1-6}$ alkoxy, $C_{1-6}$ alkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{1-6}$ alkyl, $C_{1-6}$ alkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, nitro, thio, $C_{1-6}$ alkylthio, amino, hydroxy, $C_{1-6}$ carbonyl, an amino substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl, $C_{3-7}$ cycloalkyl, $C_{3-7}$ cycloalkyl substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, $C_{3-7}$ cycloalkoxy, and $C_{3-7}$ cycloalkoxy substituted with at least one from the group consisting of a halogen, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; a $C_{1-6}$ carbonyl; and a $C_{1-6}$ carbonyl substituted with at least one from the group consisting of halogen, $C_{1-6}$ alkoxy, $C_{1-6}$ alkyl, $C_{1-6}$ alkyl substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl, nitro, thio, $C_{1-6}$ alkylthio, amino, and an amino substituted with at least one from the group consisting of halogen, $C_{1-6}$ alkoxy, $C_{1-6}$ alkyl, $C_{3-7}$ cycloalkyl, nitro, thio, $C_{1-6}$ alkylthio, amino, hydroxy and $C_{1-6}$ carbonyl. Most preferably $B^1$ is selected from the group consisting of d) a phenyl substituted with at least one halogen, such as 1 or 2 Cl; and g) a pyridinyl substituted with at least one halogen, such as 1 Br.

In a further embodiment of the compound of formula I or II of the present invention $R^1$ is selected from the group consisting of a) a phosphate, b) a sulphate, c) a $C_{1-6}$ alkyl substituted with a group selected from a phosphate, an oxy phosphonyl, a —COOH, a —CONHR$^2$ wherein R$^2$ is selected from hydrogen, $C_{1-6}$ alkyl, and methylsulphonyl; a heterocycle, such as a heteroaryl or heterocycloalkyl, optionally substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; a —$SO_2$—$NHR^3$ wherein $R^3$ is selected from a heterocycle optionally substituted with at least one from the group consisting of a halogen, CN, $C_{2-6}$ alkenyl, $C_{2-6}$ alkynyl, carboxyl, $C_{1-6}$ alkoxy, thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, alkylthio, amino, hydroxy and $C_{1-6}$ carbonyl, and a —CO—$R^4$ wherein $R^4$ is selected from a hydrogen and a heterocycle optionally substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; an aryl optionally substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; and d) a branched $C_{3-6}$ alkyl substituted with a group selected from a phosphate, an oxy phosphonyl, a —COOH, a —$CONHR^2$ wherein $R^2$ is selected from hydrogen, $C_{1-6}$ alkyl, and methylsulphonyl; a heterocycle, such as a heteroaryl or heterocycloalkyl, optionally substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; a —$SO_2$—$NHR^3$ wherein $R^3$ is selected from a heterocycle optionally substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl, and a —CO—$R^4$ wherein $R^4$ is selected from a hydrogen and a heterocycle optionally substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl; an aryl optionally substituted with at least one from the group consisting of a halogen, CN, $C_{2-6}$ alkenyl, $C_{2-6}$ alkynyl, carboxyl, $C_{1-6}$ alkoxy, $C_{1-6}$ thioalkyl, $C_{1-6}$ alkyl, nitro, thio, $C_{1-6}$ alkylthio, amino, hydroxy, $C_{1-6}$ carbonyl, an amino, and an amino substituted with at least one from the group consisting of halogen, $C_{1-6}$ alkoxy, $C_{1-6}$ alkyl, nitro, thio, $C_{1-6}$ alkylthio, amino, hydroxy and $C_{1-6}$ carbonyl.

In a still further embodiment of the compound of formula I or II of the present invention $R^1$ is selected from $R^1$ is selected from the group consisting of a) a phosphate, b) a sulphate, c) a $C_{1-3}$ alkyl substituted with a group selected from a phosphate, an oxy phosphonyl, a —COOH, a —$CONHR^2$ wherein $R^2$ is selected from hydrogen, $C_{1-3}$ alkyl, and methylsulphonyl; a heteroaryl, optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl; a —$SO_2$—$NHR^3$ wherein $R^3$ is selected from a heterocycle optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl, and a —CO—$R^4$ wherein $R^4$ is selected from a hydrogen and a heterocycle optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl; an aryl optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl; and d) a branched $C_{3-6}$ alkyl substituted with a group selected from a phosphate, an oxy phosphonyl, a —COOH, a —$CONHR^2$ wherein $R^2$ is selected from hydrogen, $C_{1-3}$ alkyl, and methylsulphonyl; a heteroaryl, optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl; a —$SO_2$—$NHR^3$ wherein $R^3$ is selected from a heterocycle optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl, and a —CO—$R^4$ wherein $R^4$ is selected from a hydrogen and a heterocycle optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl; an aryl optionally substituted with at least one from the group consisting of a halogen, CN, $C_{2-4}$ alkenyl, $C_{2-4}$ alkynyl, carboxyl, $C_{1-3}$ alkoxy, $C_{1-3}$ thioalkyl, $C_{1-3}$ alkyl, nitro, thio, $C_{1-3}$ alkylthio, amino, hydroxy, $C_{1-3}$ carbonyl, an amino, and an amino substituted with at least one from the group consisting of halogen, $C_{1-3}$ alkoxy, $C_{1-3}$ alkyl, nitro, thio, $C_{1-3}$ alkylthio, amino, hydroxy and $C_{1-3}$ carbonyl.

In a further embodiment $R^1$ is selected from the group consisting of a phosphate, a sulphate and a $C_{1-4}$ alkyl substituted with a group selected from a phosphate, an oxy phosphonyl, a —COOH, a —CONHR$^2$ wherein R$^2$ is selected from hydrogen, C$_{1-4}$ alkyl, and methylsulphonyl; a heteroaryl optionally substituted with at least one from the group consisting of a halogen, CN, C$_{2-4}$ alkenyl, C$_{2-4}$ alkynyl, carboxyl, C$_{1-4}$ alkoxy, C$_{1-4}$ thioalkyl, C$_{1-4}$ alkyl, nitro, thio, C$_{1-4}$ alkylthio, amino, hydroxy, C$_{1-4}$ carbonyl, an amino, and an amino substituted with at least one from the group consisting of halogen, C$_{1-4}$ alkoxy, C$_{1-4}$ alkyl, nitro, thio, C$_{1-4}$ alkylthio, amino, hydroxy and C$_{1-4}$ carbonyl; an aryl optionally substituted with at least one from the group consisting of a halogen, CN, C$_{2-4}$ alkenyl, C$_{2-4}$ alkynyl, carboxyl, C$_{1-4}$ alkoxy, C$_{1-4}$ thioalkyl, C$_{1-4}$ alkyl, nitro, thio, C$_{1-4}$ alkylthio, amino, hydroxy, C$_{1-4}$ carbonyl, an amino, and an amino substituted with at least one from the group consisting of halogen, C$_{1-4}$ alkoxy, C$_{1-4}$ alkyl, nitro, thio, C$_{1-4}$ alkylthio, amino, hydroxy and C$_{1-4}$ carbonyl. Each of these R$^1$ groups can be made subject of individual embodiments in connection with any one of the above embodiments and aspects of the present invention In a still further embodiment R$^1$ is selected from the group consisting of a phosphate, a sulphate and a C$_{1-3}$ alkyl substituted with a group selected from a phosphate, an oxy phosphonyl, a —COOH, a —CONHR$^2$ wherein R$^2$ is selected from hydrogen, C$_{1-3}$ alkyl, and methylsulphonyl; a heteroaryl selected from the group consisting of oxazolyl, imidazolyl, isoxazolyl and tetrazolyl, such as oxazolyl and tetrazolyl, optionally substituted with at least one from the group consisting of a halogen, CN, C$_{2-6}$ alkenyl, C$_{2-6}$ alkynyl, carboxyl, C$_{1-6}$ alkoxy, C$_{1-6}$ thioalkyl, C$_{1-6}$ alkyl, nitro, thio, C$_{1-6}$ alkylthio, amino, hydroxy, C$_{1-6}$ carbonyl, an amino, and an amino substituted with at least one from the group consisting of halogen, C$_{1-6}$ alkoxy, C$_{1-6}$ alkyl, nitro, thio, C$_{1-6}$ alkylthio, amino, hydroxy and C$_{1-6}$ carbonyl; a phenyl optionally substituted with at least one from the group consisting of a halogen, CN, C$_{2-6}$ alkenyl, C$_{2-6}$ alkynyl, carboxyl, C$_{1-6}$ alkoxy, C$_{1-6}$ thioalkyl, C$_{1-6}$ alkyl, nitro, thio, C$_{1-6}$ alkylthio, amino, hydroxy, C$_{1-6}$ carbonyl, an amino, and an amino substituted with at least one from the group consisting of halogen, C$_{1-6}$ alkoxy, C$_{1-6}$ alkyl, nitro, thio, C$_{1-6}$ alkylthio, amino, hydroxy and C$_{1-6}$ carbonyl. Each of these R$^1$ groups can be made subject of individual embodiments in connection with any one of the above embodiments and aspects of the present invention In a further embodiment R$^1$ is selected from the group consisting of a phosphate, a sulphate and a C$_{1-3}$ alkyl substituted with a group selected from a phosphate, an oxy phosphonyl, a —COOH, a —CONHR$^2$ wherein R$^2$ is selected from hydrogen, C$_{1-3}$ alkyl, and methylsulphonyl; a heteroaryl selected from the group consisting of oxazolyl, imidazolyl, isoxazolyl and tetrazolyl, such as oxazolyl and tetrazolyl, optionally substituted with at least one from the group consisting of a halogen, CN, C$_{2-4}$ alkenyl, C$_{2-4}$ alkynyl, carboxyl, C$_{1-4}$ alkoxy, C$_{1-4}$ thioalkyl, C$_{1-4}$ alkyl, nitro, thio, C$_{1-4}$ alkylthio, amino, hydroxy, C$_{1-4}$ carbonyl, an amino, and an amino substituted with at least one from the group consisting of halogen, C$_{1-4}$ alkoxy, C$_{1-4}$ alkyl, nitro, thio, C$_{1-4}$ alkylthio, amino, hydroxy and C$_{1-4}$ carbonyl; an aryl optionally substituted with at least one from the group consisting of a halogen, CN, C$_{2-4}$ alkenyl, C$_{2-4}$ alkynyl, carboxyl, C$_{1-4}$ alkoxy, C$_{1-4}$ thioalkyl, C$_{1-4}$ alkyl, nitro, thio, C$_{1-4}$ alkylthio, amino, hydroxy, C$_{1-4}$ carbonyl, an amino, and an amino substituted with at least one from the group consisting of halogen, C$_{1-4}$ alkoxy, C$_{1-4}$ alkyl, nitro, thio, C$_{1-4}$ alkylthio, amino, hydroxy and C$_{1-4}$ carbonyl. Each of these R$^1$ groups can be made subject of individual embodiments in connection with any one of the above embodiments and aspects of the present invention In a still further embodiment R$^1$ is selected from the group consisting of a phosphate, a sulphate and a C$_{1-3}$ alkyl, such as methyl, substituted with a group selected from a phosphate, an oxy phosphonyl, a —COOH, a —CONHR$^2$ wherein R$^2$ is selected from hydrogen, methyl, and methylsulphonyl; a heteroaryl selected from the group consisting of oxazolyl, imidazolyl, isoxazolyl and tetrazolyl, such as oxazolyl and tetrazolyl, optionally substituted with at least one from the group consisting of a halogen, CN, C$_{2-4}$ alkenyl, C$_{2-4}$ alkynyl, carboxyl, C$_{1-4}$ alkoxy, C$_{1-4}$ thioalkyl, C$_{1-4}$ alkyl, nitro, thio, C$_{1-4}$ alkylthio, amino, hydroxy, C$_{1-4}$ carbonyl, an amino, and an amino substituted with at least one from the group consisting of halogen, C$_{1-4}$ alkoxy, C$_{1-4}$ alkyl, nitro, thio, C$_{1-4}$ alkylthio, amino, hydroxy and C$_{1-4}$ carbonyl; an aryl optionally substituted with at least one from the group consisting of a halogen, CN, C$_{2-4}$ alkenyl, C$_{2-4}$ alkynyl, carboxyl, C$_{1-4}$ alkoxy, C$_{1-4}$ thioalkyl, C$_{1-4}$ alkyl, nitro, thio, C$_{1-4}$ alkylthio, amino, hydroxy, C$_{1-4}$ carbonyl, an amino, and an amino substituted with at least one from the group consisting of halogen, C$_{1-4}$ alkoxy, C$_{1-4}$ alkyl, nitro, thio, C$_{1-4}$ alkylthio, amino, hydroxy and C$_{1-4}$ carbonyl. Each of these R$^1$ groups can be made subject of individual embodiments in connection with any one of the above embodiments and aspects of the present invention In a further embodiment R$^1$ is selected from the group consisting of a phosphate, a sulphate and a C$_{1-3}$ alkyl, such as methyl, substituted with a group selected from a phosphate, an oxy phosphonyl, a —COOH, a —CONHR$^2$ wherein R$^2$ is selected from hydrogen, methyl, and methylsulphonyl; imidazolyl optionally substituted with a methyl; isoxazolyl; oxazolyl; tetrazolyl; a phenyl substituted with at least one from the group consisting of a halogen and hydroxy. Each of these R$^1$ groups can be made subject of individual embodiments in connection with any one of the above embodiments and aspects of the present invention In a still further embodiment R$^1$ is selected from the group consisting of a phosphate, a sulphate and a C$_{1-3}$ alkyl, such as methyl, substituted with a group selected from a phosphate, an oxy phosphonyl, a —COOH, a —CONHR$^2$ wherein R$^2$ is methylsulphonyl; isoxazolyl; imidazolyl optionally substituted with a methyl; oxazolyl; tetrazolyl; a phenyl substituted with at least one from the group consisting of a halogen, such as F, and hydroxy. Each of these R$^1$ groups can be made subject of individual embodiments in connection with any one of the above embodiments and aspects of the present invention.

In a further embodiment R$^1$ is selected from the group consisting of a phosphate, a sulphate and a C$_{1-3}$ alkyl, such as methyl, substituted with a group selected from a phosphate, an oxy phosphonyl, a —COOH, a —CONHR$^2$ wherein R$^2$ is methylsulphonyl; oxazolyl; tetrazolyl; a phenyl substituted with at least one from the group consisting of a halogen, such as F, and hydroxy. Each of these R$^1$ groups can be made subject of individual embodiments in connection with any one of the above embodiments and aspects of the present invention.

In a further embodiment of the present invention the compound is selected from a compound of formula II

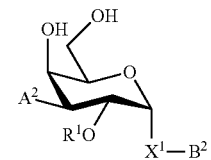

wherein the pyranose ring is α-D-galactopyranose, wherein

A² is selected from A¹ as defined above;

X¹ is selected from S, SO, SO₂, O, C=O, and $CR^{32a}R^{33a}$ wherein $R^{32a}$ and $R^{33a}$ are independently selected from hydrogen, OH, or halogen;

B² is selected from B¹ as defined above;

R¹ is as defined above; or a pharmaceutically acceptable salt or solvate thereof.

In a further embodiment A² is selected from

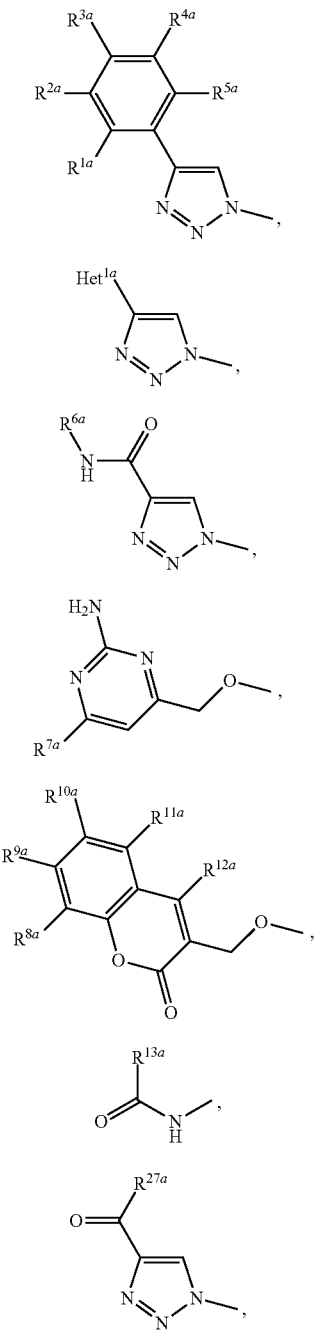

wherein $Het^{1a}$ is selected from a five or six membered heteroaromatic ring, optionally substituted with a group selected from Br; F; Cl; CN; $NR^{19a}R^{20a}$, wherein $R^{19a}$ and $R^{20a}$ are independently selected from H, $C_{1-3}$ alkyl, cyclopropyl, iso-propyl, —C(=O)—$R^{21a}$, wherein $R^{21a}$ is selected from H and $C_{1-3}$ alkyl; $C_{1-3}$ alkyl, optionally substituted with a F; cyclopropyl, optionally substituted with a F; iso-propyl, optionally substituted with a F; O-cyclopropyl optionally substituted with a F; O-isopropyl optionally substituted with a F; and $OC_{1-3}$ alkyl optionally substituted with a F;

wherein $R^{1a}$—$R^{5a}$ are independently selected from H, CN, NH₂, Cl, F, methyl optionally substituted with a F, and OCH₃ optionally substituted with a F;

wherein $R^{6a}$ is selected from $C_{1-6}$ alkyl optionally substituted with a halogen, branched $C_{3-6}$ alkyl and $C_{3-7}$ cycloalkyl;

wherein $R^{7a}$ is selected from a five or six membered heteroaromatic ring, optionally substituted with a group selected from Br, F, Cl, methyl optionally substituted with a F, and OCH₃ optionally substituted with a F, and a phenyl optionally substituted with a group selected from Br, F, Cl, methyl optionally substituted with a F, and OCH₃ optionally substituted with a F;

wherein $R^{8a}$—$R^{12a}$ are independently selected from H, F, methyl optionally substituted with a F, and OCH₃ optionally substituted with a F;

wherein $R^{13a}$ is a five or six membered heteroaromatic ring optionally substituted with a group selected from H, OH, F, methyl optionally substituted with a F, and OCH₃ optionally substituted with a F, or an aryl, such as phenyl or naphthyl, optionally substituted with a group selected from H, OH, F, methyl optionally substituted with a F, and OCH₃ optionally substituted with a F. Preferably, A² is formula 2a, wherein $R^{1a}$—$R^{5a}$ are independently selected from H, Cl, CN, NH₂, F, methyl optionally substituted with a F, and OCH₃ optionally substituted with a F. More preferred A² is formula 2a, wherein $R^{1a}$ and $R^{5a}$ are hydrogen, and $R^{2a}$—$R^{4a}$ are independently selected from H, Cl, CN, NH₂, F, methyl optionally substituted with a F, and OCH₃ optionally substituted with a F. Most preferred A² is formula 2a, wherein $R^{1a}$ and $R^{5a}$ are hydrogen, and $R^{2a}$—$R^{4a}$ are independently selected from hydrogen, Cl and F. Typically, A² is formula 2a, wherein $R^{1a}$ and $R^{5a}$ are hydrogen, and $R^{2a}$—$R^{4a}$ are all F or $R^{2a}$—$R^{4a}$ are selected from Cl and F. Typically, A² is formula 2a, wherein $R^{1a}$ and $R^{5a}$ are hydrogen, and $R^{2a}$—$R^{4a}$ are selected from Cl and F, wherein one is Cl and the other two are F.

In a still further embodiment X¹ is selected from S and O. Preferably, X¹ is S. In a further embodiment B² is selected from a) a $C_{1-6}$ alkyl or branched $C_{3-6}$ alkyl substituted with a five or six membered heteroaromatic ring, optionally substituted with a substituent selected from CN, a halogen, methyl optionally substituted with a F, OCH₃ optionally substituted with a F, OCH₂CH₃ optionally substituted with a F, OH, and $R^{14a}$—CONH— wherein $R^{14a}$ is selected from $C_{1-3}$ alkyl and cyclopropyl; or a $C_{1-6}$ alkyl substituted with a phenyl, optionally substituted with a substituent selected from CN, a halogen, methyl optionally substituted with a F, OCH₃ optionally substituted with a F, OCH₂CH₃ optionally substituted with a F, OH, and $R^{15a}$—CONH— wherein $R^{15a}$ is selected from $C_{1-3}$ alkyl and cyclopropyl; b) an aryl, such as phenyl or naphthyl, optionally substituted with a group selected from a halogen; CN; —COOH; —$CONR^{22a}R^{23a}$, wherein $R^{22a}$ and $R^{23a}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; $OC_{1-3}$ alkyl, optionally substituted with a F; O-cyclopropyl, optionally substituted with a F; O-isopropyl, optionally substituted with a F; NR$^{28a}$R$^{29a}$, wherein R$^{28a}$ and R$^{29a}$ are independently selected from H, C$_{1-3}$ alkyl and isopropyl; OH; and R$^{16a}$—CONH— wherein R$^{16a}$ is selected from C$_{1-3}$ alkyl and cyclopropyl; c) a C$_{5-7}$ cycloalkyl, optionally substituted with a substituent selected from a halogen, CN, methyl optionally substituted with a F, OCH$_3$ optionally substituted with a F, OCH$_2$CH$_3$ optionally substituted with a F, OH, and R$^{17a}$—CONH— wherein R$^{17a}$ is selected from C$_{1-3}$ alkyl and cyclopropyl; and d) a heterocycle, such as heteroaryl or heterocycloalkyl, optionally substituted with a group selected from a halogen; CN; —COOH; —CONR$^{24a}$R$^{25a}$, wherein R$^{24a}$ and R$^{25a}$ are independently selected from H, C$_{1-3}$ alkyl, cyclopropyl, and iso-propyl; C$_{1-3}$ alkyl, optionally substituted with a F; cyclopropyl, optionally substituted with a F; isopropyl, optionally substituted with a F; OC$_{1-3}$ alkyl, optionally substituted with a F; O-cyclopropyl, optionally substituted with a F; O-isopropyl, optionally substituted with a F; NR$^{30a}$R$^{31a}$, wherein R$^{30a}$ and R$^{31a}$ are independently selected from H, C$_{1-3}$ alkyl and isopropyl; OH; and R$^{18a}$—CONH— wherein R$^{18a}$ is selected from C$_{1-3}$ alkyl and cyclopropyl; e) a C$_{1-6}$ alkyl or branched C$_{3-6}$ alkyl.

In a still further embodiment B$^2$ is selected from b) an aryl, such as phenyl or naphthyl, optionally substituted with a group selected from a halogen; CN; —COOH; —CONR$^{22a}$R$^{23a}$, wherein R$^{22a}$ and R$^{23a}$ are independently selected from H, C$_{1-3}$ alkyl, cyclopropyl, and iso-propyl; C$_{1-3}$ alkyl, optionally substituted with a F; cyclopropyl, optionally substituted with a F; isopropyl, optionally substituted with a F; OC$_{1-3}$ alkyl, optionally substituted with a F; O-cyclopropyl, optionally substituted with a F; O-isopropyl, optionally substituted with a F; NR$^{28a}$R$^{29a}$, wherein R$^{28a}$ and R$^{29a}$ are independently selected from H, C$_{1-3}$ alkyl and isopropyl; OH; and R$^{16a}$—CONH— wherein R$^{16a}$ is selected from C$_{1-3}$ alkyl and cyclopropyl; and d) a heterocycle, such as heteroaryl or heterocycloalkyl, optionally substituted with a group selected from a halogen; CN; —COOH; —CONR$^{24a}$R$^{25a}$, wherein R$^{24a}$ and R$^{25a}$ are independently selected from H, C$_{1-3}$ alkyl, cyclopropyl, and iso-propyl; C$_{1-3}$ alkyl, optionally substituted with a F; cyclopropyl, optionally substituted with a F; isopropyl, optionally substituted with a F; OC$_{1-3}$ alkyl, optionally substituted with a F; O-cyclopropyl, optionally substituted with a F; O-isopropyl, optionally substituted with a F; NR$^{30a}$R$^{31a}$, wherein R$^{30a}$ and R$^{31a}$ are independently selected from H, C$_{1-3}$ alkyl and isopropyl; OH; and R$^{18a}$—CONH— wherein R$^{18a}$ is selected from C$_{1-3}$ alkyl and cyclopropyl. In a further embodiment B$^2$ is selected from b) a phenyl optionally substituted with a group selected from a halogen; CN; —COOH; —CONR$^{22a}$R$^{23a}$, wherein R$^{22a}$ and R$^{23a}$ are independently selected from H, C$_{1-3}$ alkyl, cyclopropyl, and iso-propyl; C$_{1-3}$ alkyl, optionally substituted with a F; cyclopropyl, optionally substituted with a F; isopropyl, optionally substituted with a F; OC$_{1-3}$ alkyl, optionally substituted with a F; O-cyclopropyl, optionally substituted with a F; O-isopropyl, optionally substituted with a F; NR$^{28a}$R$^{29a}$, wherein R$^{28a}$ and R$^{29a}$ are independently selected from H, C$_{1-3}$ alkyl and isopropyl; OH; and R$^{16a}$—CONH— wherein R$^{16a}$ is selected from C$_{1-3}$ alkyl and cyclopropyl; and d) a heteroaryl optionally substituted with a group selected from a halogen; CN; —COOH; —CONR$^{24a}$R$^{25a}$, wherein R$^{ea}$ and R$^{25a}$ are independently selected from H, C$_{1-3}$ alkyl, cyclopropyl, and iso-propyl; C$_{1-3}$ alkyl, optionally substituted with a F; cyclopropyl, optionally substituted with a F; isopropyl, optionally substituted with a F; OC$_{1-3}$ alkyl, optionally substituted with a F; O-cyclopropyl, optionally substituted with a F; O-isopropyl, optionally substituted with a F; NR$^{30a}$R$^{31a}$, wherein R$^{30a}$ and R$^{31a}$ are independently selected from H, C$_{1-3}$ alkyl and isopropyl; OH; and R$^{18a}$—CONH— wherein R$^{18a}$ is selected from C$_{1-3}$ alkyl and cyclopropyl. In a still further embodiment B$^2$ is selected from b) a phenyl substituted with a halogen, such as Cl. In a further embodiment B$^2$ is selected from b) a phenyl substituted with a halogen, such as Cl, and a —CONR$^{22a}$R$^{23a}$, wherein R$^{22a}$ and R$^{23a}$ are independently selected from H, C$_{1-3}$ alkyl. In another embodiment B$^2$ is selected form d) a heteroaryl, such as a pyridinyl, substituted with a halogen.

In a further embodiment R$^1$ is any one of the above defined embodiments.

In a further embodiment of the present invention the compound is selected from a compound of formula II

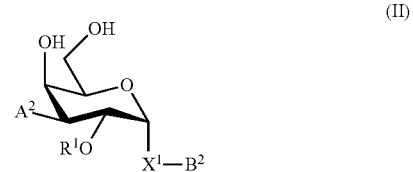

wherein the pyranose ring is α-D-galactopyranose,

A2 is

wherein Het$^{1c}$ is a five or six membered heteroaromatic ring selected from the group consisting of formulas 2c to 9c:

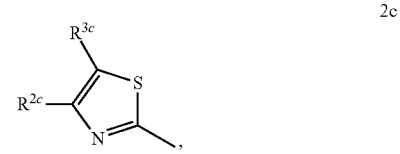

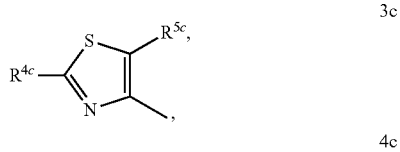

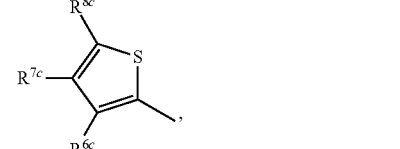

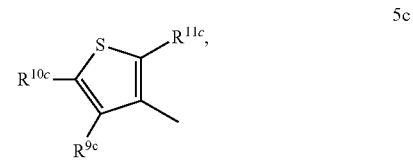

-continued

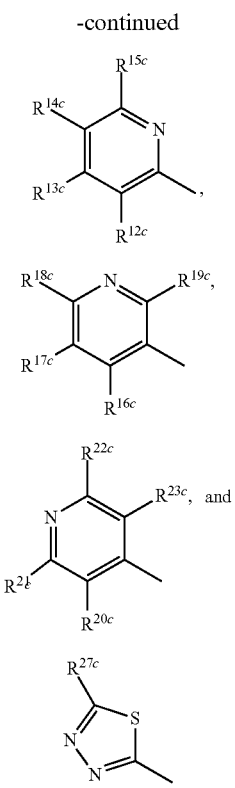

wherein $R^{2c}$ to $R^{23c}$ and $R^{27c}$ are independently selected from H; halogen; OH; CN; SH; S—$C_{1-3}$ alkyl; $C_{1-3}$ alkyl, optionally substituted with a F; cyclopropyl, optionally substituted with a F; iso-propyl, optionally substituted with a F; O-cyclopropyl optionally substituted with a F; O-iso-propyl optionally substituted with a F; $OC_{1-3}$ alkyl optionally substituted with a F; $NR^{24c}R^{25c}$, wherein $R^{24c}$ is selected from H, and $C_{1-3}$ alkyl, and $R^{25c}$ is selected from H, $C_{1-3}$ alkyl, and $COR^{26c}$, wherein $R^{26c}$ is selected from H, and $C_{1-3}$ alkyl;

$X^1$ is selected from S;

$B^2$ is selected from a) a $C_{1-6}$ alkyl or branched $C_{3-6}$ alkyl substituted with a five or six membered heteroaromatic ring, optionally substituted with a substituent selected from CN, a halogen, methyl optionally substituted with a F, $OCH_3$ optionally substituted with a F, $OCH_2CH_3$ optionally substituted with a F, OH, and $R^{27\#}$—CONH— wherein $R^{27\#}$ is selected from $C_{1-3}$ alkyl and cyclopropyl; or a $C_{1-6}$ alkyl substituted with a phenyl, optionally substituted with a substituent selected from CN, a halogen, methyl optionally substituted with a F, $OCH_3$ optionally substituted with a F, $OCH_2CH_3$ optionally substituted with a F, OH, and $R^{28c}$—CONH— wherein $R^{28c}$ is selected from $C_{1-3}$ alkyl and cyclopropyl; b) a phenyl optionally substituted with a group selected from a halogen; CN; —COOH; —$CONR^{29c}R^{30c}$, wherein $R^{29c}$ and $R^{30c}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; $OC_{1-3}$ alkyl, optionally substituted with a F; O-cyclopropyl, optionally substituted with a F; O-isopropyl, optionally substituted with a F; $NR^{31c}R^{32c}$, wherein $R^{31c}$ and $R^{32c}$ are independently selected from H, $C_{1-3}$ alkyl and isopropyl; OH; and $R^{33c}$—CONH—, wherein $R^{33c}$ is selected from $C_{1-3}$ alkyl and cyclopropyl; c) a $C_{5-7}$ cycloalkyl, optionally substituted with a substituent selected from a halogen, CN, methyl optionally substituted with a F, $OCH_3$ optionally substituted with a F, $OCH_2CH_3$ optionally substituted with a F, OH, and $R^{34c}$—CONH— wherein $R^{34c}$ is selected from $C_{1-3}$ alkyl and cyclopropyl; and d) a heterocycle, such as heteroaryl or heterocycloalkyl, optionally substituted with a group selected from a halogen; CN; —COOH; —$CONR^{35c}R^{36c}$, wherein $R^{35c}$ and $R^{36c}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; $OC_{1-3}$ alkyl, optionally substituted with a F; O-cyclopropyl, optionally substituted with a F; O-isopropyl, optionally substituted with a F; $NR^{37c}R^{38c}$, wherein $R^{37c}$ and $R^{38c}$ are independently selected from H, $C_{1-3}$ alkyl and isopropyl; OH; and $R^{39c}$—CONH— wherein $R^{30c}$ is selected from $C_{1-3}$ alkyl and cyclopropyl; e) a $C_{1-6}$ alkyl or branched $C_{3-6}$ alkyl; $R^1$ is an acid isostere having one or two lone pairs or an acidic proton, or both; or a pharmaceutically acceptable salt or solvate thereof.

In a still further embodiment of the present invention the compound is selected from a compound of formula II

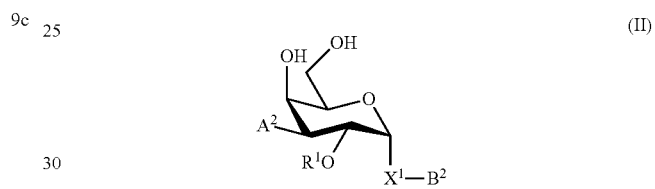

wherein the pyranose ring is α-D-galactopyranose, $A^2$ is

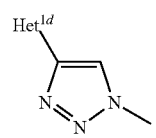

wherein $Het^{1d}$ is selected from the group consisting of

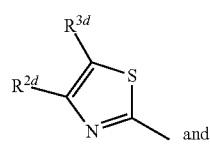

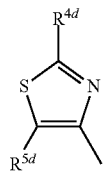

wherein $R^{2d}$ is selected from the group consisting of OH and halogen;

$R^{3d}$ is selected from the group consisting of hydrogen, $C_{1-6}$ alkyl and halogen;

$R^{4d}$ is selected from the group consisting of OH and halogen;

$R^{5d}$ is selected from the group consisting of hydrogen, $C_{1-6}$ alkyl and halogen;

$X^1$ is S;

$B^2$ is selected from a) an aryl, such as phenyl or naphthyl, optionally substituted with a group selected from a halogen; CN; —COOH; —CONR$^{29d}$R$^{30d}$, wherein R$^{29d}$ and R$^{30d}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; OC$_{1-3}$ alkyl, optionally substituted with a F; SC$_{1-3}$ alkyl, optionally substituted with a F; O-cyclopropyl, optionally substituted with a F; O-isopropyl, optionally substituted with a F; NR$^{31d}$R$^{32d}$, wherein R$^{31d}$ and R$^{32d}$ are independently selected from H, $C_{1-3}$ alkyl and isopropyl; OH; and R$^{33d}$—CONH—, wherein R$^{33d}$ is selected from $C_{1-3}$ alkyl and cyclopropyl; b) a heterocycle, such as heteroaryl or heterocycloalkyl, optionally substituted with a group selected from a halogen; CN; —COOH; —CONR$^{35d}$R$^{36d}$, wherein R$^{35d}$ and R$^{36d}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; OC$_{1-3}$ alkyl, optionally substituted with a F; O-cyclopropyl, optionally substituted with a F; SC$_{1-3}$ alkyl, optionally substituted with a F; O-isopropyl, optionally substituted with a F; NR$^{37d}$R$^{38d}$, wherein R$^{37d}$ and R$^{38d}$ are independently selected from H, $C_{1-3}$ alkyl and isopropyl; OH; and R$^{39d}$—CONH— wherein R$^{3911}$ is selected from $C_{1-3}$ alkyl and cyclopropyl;

$R^1$ is an acid isostere having one or two lone pairs or an acidic proton, or both; or a pharmaceutically acceptable salt or solvate thereof.

In a further embodiment of the present invention the compound is selected from a compound of formula II

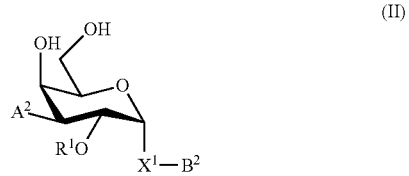

(II)

wherein the pyranose ring is α-D-galactopyranose, wherein $A^2$ is selected from $A^1$ as defined above;

$X^1$ is selected from S, SO, SO$_2$, and O;

$B^2$ is selected from $B^1$ as defined above;

$R^1$ is as defined above; or a pharmaceutically acceptable salt or solvate thereof.

In an embodiment $A^2$ is selected from

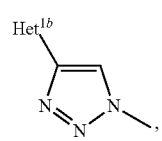

3b wherein Het$^{1b}$ is selected from a pyridinyl, optionally substituted with a group selected from H, CN, Br, Cl, I, F, methyl optionally substituted with a F, OCH$_3$ optionally substituted with a F, and SCH$_3$ optionally substituted with a F; or a pyrimidyl, optionally substituted with a group selected from H, CN, Br, Cl, I, F, methyl optionally substituted with a F, OCH$_3$ optionally substituted with a F, and SCH$_3$ optionally substituted with a F.

In another embodiment $A^2$ is selected from

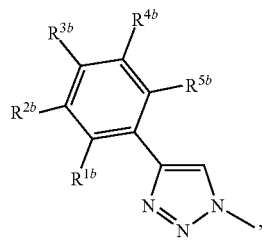

2b wherein R$^{1b}$—R$^{5b}$ are independently selected from a group consisting of H, CN, Br, Cl, I, F, methyl optionally substituted with a F, OCH$_3$ optionally substituted with a F, and SCH$_3$ optionally substituted with a F. Preferably, $A^2$ is formula 2b, and R$^{1b}$ and R$^{5b}$ are both hydrogen, and R$^{2b}$—R$^{4b}$ are independently selected from a group consisting of H, CN, Br, Cl, I, F, methyl optionally substituted with a F, OCH$_3$ optionally substituted with a F, and SCH$_3$ optionally substituted with a F. Typically, $A^2$ is formula 2b, and R$^{1b}$ and R$^{5b}$ are both hydrogen, and R$^{2b}$—R$^{4b}$ are independently selected from a group consisting of H, Br, Cl, I, and F, for instance R$^{2b}$—R$^{4b}$ are all F or R$^{2b}$—R$^{4b}$ are selected from F and Cl, e.g. R$^{2b}$ is F, R$^{3b}$ is Cl and R$^{4b}$ is F.

In a further embodiment $X^1$ is S.

In a still further embodiment $B^2$ is selected from b) a phenyl optionally substituted with a group selected from a halogen; CN; —COOH; —CONR$^{22b}$R$^{23b}$, wherein R$^{22b}$ and R$^{23b}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; OC$_{1-3}$ alkyl, optionally substituted with a F; O-cyclopropyl, optionally substituted with a F; O-isopropyl, optionally substituted with a F; NR$^{28b}$R$^{29b}$, wherein R$^{28b}$ and R$^{29b}$ are independently selected from H, $C_{1-3}$ alkyl and isopropyl; OH; and R$^{16b}$—CONH— wherein R$^{16b}$ is selected from $C_{1-3}$ alkyl and cyclopropyl; and d) a heteroaryl optionally substituted with a group selected from a halogen; CN; —COOH; —CONR$^{24b}$R$^{25b}$, wherein R$^{24b}$ and R$^{25b}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; OC$_{1-3}$ alkyl, optionally substituted with a F; O-cyclopropyl, optionally substituted with a F; O-isopropyl, optionally substituted with a F; NR$^{30b}$R$^{31b}$, wherein R$^{30b}$ and R$^{31b}$ are independently selected from H, $C_{1-3}$ alkyl and isopropyl; OH; and R$^{18b}$—CONH— wherein R$^{18b}$ is selected from $C_{1-3}$ alkyl and cyclopropyl.

In one embodiment $B^2$ is selected from a phenyl optionally substituted with a group selected from a halogen; CN; —COOH; —CONR$^{22b}$R$^{23b}$, wherein R$^{22b}$ and R$^{23b}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; OC$_{1-3}$ alkyl, optionally substituted with a F; O-cyclopropyl, optionally substituted with a F; O-isopropyl, optionally substituted with a F; NR$^{28b}$R$^{29b}$, wherein R$^{28b}$ and R$^{29b}$ are independently selected from H, $C_{1-3}$ alkyl and isopropyl; OH; and R$^{16b}$—CONH— wherein R$^{16b}$ is selected from $C_{1-3}$ alkyl and cyclopropyl. Typically, $B^2$ is selected from a phenyl substituted with a halogen, such as 1-3 selected from Cl, F, Br, and I. In a particular embodiment $B^2$ is selected from a phenyl substituted with 1-3 Cl, such as two Cl.

In another embodiment $B^2$ is selected from a heteroaryl optionally substituted with a group selected from a halogen; CN; —COOH; —CONR$^{24b}$R$^{25b}$, wherein R$^{24b}$ and R$^{25b}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; OC$_{1-3}$ alkyl, optionally substituted with a F; O-cyclopropyl, optionally substituted with a F; O-isopropyl, optionally substituted with a F; NR$^{30b}$R$^{31b}$, wherein R$^{30b}$ and R$^{31b}$ are independently selected from H, $C_{1-3}$ alkyl and isopropyl; OH; and R$^{18b}$—CONH— wherein R$^{18b}$ is selected from $C_{1-3}$ alkyl and cyclopropyl. Typically, $B^2$ is selected from a pyridinyl substituted with a halogen, such as 1-3 selected from Cl, F, Br, and I. In a particular embodiment $B^2$ is selected from a pyridinyl substituted with 1-3 Br, such as one Br.

In a still further embodiment of the present invention wherein the compound has formula II, wherein $A^2$ is formula 2b, $X^1$ is selected from S, SO, SO$_2$, and O; and $B^2$ is selected from $B^1$ as defined above, $R^1$ is selected from any one of the above defined embodiments.

In a further embodiment of the present invention the compound of formula I or II is selected from 5-Bromopyridin-3-yl 3-deoxy-3-[4-(3,4,5-trifluorophenyl)-1H-1,2,3-triazol-1-yl]-2-O-phospho-1-thio-α-D-galactopyranoside, 3,4-Dichlorphenyl 3-deoxy-3-[4-(3,4,5-trifluorophenyl)-1H-1,2,3-triazol-1-yl]-2-O-phospho-1-thio-α-D-galactopyranoside, 3,4-Dichlorphenyl 3-Deoxy-3-[4-(3,4,5-trifluorophenyl)-1H-1,2,3-triazol-1-yl]-2-O-sulfo-1-thio-α-D-galactopyranoside, 5-Bromopyridin-3-yl 3-Deoxy-3-[4-(3,4,5-trifluorophenyl)-1H-1,2,3-triazol-1-yl]-2-O-sulfo-1-thio-α-D-galactopyranoside, 5-Bromopyridin-3-yl 3-deoxy-3-[4-(3,4,5-trifluorophenyl)-1H-1,2,3-triazol-1-yl]-2-O-[(phosphonooxy)methyl]-1-thio-α-D-galactopyranoside, 3,4-Dichlorphenyl 2-O-carboxymethyl-3-deoxy-3-[4-(3,4,5-trifluorophenyl)-1H-1,2,3-triazol-1-yl]-1-thio-α-D-galactopyranoside, 3,4-Dichlorphenyl 2-O-carboxymethyl-3-deoxy-3-[4-(4-chloro-3,5-difluorophenyl)-1H-1,2,3-triazol-1-yl]-1-thio-α-D-galactopyranoside, 5-Bromopyridin-3-yl 2-O-Carboxymethyl-3-Deoxy-3-[4-(3,4,5-trifluorophenyl)-1H-1,2,3-triazol-1-yl]-1-thio-α-D-galactopyranoside, 3,4-Dichlorphenyl 3-Deoxy-3-[4-(4-chloro-3,5-difluorophenyl)-1H-1,2,3-triazol-1-yl]-2-O-[2-(methylsulfonamido)-2-oxoethyl]-1-thio-α-D-galactopyranoside, 5-Bromopyridin-3-yl 3-Deoxy-3-[4-(3,4,5-trifluorophenyl)-1H-1,2,3-triazol-1-yl]-2-O-(oxazol-4-ylmethyl)-1-thio-α-D-galactopyranoside, 5-Bromopyridin-3-yl 3-Deoxy-3-[4-(3,4,5-difluorophenyl)-1H-1,2,3-triazol-1-yl]-2-O-(3,5-difluoro-4-hydroxybenzyl)-1-thio-α-D-galactopyranoside, 5-Bromopyridin-3-yl 3-Deoxy-3-[4-(3,4,5-trifluorophenyl)-1H-1,2,3-triazol-1-yl]-2-O-[(1H-tetrazol-5-yl)methyl]-1-thio-α-D-galactopyranoside, 3,4-Dichlorphenyl 3-Deoxy-3-[4-(4-chloro-3,5-difluorophenyl)-1H-1,2,3-triazol-1-yl]-2-O-[(1H-tetrazol-5-yl)methyl]-1-thio-α-D-galactopyranoside, 3,4-Dichlorphenyl 3-deoxy-3-[4-(3,4,5-trifluorophenyl)-1H-1,2,3-triazol-1-yl]-2-O-[(1H-tetrazol-5-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(1H-imidazol-2-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(1-methyl-1H-imidazol-2-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(oxazol-2-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(oxazol-5-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(isoxazol-3-yl)methyl]-1-thio-α-D-galactopyranoside, 3,4-Dichlorphenyl 3-[4-(4-chloro-3,5-difluorophenyl)-1H-1,2,3-triazol-1-yl]-3-deoxy-2-O-[(oxazol-4-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(thiazol-4-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(thiazol-5-yl)methyl]-1-thio-α-D-galactopyranoside, 5-Bromopyridin-3-yl 3-deoxy-3-[4-(3,4,5-trifluorophenyl)-1H-1,2,3-triazol-1-yl]-2-O-[(thiazol-2-yl)methyl]-1-thio-α-D-galactopyranoside, 4-Chloro-N,N-dimethyl-benzamide-2-yl 3-deoxy-3-[4-(3,4,5-trifluorophenyl)-1H-1,2,3-triazol-1-yl]-2-O-[(thiazol-4-yl)methyl]-1-thio-α-D-galactopyranoside, 4-Chloro-N,N-dimethyl-benzamide-2-yl 3-deoxy-3-[4-(3,4,5-trifluorophenyl)-1H-1,2,3-triazol-1-yl]-2-O-[(1H-tetrazol-5-yl)methyl]-1-thio-α-D-galactopyranoside, 5-Bromopyridin-3-yl 2-O-carboxypropyl-3-deoxy-3-[4-(3,4,5-trifluorophenyl)-1H-1,2,3-triazol-1-yl]-1-thio-α-D-galactopyranoside, 5-Bromopyridin-3-yl 2-O-(1-carboxy)ethyl)-3-deoxy-3-[4-(3,4,5-trifluorophenyl)-1H-1,2,3-triazol-1-yl]-1-thio-α-D-galactopyranoside (Diastereomer 1), and 5-Bromopyridin-3-yl 2-O-(1-carboxy)ethyl)-3-deoxy-3-[4-(3,4,5-trifluorophenyl)-1H-1,2,3-triazol-1-yl]-1-thio-α-D-galactopyranoside (Diastereomer 2).

In a further aspect the present invention relates to a compound of the present invention for use as a medicine. In one embodiment the compound has formula I. In a more preferred embodiment the compound has formula II.

In a still further aspect the present invention relates to a pharmaceutical composition comprising a compound of formula I or II of the present invention and optionally a pharmaceutically acceptable additive, such as a carrier and/or excipient.

In a further aspect the present invention relates to a compound of formula I or II of the present invention for use in a method for treating a disorder relating to the binding of a galectin-3 to a ligand in a mammal, such as a human. In an embodiment the disorder is selected from the group consisting of inflammation; fibrosis, such as pulmonary fibrosis, liver fibrosis, kidney fibrosis, ophthalmological fibrosis and fibrosis of the skin and heart; scarring; keloid formation; aberrant scar formation; surgical adhesions; septic shock; cancer, such as carcinomas, sarcomas, leukemias and lymphomas, such as T-cell lymphomas; metastasising cancers; autoimmune diseases, such as psoriasis, rheumatoid arthritis, Crohn's disease, ulcerative colitis, ankylosing spondylitis, systemic lupus erythematosus; metabolic disorders; heart disease; heart failure; pathological angiogenesis, such as ocular angiogenesis or a disease or condition associated with ocular angiogenesis, e.g. neovascularization related to cancer; and eye diseases, such as age-related macular degeneration and corneal neovascularization; atherosclerosis; metabolic diseases such as diabetes; type 2 diabetes; insulin resistens; obesity; Diastolic HF; asthma and other interstitial lung diseases, including Hermansky-Pudlak syndrome, mesothelioma; liver disorders, such as non-alcoholic steatohepatitis. A non-limiting group of cancers given as examples of cancers that may be treated, managed and/or prevented by administration of a compound of formula I or II include: colon carcinoma, breast cancer, pancreatic cancer, ovarian cancer, prostate cancer, fibrosarcoma, myxosarcoma, liposarcoma, chondrosarcoma, osteogenic sarcoma, chordoma, angiosarcoma, endotheliosarcoma, lymphangeosarcoma, lymphangeoendothelia sarcoma, synovioma, mesothelioma, Ewing's sarcoma, leiomyosarcoma, rhabdomyosarcoma, squamous cell carcinoma, basal cell carcinoma, adenocarcinoma, sweat gland carcinoma, sebaceous gland carcinoma, papillary carcinoma, papillary adenocarcinomas, cystandeocarcinoma, medullary carcinoma, bronchogenic carcinoma, renal cell carcinoma, hepatoma, bile duct carcinoma, choriocarcinoma, seminoma, embryonal carcinoma, Wilms' tumor, cervical cancer, testicular tumor, lung carcinoma, small cell lung carcinoma, bladder carcinoma, epithelial carcinoma, glioblastomas, neuronomas, craniopharingiomas, schwannomas, glioma, astrocytoma, medulloblastoma, craniopharyngioma, ependymoma, pinealoma, hemangioblastoma, acoustic neuroama, oligodendroglioma, meningioma, melanoma, neuroblastoma, retinoblastoma, leukemias and lymphomas, acute lymphocytic leukemia and acute myelocytic polycythemia vera, multiple myeloma, Waldenstrom's macroglobulinemia, and heavy chain disease, acute nonlymphocytic leukemias, chronic lymphocytic leukemia, chronic myelogenous leukemia, Hodgkin's Disease, non-Hodgkin's lymphomas, rectum cancer, urinary cancers, uterine cancers, oral cancers, skin cancers, stomach cancer, brain tumors, liver cancer, laryngeal cancer, esophageal cancer, mammary tumors, childhood-null acute lymphoid leukemia (ALL), thymic ALL, B-cell ALL, acute myeloid leukemia, myelomonocytoid leukemia, acute megakaryocytoid leukemia, Burkitt's lymphoma, acute myeloid leukemia, chronic myeloid leukemia, and T cell leukemia, small and large non-small cell lung carcinoma, acute granulocytic leukemia, germ cell tumors, endometrial cancer, gastric cancer, cancer of the head and neck, chronic lymphoid leukemia, hairy cell leukemia and thyroid cancer. Each of these disorders is considered a single embodiment and may be made the subject of a claim specifically to such disease or disorder.

In a still further aspect the present invention relates to a method for treatment of a disorder relating to the binding of a galectin-3 to a ligand in a mammal, such as a human, wherein a therapeutically effective amount of at least one compound of formula I or II of the present invention is administered to a mammal in need of said treatment. In an embodiment the disorder is selected from the group consisting of inflammation; fibrosis, such as pulmonary fibrosis, liver fibrosis, kidney fibrosis, ophthalmological fibrosis and fibrosis of the skin and heart; scarring; keloid formation; aberrant scar formation; surgical adhesions; septic shock; cancer, such as carcinomas, sarcomas, leukemias and lymphomas, such as T-cell lymphomas; metastasising cancers; autoimmune diseases, such as psoriasis, rheumatoid arthritis, Crohn's disease, ulcerative colitis, ankylosing spondylitis, systemic lupus erythematosus; metabolic disorders; heart disease; heart failure (HF); pathological angiogenesis, such as ocular angiogenesis or a disease or condition associated with ocular angiogenesis, e.g. neovascularization related to cancer; and eye diseases, such as age-related macular degeneration and corneal neovascularization; atherosclerosis; metabolic diseases such as diabetes; type 2 diabetes; insulin resistens; obesity; Diastolic HF; asthma and other interstitial lung diseases, including Hermansky-Pudlak syndrome, mesothelioma; liver disorders, such as non-alcoholic steatohepatitis. Each of these disorders are considered a single embodiment and may be made the subject of a claim specifically to such disease or disorder.

The skilled person will understand that it may be necessary to adjust or change the order of steps in the process a1, and such change of order is encompassed by the aspects of the process as described above in the reaction schemes and accompanying description of the process steps.

Furthermore, the skilled person will understand that the processes described above and hereinafter the functional groups of intermediate compounds may need to be protected by protecting groups.

Functional groups that it is desirable to protect include hydroxy, amino and carboxylic acid. Suitable protecting groups for hydroxy include optionally substituted and/or unsaturated alkyl groups (e.g. methyl, allyl, benzyl or tert-butyl), trialkyl silyl or diarylalkylsilyl groups (e.g. t-butyldimethylsilyl, t-butyldipheylsilyl or trimethylsilyl), AcO (acetoxy), TBS (t-butyldimethylsilyl), TMS (trimethylsilyl), PMB (p-methoxybensyl), and tetrahydropyranyl. Suitable proteting groups for carboxylic acid include ($C_{1-6}$)-alkyl or benzyl esters. Suitable protecting groups for amino include t-butyloxycarbonyl, benzyloxycarbonyl, 2-(trimethylsilyl)-ethoxy-methyl or 2-trimethylsilylethoxycarbonyl (Teoc). Suitable protecting groups for S include S—C(=N)—$NH_2$, TIPS.

The protection and deprotection of functional groups may take place before or after any reaction in the above-mentioned processes.

Furthermore the skilled person will appreciate, that, in order to obtain compounds of the invention in an alternative, and on some occasions more convenient manner, the individual process steps mentioned hereinbefore may be performed in different order, and/or the individual reactions may be performed at a different stage in the overall route (i.e. substituents may be added to and/or chemical transformations performed upon, different intermediates to those mentioned hereinbefore in conjunction with a particular reaction). This may negate, or render necessary, the need for protecting groups.

In a still further embodiment the compound of formula I or II is on free form. "On free form" as used herein means a compound of formula I or II, either an acid form or base form, or as a neutral compound, depending on the substitutents. The free form does not have any acid salt or base salt in addition. In one embodiment the free form is an anhydrate. In another embodiment the free form is a solvate, such as a hydrate.

In a further embodiment the compound of formula I or II is a crystalline form. The skilled person may carry out tests in order to find polymorphs, and such polymorphs are intended to be encompassed by the term "crystalline form" as used herein.

When the compounds and pharmaceutical compositions herein disclosed are used for the above treatment, a therapeutically effective amount of at least one compound is administered to a mammal in need of said treatment.

The term "$C_{1-x}$ alkyl" as used herein means an alkyl group containing 1-x carbon atoms, e.g. $C_{1-5}$ or $C_{1-6}$, such as methyl, ethyl, propyl, butyl, pentyl or hexyl.

The term "branched $C_{3-6}$ alkyl" as used herein means a branched alkyl group containing 3-6 carbon atoms, such as isopropyl, isobutyl, tert-butyl, isopentyl, 3-methylbutyl, 2,2-dimethylpropyl, n-hexyl, 2-methylpentyl, 2,2-dimethylbutyl, 2,3-dimethylbutyl.

The term "$C_{3-7}$ cycloalkyl" as used herein means a cyclic alkyl group containing 3-7 carbon atoms, such as cyclopropyl, cyclobutyl, cyclopentyl, cyclohexyl, cycloheptyl, and 1-methylcyclopropyl.

The term "$C_{5-7}$ cycloalkyl" as used herein means a cyclic alkyl group containing 5-7 carbon atoms, such as cyclopentyl, cyclohexyl, or cycloheptyl.

The term "Oxo" as used herein means an oxygen atom with double bonds, also indicated as =O.

The term "CN" as used herein means a nitril.

The term "a five or six membered heteroaromatic ring" as used herein means one five membered heteroaromatic ring or one six membered heteroaromatic ring. The five membered heteroaromatic ring contains 5 ring atoms of which one to four are heteroatoms selected from N, O, and S. The six membered heteroaromatic ring contains 6 ring atoms of which one to five are heteroatoms selected from N, O and S. Examples include thiophene, furan, pyran, pyrrole, imidazole, pyrazole, isothiazole, isooxazole, pyridine, pyrazine, pyrimidine and pyridazine. When such heteroaromatic rings are substituents they are termed thiophenyl, furanyl, pyranyl, pyrrolyl, imidazolyl, pyrazolyl, isothiazolyl, isooxazolyl, pyridinyl, pyrazinyl, pyrimidinyl and pyridazinyl. Also included are oxazoyl, thiazoyl, thiadiazoly, oxadiazoyl, and pyridonyl.

The term "a heterocycle, such as heteroaryl or heterocycloalkyl" as used herein means a heterocycle consisting of one or more 3-7 membered ring systems containing one or more heteroatoms and wherein such ring systems may optionally be aromatic. The term "a heteroaryl" as used herein means a mono or bicyclic aromatic ringsystem containing one or more heteroatoms, such as 1-10, e.g. 1-6, selected from O, S, and N, including but not limited to oxazolyl, oxadiazolyl, thiophenyl, thiadiazolyl, thiazolyl, pyridyl, pyrimidinyl, pyridonyl, pyrimidonyl, quinolinyl, azaquionolyl, isoquinolinyl, azaisoquinolyl, quinazolinyl, azaquinazolinyl, bensozazoyl, azabensoxazoyl, bensothiazoyl, or azabensothiazoyl. The term "a heterocycloalkyl" as used herein means a mono or bicyclic 3-7 membered alifatic heterocycle containing one or more heteroatoms, such as 1-7, e.g. 1-5, selected from O, S, and N, including but not limited to piperidinyl, tetrahydropyranyl, tetrahydrothipyranyl, or piperidonyl.

The term "treatment" and "treating" as used herein means the management and care of a patient for the purpose of combating a condition, such as a disease or a disorder. The term is intended to include the full spectrum of treatments for a given condition from which the patient is suffering, such as administration of the active compound to alleviate the symptoms or complications, to delay the progression of the disease, disorder or condition, to alleviate or relief the symptoms and complications, and/or to cure or eliminate the disease, disorder or condition as well as to prevent the condition, wherein prevention is to be understood as the management and care of a patient for the purpose of combating the disease, condition, or disorder and includes the administration of the active compounds to prevent the onset of the symptoms or complications. The treatment may either be performed in an acute or in a chronic way. The patient to be treated is preferably a mammal; in particular, a human being, but it may also include animals, such as dogs, cats, cows, sheep and pigs.

The term "a therapeutically effective amount" of a compound of formula I or II of the present invention as used herein means an amount sufficient to cure, alleviate or partially arrest the clinical manifestations of a given disease and its complications. An amount adequate to accomplish this is defined as "therapeutically effective amount". Effective amounts for each purpose will depend on the severity of the disease or injury as well as the weight and general state of the subject. It will be understood that determining an appropriate dosage may be achieved using routine experimentation, by constructing a matrix of values and testing different points in the matrix, which is all within the ordinary skills of a trained physician or veterinary.

In a still further aspect the present invention relates to a pharmaceutical composition comprising the compound of formula I or II and optionally a pharmaceutically acceptable additive, such as a carrier or an excipient.

As used herein "pharmaceutically acceptable additive" is intended without limitation to include carriers, excipients, diluents, adjuvant, colorings, aroma, preservatives etc. that the skilled person would consider using when formulating a compound of the present invention in order to make a pharmaceutical composition.

The adjuvants, diluents, excipients and/or carriers that may be used in the composition of the invention must be pharmaceutically acceptable in the sense of being compatible with the compound of formula I or II and the other ingredients of the pharmaceutical composition, and not deleterious to the recipient thereof. It is preferred that the compositions shall not contain any material that may cause an adverse reaction, such as an allergic reaction. The adjuvants, diluents, excipients and carriers that may be used in the pharmaceutical composition of the invention are well known to a person skilled within the art.

As mentioned above, the compositions and particularly pharmaceutical compositions as herein disclosed may, in addition to the compounds herein disclosed, further comprise at least one pharmaceutically acceptable adjuvant, diluent, excipient and/or carrier. In some embodiments, the pharmaceutical compositions comprise from 1 to 99 weight % of said at least one pharmaceutically acceptable adjuvant, diluent, excipient and/or carrier and from 1 to 99 weight % of a compound as herein disclosed. The combined amount of the active ingredient and of the pharmaceutically acceptable adjuvant, diluent, excipient and/or carrier may not constitute more than 100% by weight of the composition, particularly the pharmaceutical composition.

In some embodiments, only one compound as herein disclosed is used for the purposes discussed above.

In some embodiments, two or more of the compounds as herein disclosed are used in combination for the purposes discussed above.

The composition, particularly pharmaceutical composition comprising a compound set forth herein may be adapted for oral, intravenous, topical, intraperitoneal, nasal, buccal, sublingual, or subcutaneous administration, or for administration via the respiratory tract in the form of, for example, an aerosol or an air-suspended fine powder. Therefore, the pharmaceutical composition may be in the form of, for example, tablets, capsules, powders, nanoparticles, crystals, amorphous substances, solutions, transdermal patches or suppositories.

Further embodiments of the process are described in the experimental section herein, and each individual process as well as each starting material constitutes embodiments that may form part of embodiments.

The above embodiments should be seen as referring to any one of the aspects (such as 'method for treatment', 'pharmaceutical composition', 'compound for use as a medicament', or 'compound for use in a method') described herein as well as any one of the embodiments described herein unless it is specified that an embodiment relates to a certain aspect or aspects of the present invention.

All references, including publications, patent applications and patents, cited herein are hereby incorporated by reference to the same extent as if each reference was individually and specifically indicated to be incorporated by reference and was set forth in its entirety herein.

All headings and sub-headings are used herein for convenience only and should not be construed as limiting the invention in any way.

Any combination of the above-described elements in all possible variations thereof is encompassed by the invention unless otherwise indicated herein or otherwise clearly contradicted by context.

The terms "a" and "an" and "the" and similar referents as used in the context of describing the invention are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. Unless otherwise stated, all exact values provided herein are representative of corresponding approximate values (e.g., all exact exemplary values provided with respect to a particular factor or measurement can be considered to also pro-vide a corresponding approximate measurement, modified by "about," where appropriate).

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise indicated. No language in the specification should be construed as indicating any element is essential to the practice of the invention unless as much is explicitly stated.

The citation and incorporation of patent documents herein is done for convenience only and does not reflect any view of the validity, patentability and/or enforceability of such patent documents.

The description herein of any aspect or embodiment of the invention using terms such as "comprising", "having", "including" or "containing" with reference to an element or elements is intended to provide support for a similar aspect or embodiment of the invention that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context). This invention includes all modifications and equivalents of the subject matter recited in the aspects or claims presented herein to the maximum extent permitted by applicable law.

The present invention is further illustrated by the following examples that, however, are not to be construed as limiting the scope of protection. The features disclosed in the foregoing description and in the following examples may, both separately and in any combination thereof, be material for realizing the invention indiverse forms thereof.

Experimental Procedures (Evaluation of Kd Values)

The affinity of Example 1-28 for galectins were determined by a fluorescence anisotropy assay where the compound was used as an inhibitor of the interaction between galectin and a fluorescein tagged saccharide probe as described Sörme, P., Kahl-Knutsson, B., Huflejt, M., Nilsson, U. J., and Leffler H. (2004) Fluorescence polarization as an analytical tool to evaluate galectin-ligand interactions. Anal. Biochem. 334: 36-47, (Sörme et al., 2004) and Monovalent interactions of Galectin-1 By Salomonsson, Emma; Larumbe, Amaia; Tejler, Johan; Tullberg, Erik; Rydberg, Hanna; Sundin, Anders; Khabut, Areej; Frejd, Torbjorn; Lobsanov, Yuri D.; Rini, James M.; et al, From Biochemistry (2010), 49(44), 9518-9532, (Salomonsson et al., 2010).

| Example | Name | Structure | Aqueous Solubility (mg/mL) | Galectin-1 Kd (µM) | Galectin-3 Kd (µM) |
|---|---|---|---|---|---|
| 1 | 5-Bromopyridin-3-yl 3-deoxy-3-[4-(3,4,5-trifluorophenyl)-1H-1,2,3-triazol-1-yl]-2-O-phospho-1-thio-α-D-galactopyranoside | | 9.8 | 5.4 | 0.006 |

-continued

| Example | Name | Structure | Aqueous Solubility (mg/mL) | Galectin-1 Kd (μM) | Galectin-3 Kd (μM) |
|---|---|---|---|---|---|
| 2 | 3,4-Dichlorphenyl 3-deoxy-3-[4-(3,4,5-trifluorophenyl)-1H-1,2,3-triazol-1-yl]-2-O-phospho-1-thio-α-D-galactopyranoside | | nd | nd | 0.007 |
| 3 | 3,4-Dichlorphenyl 3-deoxy-3-[4-(3,4,5-trifluorophenyl)-1H-1,2,3-triazol-1-yl]-2-O-sulfo-1-thio-α-D-galactopyranoside | | nd | nd | 0.014 |
| 4 | 5-Bromopyridin-3-yl 3-deoxy-3-[4-(3,4,5-trifluorophenyl)-1H-1,2,3-triazol-1-yl]-2-O-sulfo-1-thio-α-D-galactopyranoside | | nd | 3.15 | 0.003 |
| 5 | 5-Bromopyridin-3-yl 3-deoxy-3-[4-(3,4,5-trifluorophenyl)-1H-1,2,3-triazol-1-yl]-2-O-[(phosphonooxy)methyl]-1-thio-α-D-galactopyranoside | | >10 | 3.83 | 0.012 |

-continued

| Example | Name | Structure | Aqueous Solubility (mg/mL) | Galectin-1 Kd (μM) | Galectin-3 Kd (μM) |
|---|---|---|---|---|---|
| 6 | 3,4-Dichlorphenyl 2-O-carboxymethyl-3-deoxy-3-[4-(3,4,5-trifluorophenyl)-1H-1,2,3-triazol-1-yl]-1-thio-α-D-galactopyranoside | | nd | nd | 0.017 |
| 7 | 3,4-Dichlorphenyl 2-O-carboxymethyl-3-[4-(4-chloro-3,5-difluorophenyl)-1H-1,2,3-triazol-1-yl]-3-deoxy-1-thio-α-D-galactopyranoside | | 2 | 2 | 0.0085 |
| 8 | 5-Bromopyridin-3-yl 2-O-carboxymethyl-3-deoxy-3-[4-(3,4,5-trifluorophenyl)-1H-1,2,3-triazol-1-yl]-1-thio-α-D-galactopyranoside | | 1.8 | 1.8 | 0.007 |
| 9 | 3,4-Dichlorphenyl 3-[4-(4-chloro-3,5-difluorophenyl)-1H-1,2,3-triazol-1-yl]-3-deoxy-2-O-[2-(methylsulfonamido)-2-oxoethyl]-1-thio-α-D-galactopyranoside | | 2.9 | 3 | 0.023 |

-continued

| Example | Name | Structure | Aqueous Solubility (mg/mL) | Galectin-1 Kd (μM) | Galectin-3 Kd (μM) |
|---|---|---|---|---|---|
| 10 | 5-Bromopyridin-3-yl 3-deoxy-3-[4-(3,4,5-trifluorophenyl)-1H-1,2,3-triazol-1-yl]-2-O-(oxazol-4-ylmethyl)-1-thio-α-D-galactopyranoside | | nd | 9.2 | 0.024 |
| 11 | 5-Bromopyridin-3-yl 3-deoxy-3-[4-(3,4,5-trifluorophenyl)-1H-1,2,3-triazol-1-yl]-2-O-(3,5-difluoro-4-hydroxybenzyl)-1-thio-α-D-galactopyranoside | | nd | 0.26 | 0.017 |
| 12 | 5-Bromopyridin-3-yl 3-deoxy-3-[4-(3,4,5-trifluorophenyl)-1H-1,2,3-triazol-1-yl]-2-O-[(1H-tetrazol-5-yl)methyl]-1-thio-α-D-galactopyranoside | | nd | 2.4 | 0.016 |
| 13 | 3,4-Dichlorphenyl 3-[4-(4-chloro-3,5-difluorophenyl)-1H-1,2,3-triazol-1-yl]-3-deoxy-2-O-[(1H-tetrazol-5-yl)methyl]-1-thio-α-D-galactopyranoside | | nd | 1.4 | 0.064 |

| Example | Name | Structure | Aqueous Solubility (mg/mL) | Galectin-1 Kd (μM) | Galectin-3 Kd (μM) |
|---|---|---|---|---|---|
| 14 | 3,4-Dichlorphenyl 3-deoxy-3-[4-(3,4,5-trifluorophenyl)-1H-1,2,3-triazol-1-yl]-2-O-[(1H-tetrazol-5-yl)methyl]-1-thio-α-D-galactopyranoside | | nd | 1.8 | 0.008 |
| 15 | 5-Bromopyridin-3-yl 3-deoxy-3-[4-(3,4,5-trifluorophenyl)-1H-1,2,3-triazol-1-yl]-2-O-[(1H-imidazol-2-yl)methyl]-1-thio-α-D-galactopyranoside | | nd | 9.5 | 0.007 |
| 16 | 5-Bromopyridin-3-yl 3-deoxy-3-[4-(3,4,5-trifluorophenyl)-1H-1,2,3-triazol-1-yl]-2-O-[(1-methyl-1H-imidazol-2-yl)methyl]-1-thio-α-D-galactopyranoside | | nd | 6.4 | 0.057 |
| 17 | 5-Bromopyridin-3-yl 3-deoxy-3-[4-(3,4,5-trifluorophenyl)-1H-1,2,3-triazol-1-yl]-2-O-[(oxazol-2-yl)methyl]-1-thio-α-D-galactopyranoside | | nd | 2.8 | 0.024 |

-continued

| Example | Name | Structure | Aqueous Solubility (mg/mL) | Galectin-1 Kd (μM) | Galectin-3 Kd (μM) |
|---|---|---|---|---|---|
| 18 | 5-Bromopyridin-3-yl 3-deoxy-3-[4-(3,4,5-trifluorophenyl)-1H-1,2,3-triazol-1-yl]-2-O-[(oxazol-5-yl)methyl]-1-thio-α-D-galactopyranoside | | nd | 14.8 | 0.13 |
| 19 | 5-Bromopyridin-3-yl 3-deoxy-3-[4-(3,4,5-trifluorophenyl)-1H-1,2,3-triazol-1-yl]-2-O-[(isoxazol-3-yl)methyl]-1-thio-α-D-galactopyranoside | | nd | 2.9 | 0.032 |
| 20 | 3,4-Dichlorphenyl 3-[4-(4-chloro-3,5-difluorophenyl)-1H-1,2,3-triazol-1-yl]-3-deoxy-2-O-[(oxazol-4-yl)methyl]-1-thio-α-D-galactopyranoside | | nd | 29.7 | 0.087 |
| 21 | 5-Bromopyridin-3-yl 3-deoxy-3-[4-(3,4,5-trifluorophenyl)-1H-1,2,3-triazol-1-yl]-2-O-[(thiazol-4-yl)methyl]-1-thio-α-D-galactopyranoside | | nd | 8.6 | 0.018 |

-continued

| Example | Name | Structure | Aqueous Solubility (mg/mL) | Galectin-1 Kd (μM) | Galectin-3 Kd (μM) |
|---|---|---|---|---|---|
| 22 | 5-Bromopyridin-3-yl 3-deoxy-3-[4-(3,4,5-trifluorophenyl)-1H-1,2,3-triazol-1-yl]-2-O-(thiazol-5-yl)methyl]-1-thio-α-D-galactopyranoside | | nd | 1.9 | 0.021 |
| 23 | 5-Bromopyridin-3-yl 3-deoxy-3-[4-(3,4,5-trifluorophenyl)-1H-1,2,3-triazol-1-yl]-2-O-[(thiazol-2-yl)methyl]-1-thio-α-D-galactopyranoside | | nd | 2.6 | 0.041 |
| 24 | 4-Chloro-N,N-dimethyl-benzamide-2-yl 3-deoxy-3-[4-(3,4,5-trifluorophenyl)-1H-1,2,3-triazol-1-yl]-2-O-[(thiazol-4-yl)methyl]-1-thio-α-D-galactopyranoside | | nd | 3.7 | 0.014 |
| 25 | 4-Chloro-N,N-dimethyl-benzamide-2-yl 3-deoxy-3-[4-(3,4,5-trifluorophenyl)-1H-1,2,3-triazol-1-yl]-2-O-[(1H-tetrazol-5-yl)methyl]-1-thio-α-D-galactopyranoside | | nd | 1.2 | 0.004 |

| Example | Name | Structure | Aqueous Solubility (mg/mL) | Galectin-1 Kd (μM) | Galectin-3 Kd (μM) |
|---|---|---|---|---|---|
| 26 | 5-Bromopyridin-3-yl 2-O-carboxypropyl-3-deoxy-3-[4-(3,4,5-trifluorophenyl)-1H-1,2,3-triazol-1-yl]-1-thio-α-D-galactopyranoside | | nd | 1.5 | 0.010 |
| 27 | 5-Bromopyridin-3-yl 2-O-(1-carboxy)ethyl)-3-deoxy-3-[4-(3,4,5-trifluorophenyl)-1H-1,2,3-triazol-1-yl]-1-thio-α-D-galactopyranoside (Diastereoisomer 1) | Diastereoisomer 1 | nd | 6.5 | 0.015 |
| 28 | 5-Bromopyridin-3-yl 2-O-(1-carboxy)ethyl)-3-deoxy-3-[4-(3,4,5-trifluorophenyl)-1H-1,2,3-triazol-1-yl]-1-thio-α-D-galactopyranoside (Diastereoisomer 2) | Diastereoisomer 2 | nd | 6.4 | 0.006 |

General Experimental:

Nuclear Magnetic Resonance (NMR) spectra were recorded on a 400 MHz Bruker AVANCE III 500 instrument or a Varian instrument at 400 MHz, at 25° C.

Chemical shifts are reported in ppm (d) using the residual solvent as internal standard. Peak multiplicities are expressed as follow: s, singlet; d, doublet; dd, doublet of doublets; t, triplet; dt, doublet of triplet; q, quartet; m, multiplet; br s, broad singlet.

LC-MS were acquired on an Agilent 1200 HPLC coupled with an Agilent MSD mass spectrometer operating in ES (+) ionization mode. Column: XBridge C18 (4.6×50 mm, 3.5 μm) or SunFire C18 (4.6×50 mm, 3.5 μm). Solvent A water+0.1% TFA and solvent B Acetonitrile+0.1% TFA or solvent A water (10 mM Ammonium hydrogen carbonate) and solvent B Acetonitrile. Wavelength: 254 nM. Alternatively LC-MS were acquired on an Agilent 1100 HPLC coupled with an Agilent MSD mass spectrometer operating in ES (+) ionization mode. Column: Waters symmetry 2.1×30 mm C18 or Chromolith RP-18 2×50 mm Solvent A water+0.1% TFA and solvent B Acetonitrile+0.1% TFA. Wavelength 254 nm.

Preparative HPLC was performed on a Gilson 215. Flow: 25 mL/min Column: XBrige prep $C_{18}$ 10 μm OBD (19×250 mm) column. Wavelength: 254 nM. Solvent A water (10 mM Ammonium hydrogen carbonate) and solvent B Acetonitrile. Alternatively preparative HPLC were acquired on a Gilson system. Flow: 15 ml/min Column kromasil 100-5-C18 column Wavelength: 220 nm. Solvent A water+0.1% TFA and solvent B Acetonitrile+0.1% TFA.

The following abbreviations are used
aq: aqueous
Calcd: Calculated
DCM: dichloromethane
DIEA: N,N-Diisopropylethylamine
DMAP: 4-dimethylaminopyridine
DMF: N,N-dimethylformamide
ESI-MS: Electrospray ionization mass spectrometry
EtOAc: ethyl acetate
h: hours
MeCN: acetonitrile
mM: minutes
nd: not determined
prep. preparative
PE: petroleum ether
rt: Room temperature
TBS: tert-Butyldimethylsilyl
TB AF: tetrabutylammonium Fluoride
TFA: trifluoroacetic acid
TMS: trimethyl silyl
UV: Ultraviolet Example 1

5-Bromopyridin-3-yl 3-deoxy-3-[4-(3,4,5-trifluorophenyl)-1H-1,2,3-triazol-1-yl]-2-O-phospho-1-thio-α-D-galactopyranoside

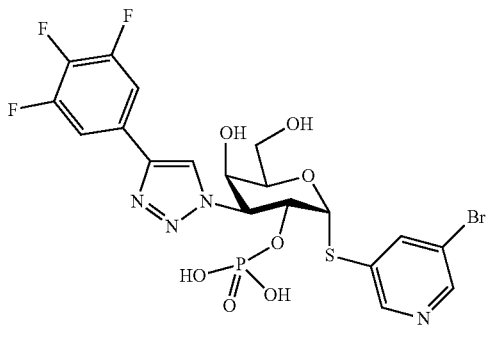

5-Bromopyridin-3-yl 4,6-O-benzyliden-3-deoxy-3-[4-(3,4,5-trifluorophenyl)-1H-1,2,3-triazol-1-yl]-2-O-phospho-1-thio-α-D-galactopyranoside

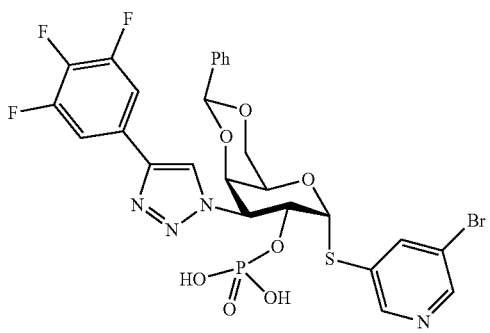

To a solution of 5-bromopyridin-3-yl 4,6-O-benzyliden-3-deoxy-3-[4-(3,4,5-trifluorophenyl)-1H-1,2,3-triazol-1-yl]-1-thio-α-D-galactopyranoside (200 mg, 0.322 mmol) and DMAP (78.6 mg, 0.644 mmol) in DCM (15.0 mL) under Na atmosphere at 0° C. was added DIEA (1.38 mL, 8.05 mmol) followed by POCl$_3$ (0.147 mL, 1.61 mmol) dropwise. After TLC showed no remaining starting material the solvent was removed under vacuo at rt and ammonium hydroxide (15 mL) was added, white solid precipitated out which was collected by filtration and was used directly to the next step without further purification. ESI-MS m/z calcd for [C$_{26}$H$_{21}$BrF$_3$N$_4$)$_7$PS] [M–H]$^-$; 699.0; found: 698.9.

5-Bromopyridin-3-yl 3-deoxy-3-[4-(3,4,5-trifluorophenyl)-1H-1,2,3-triazol-1-yl]-2-O-phospho-1-thio-α-D-galactopyranoside

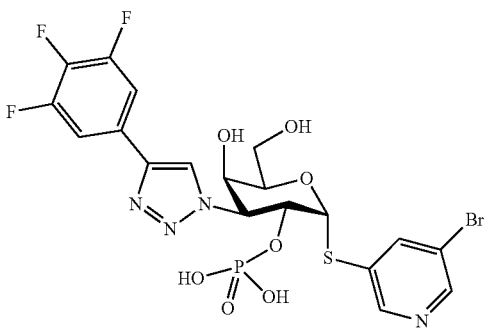

5-Bromopyridin-3-yl 4,6-O-benzyliden-3-deoxy-3-[4-(3,4,5-trifluorophenyl)-1H-1,2,3-triazol-1-yl]-2-O-phospho-1-thio-α-D-galactopyranoside (220 mg, 0.314 mmol) was dissolved in 10% TFA in DCM and the reaction was stirred for 3 h. The solvent was removed, and the residue was purified by preparative HPLC to give the title compound (63.4 mg, 33%). ESI-MS m/z calcd for [C$_{19}$H$_{17}$BrF$_3$N$_4$O$_7$PS] [M–H]$^-$: 611.0; found: 610.8. $^1$H NMR (400 MHz, MeOD) δ 8.71 (d, J=1.7 Hz, 1H), 8.63 (s, 1H), 8.55 (d, J=2.0 Hz, 1H), 8.38 (t, J=1.9 Hz, 1H), 7.66 (dd, J=8.8, 6.7 Hz, 2H), 6.24 (d, J=5.3 Hz, 1H), 5.43-5.31 (m, 1H), 5.13 (dd, J=11.5, 2.7 Hz, 1H), 4.55 (t, J=5.9 Hz, 1H), 4.22 (s, 1H), 3.77-3.65 (m, 2H).

Example 2

3,4-Dichlorophenyl 3-deoxy-3-[4-(3,4,5-trifluorophenyl)-1H-1,2,3-triazol-1-yl]-2-O-phospho-1-thio-α-D-galactopyranoside

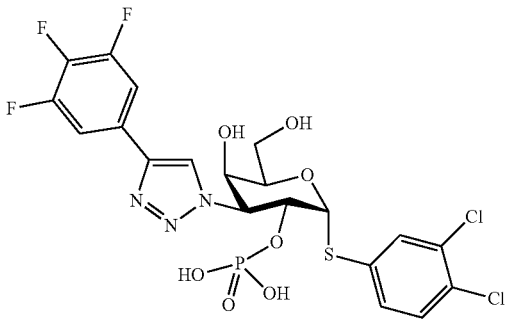

3,4-Dichlorophenyl 4,6-O-benzylidene-3-deoxy-3-[4-(3,4,5-trifluorophenyl)-1H-1,2,3-triazol-1-yl]-1-thio-α-D-galactopyranoside

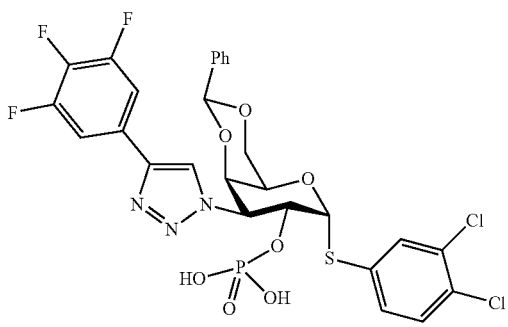

To a solution of 3,4-dichlorophenyl 3-deoxy-3-[4-(3,4,5-trifluorophenyl)-1H-1,2,3-triazol-1-yl]-1-thio-α-D-galactopyranoside (605 mg, 1.16 mmol) in dry MeCN (24 mL), benzaldehyde dimethylacetal (0.87 mL, 5.79 mmol) and camphorsulfonic acid (30 mg, 0.12 mmol) dissolved in dry MeCN (1 mL) was added. The transparent yellow mixture was left stirring at rt. After 20 min the reaction mixture became turbid of white precipitate. After 2 h the reaction was stopped by evaporation of solvent. The reaction crude was dissolved in EtOH (180 mL) under heating and left at rt. for 36 h to crystalize. The formed crystals were filtered off and dried under vacuum to obtain the title compound (247 mg, 35%) as amorphous white solid. $^1$H NMR ((CD$_3$)$_2$SO, 400 MHz): δ 8.85 (s, 1H, Ph), 7.84-7.76 (m, 3H, Ph), 7.63 (d, J=8.6 Hz, 1H, Ph), 7.52 (dd, J=8.6, 2.1 Hz, 1H, Ph), 7.39-7.30 (m, 5H, Ph), 6.17 (d, J=5.3 Hz, 1H, H-1), 6.10 (d, J=4.8 Hz, 1H, OH-2), 5.57 (s, 1H, CH), 5.09 (dd, J=11.0, 3.1 Hz, 1H, H-3), 4.90 (m, 1H, H-2), 4.56 (d, J=2.9 Hz, 1H, H-4), 4.26 (s, 1H, H-5), 4.13 (d, J=12.5 Hz, 1H, H-6), 3.96 (d, J=12.5 Hz, 1H, H-6). $^{13}$C NMR ((CD$_3$)$_2$SO, 100 MHz): δ 137.8, 135.1, 131.7, 131.5, 130.9, 130.7, 129.4, 128.7, 128.0, 125.9, 122.8, 109.5, 109.3, 99.4, 88.2, 74.1, 68.3, 64.2, 63.1, 61.5. HRMS calculated for [C$_{27}$H$_{21}$F$_3$Cl$_2$N$_3$O$_4$S]$^+$, 610.0582; found: 610.0575.

3,4-Dichlorophenyl 3-deoxy-3-[4-(3,4,5-trifluorophenyl)-1H-1,2,3-triazol-1-yl]-2-O-phospho-1-thio-α-D-galactopyranoside

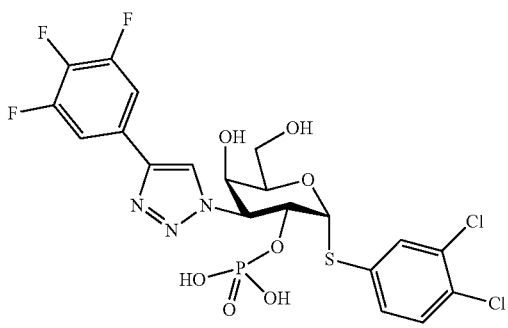

Imidazole and 3,4-dichlorophenyl 4,6-O-benzylidene-3-deoxy-3-[4-(3,4,5-trifluorophenyl)-1H-1,2,3-triazol-1-yl]-1-thio-α-D-galactopyranoside was rendered anhydrous by co-evaporation with toluene. PCl$_3$ (0.10 mL, 1.18 mmol) in dry MeCN:DCM 1:1 (4 mL) was cannulated into a stirring solution of imidazole (380 mg, 5.50 mmol) in dry MeCN:DCM 1:1 (6 mL) under N$_2$-atmosphere. The reaction mixture turned white/light green and turbid. Directly following, Et$_3$N (0.44 mL, 3.15 mmol) in dry MeCN:DCM 1:1 (4 mL) was cannulated into the stirring solution. 3,4-dichlorophenyl 4,6-O-benzylidene-3-deoxy-3-[4-(3,4,5-trifluorophenyl)-1H-1,2,3-triazol-1-yl]-1-thio-α-D-galactopyranoside (240 mg, 0.39 mmol) dissolved in dry MeCN:DCM 1:1 (50+10 mL) and was slowly cannulated into the stirring solution over 25 min. The reaction mixture was stirred at 0° C. for 45 min before pyridine:H$_2$O 4:1 (50 mL) was added. TLC showed complete consumption of starting material. The reaction crude was concentrated and purified by column chromatography (SiO$_2$, DCM:MeOH 10:1 with 1% Et$_3$N). The phosphonate was dissolved in dry pyridine (9 mL). TMS-Cl (0.5 mL, 3.93 mmol) was added and the reaction left stirring at r.t. for 5 min before iodine (205 mg, 0.79 mmol) in dry pyridine (1 mL) was added. After stirring for 10 min, water (0.35 mL) was added and the solvent was evaporated. The reaction crude was purified by repeated column chromatography (SiO$_2$, DCM:MeOH:H$_2$O 10:1:0->65:35:1). The resulting solid material was dissolved in HOAc (70% aq., 20 mL) and left stirring at 40° C. After 30 h the solvent was evaporated and the crude purified by column chromatography (SiO$_2$, DCM:MeOH:H$_2$O 5:1:0->65:35:1) to give the title compound (48 mg, 20%) as amorphous white solid. 41 NMR (MeOD, 400 MHz): δ 8.55 (s, 1H, Ph), 7.64 (dd, J=9.0, 6.8 Hz, 2H, Ph) 7.57 (dd, J=8.4, 2.2 Hz, 1H, Ph), 7.49 (d, J=8.4 Hz, 1H, Ph), 6.08 (d, J=5.4 Hz, 1H, H-1), 5.41 (m, 1H, H-2), 5.17 (dd, J=11.5, 2.9 Hz, 1H, H-3) 4.57 (t, J=6.3 Hz, 1H, H-5), 4.23 (m, 1H, H-4), 3.73 (m, 2H, H-6). $^{13}$C NMR (MeOD, 100 MHz): δ 135.3, 135.3, 133.6, 133.0, 131.9, 123.2, 111.0, 110.8, 89.2, 73.6, 71.0, 69.9, 64.3, 64.2, 64.1. HRMS calculated for [C$_{20}$H$_{18}$F$_3$Cl$_2$N$_3$O$_7$PS]$^+$, 601.9932; found: 601.9934.

Example 3

3,4-Dichlorphenyl 3-Deoxy-3-[4-(3,4,5-trifluorophenyl)-1H-1,2,3-triazol-1-yl]-2-O-sulfo-1-thio-α-D-galactopyranoside

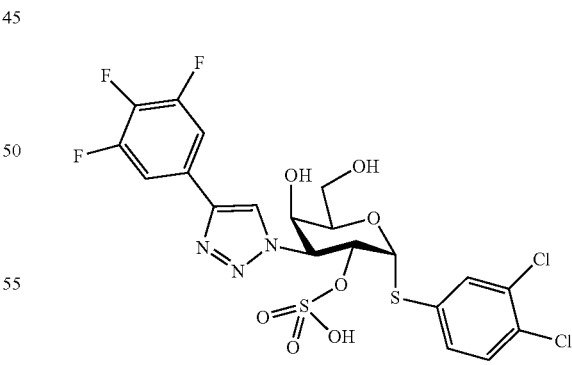

3,4-Dichlorophenyl 4,6-O-benzylidene-3-deoxy-3-[4-(3,4,5-trifluorophenyl)-1H-1,2,3-triazol-1-yl]-1-thio-α-D-galactopyranoside (225 mg, 0.37 mmol) and sulfur trioxide-triethylamine complex (560 mg, 3.82 mmol) were dissolved in dry DMF (20 mL) and stirred at 50° C. After 30 h the solvents were evaporated of solvent and the reaction crude purified by column chromatography (SiO$_2$, EtOAc:Heptane 9:1->1:0). Partial desulfation during evaporation of solvent after column chromatography was observed. The crude was dissolved in HOAc (90% aq., 30 mL) and left stirring at 40° C. for 22 h followed by evaporation of the solvent. The crude was purified by column chromatography (SiO$_2$, EtOAc:Hep 1:1->EtOAc:Hep 1:0) to give the title compound (48 mg, 22%) as amorphous white solid. $^1$H NMR (MeOD, 400 MHz): δ 8.56 (s, 1H, Ph), 7.83 (d, J=2.1 Hz, 1H, Ph), 7.62 (dd, J=9.0, 6.3 Hz, 2H, Ph), 7.57 (dd, J=8.3, 2.1 Hz, 1H, Ph), 7.48 (d, J=8.3 Hz, 1H, Ph), 6.24 (d, J=5.3 Hz, 1H, H-1), 5.48 (dd, J=11.7, 5.3 Hz, 1H, H-2), 5.13 (dd, J=11.7, 2.9 Hz, 1H, H-3), 4.56 (t, J=6.1 Hz, 1H, H-5), 4.26 (d, J=2.8 Hz, 1H, H-4), 4.12 (d, J=7.2 Hz, 1H, H-6), 4.08 (d, J=7.2 Hz, 1H, H-6).

Example 4

5-Bromopyridin-3-yl 3-deoxy-3-[4-(3,4,5-trifluorophenyl)-1H-1,2,3-triazol-1-yl]-2-O-sulfo-1-thio-α-D-galactopyransde

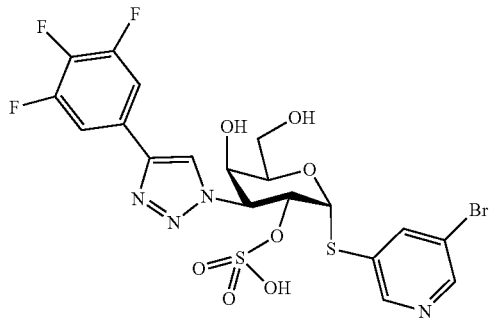

5-Bromopyridin-3-yl 4,6-O-benzylidene-3-deoxy-3-[4-(3,4,5-trifluorophenyl)-1H-1,2,3-triazol-1-yl]-1-thio-α-D-galactopyranoside

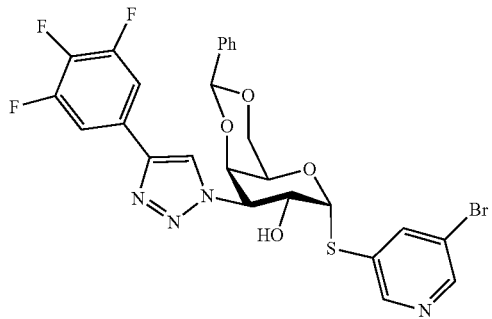

To a stirred solution of 5-bromopyridin-3-yl 3-deoxy-3-[4-(3,4,5-trifluorophenyl)-1H-1,2,3-triazol-1-yl]-1-thio-α-D-galactopyranoside (200 mg, 0.38 mmol) in DMF (10 mL) was added benzaldehyde dimethyl acetal (285 mg, 1.88 mmol) followed by D(+)-10-Camphorsulfonic acid (17.4 mg, 0.075 mmol). The resulting mixture was stirred at 50° C. for 3 h under vacuum. LCMS showed full consumption of starting material and a resulting product spot. The solution was added to aq NaHCO$_3$ (100 mL) dropwise with vigorous stirring. Then it was filtered and washed with water to give the title compound (220 mg, 94%) as a white solid. ESI-MS m/z calcd for [C$_{26}$H$_{20}$BrF$_3$N$_4$O$_4$S] [M+H]$^+$: 621.0; found: 621.1. $^1$H NMR (400 MHz, DMSO) δ 8.86 (s, 1H), 8.67 (d, J=1.5 Hz, 1H), 8.62 (d, J=1.9 Hz, 1H), 8.28 (s, 1H), 7.87-7.72 (m, 2H), 7.35 (dt, J=9.8, 4.9 Hz, 5H), 6.25 (d, J=5.2 Hz, 1H), 6.17 (d, J=4.8 Hz, 1H), 5.57 (s, 1H), 5.12 (dd, J=11.3, 3.2 Hz, 1H), 4.91 (dd, J=10.9, 5.4 Hz, 1H), 4.57 (d, J=2.9 Hz, 1H), 4.29 (s, 1H), 4.12 (d, J=12.2 Hz, 1H), 3.92 (d, J=12.7 Hz, 1H).

5-Bromopyridin-3-yl 3-Deoxy-3-[4-(3,4,5-trifluorophenyl)-1H-1,2,3-triazol-1-yl]-2-O-sulfo-1-thio-α-D-galactopyranoside

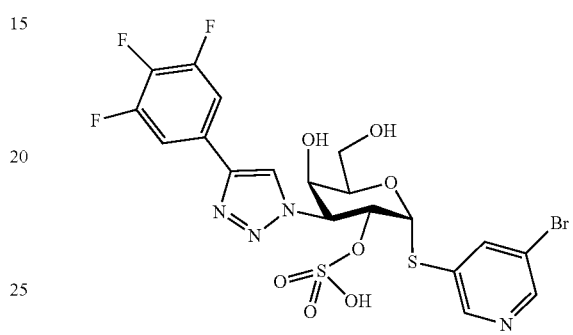

5-Bromopyridin-3-yl 4,6-O-benzylidene-3-deoxy-3-[4-(3,4,5-trifluorophenyl)-1H-1,2,3-triazol-1-yl]-1-thio-α-D-galactopyranoside (50 mg, 0.081 mmol) and sulfur trioxide trimethylamine complex (224 mg, 1.61 mmol) were dissolved in anhydrous DMF (4.0 mL), the mixture was stirred at rt overnight under Na followed by purification by preparative HPLC. The obtained material was dissolved in CH$_3$CO$_2$H (1.60 mL) and H$_2$O (0.40 mL). The reaction was stirred at 50° C. for 4 h. The solvent was removed, and the residue was purified by preparative HPLC to give the title compound (3.2 mg, 6%). ESI-MS m/z calcd for [C$_{19}$H$_{16}$BrF$_3$N$_4$O$_7$S$_2$] [M–H]$^-$: 611.0; found: 611.0. $^1$H NMR (400 MHz, MeOD) δ 8.71 (s, 1H), 8.56 (s, 2H), 8.35 (s, 1H), 7.75-7.49 (m, 2H), 6.26 (d, J=5.3 Hz, 1H), 5.49 (dd, J=11.7, 5.3 Hz, 1H), 5.16 (dd, J=11.8, 2.6 Hz, 1H), 4.56 (dd, J=13.5, 7.6 Hz, 1H), 4.27 (s, 1H), 3.71 (d, J=6.0 Hz, 2H).

Example 5

5-Bromopyridin-3-yl 3-deoxy-3-[4-(3,4,5-trifluorophenyl)-1H-1,2,3-triazol-1-yl]-2-O-[(phosphonooxy)methyl]-1-thio-α-D-galactopyranoside

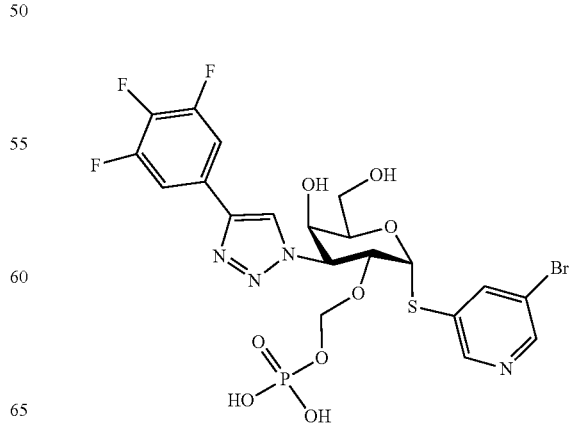

5-Bromopyridin-3-yl 4,6-O-benzylidene-3-deoxy-3-[4-(3,4,5-trifluorophenyl)-1H-1,2,3-triazol-1-yl]-2-O-[(ditert-butyl-phosphonooxy)methyl]-1-thio-α-D-galactopyranoside

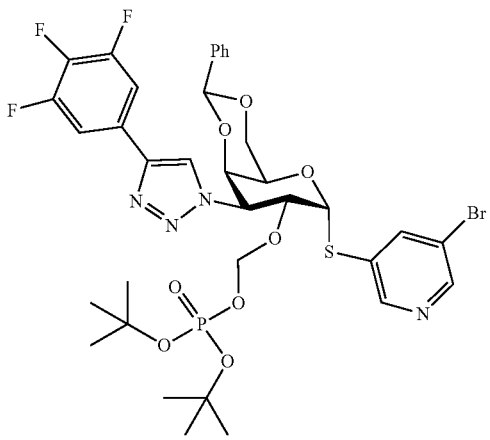

5-Bromopyridin-3-yl 4,6-O-benzylidene-3-deoxy-3-[4-(3,4,5-trifluorophenyl)-1H-1,2,3-triazol-1-yl]-1-thio-α-D-galactopyranoside (200 mg, 0.32 mmol), silver oxide (149 mg, 0.64 mmol), NaI (96.5 mg, 0.64 mmol) and molecular sieves 4 Å (500 mg) were dissolved in DMF (6 mL) under a nitrogen atmosphere. Ditert-butyl chloromethyl phosphate (167 mg, 0.644 mmol) in DMF (0.5 mL) was added. The reaction was stirred overnight at rt and LCMS showed all starting material consumed. The reaction was filtered through Celite® and the solvent was removed. The residue was purified by preparative HPLC to give the title compound (260 mg, 96%) as white solid. $^1$H NMR (400 MHz, DMSO) δ 8.73 (s, 1H), 8.70 (d, J=1.9 Hz, 1H), 8.68 (d, J=2.1 Hz, 1H), 8.30 (t, J=2.0 Hz, 1H), 7.72 (dd, J=8.9, 6.7 Hz, 2H), 7.34 (s, 5H), 6.40 (d, J=5.1 Hz, 1H), 5.62 (s, 1H), 5.30 (dd, J=11.6, 3.2 Hz, 1H), 5.19 (dd, J=9.8, 5.7 Hz, 1H), 5.13 (dd, J=9.8, 5.8 Hz, 1H), 5.04 (dd, J=11.5, 5.2 Hz, 1H), 4.65 (d, J=3.1 Hz, 1H), 4.42 (s, 1H), 4.14 (d, J=11.6 Hz, 1H), 4.01 (d, J=11.7 Hz, 1H), 1.31 (d, J=4.0 Hz, 18H).

5-Bromopyridin-3-yl 3-deoxy-3-[4-(3,4,5-trifluorophenyl)-1H-1,2,3-triazol-1-yl]-2-O-[(phosphonooxy)methyl]-1-thio-α-D-galactopyranoside

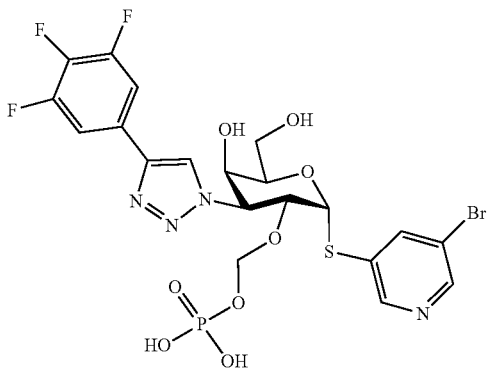

5-Bromopyridin-3-yl 4,6-O-benzylidene-3-deoxy-3-[4-(3,4,5-trifluorophenyl)-1H-1,2,3-triazol-1-yl]-2-O-[(ditert-butyl-phosphonooxy)methyl]-1-thio-α-D-galactopyranoside (210 mg, 0.25 mmol) was dissolved in 10% (v/v) TFA in DCM and the reaction mixture was stirred for 4 h. LCMS indicated consumption of all starting material and that the product was the main peak. Solvent was removed and the residue was purified by preparative HPLC to give (73.6 mg, 46%) as a white solid. ESI-MS m/z calcd for $[C_{20}H_{19}BrF_3N_4O_8PS]$ [M–H]$^+$: 643.0; found: 643.1. $^1$H NMR (400 MHz, MeOD) δ 8.79-8.64 (m, 2H), 8.54 (d, J=2.0 Hz, 1H), 8.37 (s, 1H), 7.79-7.61 (m, 2H), 6.36 (d, J=5.1 Hz, 1H), 5.20 (dd, J=11.6, 5.2 Hz, 1H), 5.16-5.08 (m, 2H), 4.94-4.89 (m, 1H), 4.48 (t, J=5.9 Hz, 1H), 4.18 (s, 1H), 3.76-3.59 (m, 2H).

Example 6

3,4-Dichlorphenyl 2-O-carboxymethyl-3-deoxy-3-[4-(3,4,5-trifluorophenyl)-1H-1,2,3-triazol-1-yl]-1-thio-α-D-galactopyranoside

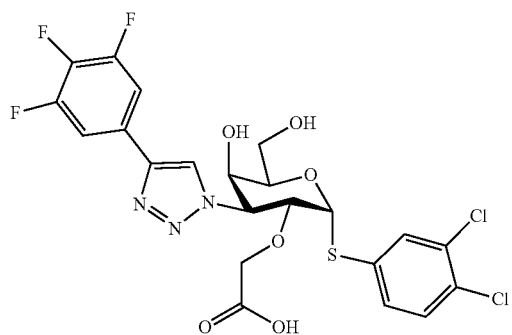

3,4-Dichlorophenyl 4,6-O-benzylidene-3-deoxy-3-[4-(3,4,5-trifluorophenyl)-1H-1,2,3-triazol-1-yl]-2-O-(methoxycarbonyl)methyl-1-thio-α-D-galactopyranoside

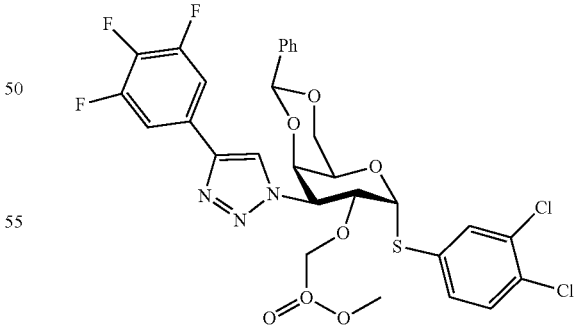

3,4-Dichlorophenyl 4,6-O-benzylidene-3-deoxy-3-[4-(3,4,5-trifluorophenyl)-1H-1,2,3-triazol-1-yl]-1-thio-α-D-galactopyranoside (200 mg, 0.33 mmol) and NaH (60% in oil, 20 mg, 0.52 mmol) were dissolved in dry DMF (21 mL) and left stirring at rt. After 30 min methylbromoacetate (0.06 mL, 0.66 mmol) was added to the solution and the temperature was increased to 50° C. and left stirring for 21 h.

Approx. 50% of the solvent was evaporated and the remaining crude was diluted with DCM (30 mL) and 0.5 M citric acid was added (30 mL). The organic phase was washed with water (3×30 mL) and then dried. The residue was purified using column chromatography (SiO$_2$, Heptane:EtOAc 4:1) to give the title compound (88 mg, 39%) as amorphous white solid. $^1$H NMR (CDCl$_3$, 400 MHz): δ 8.36 (s, 1H, Ph), 8.64 (d, J=2.1 Hz, 1H, Ph), 7.79 (dd, J=8.5, 6.6 Hz, 2H, Ph), 7.41 (d, J=8.4 Hz, 1H, Ph), 7.37 (s, 5H, Ph), 7.35 (dd, J=8.5, 2.1 Hz, 1H, Ph), 6.22 (d, J=5.1 Hz, 1H, H-1), 5.51 (s, 1H, CH), 5.31 (dd, J=11.3, 3.3 Hz, 1H, H-3), 4.98 (dd, J=11.2, 5.1 Hz, 1H, H-2), 4.57 (d, J=3.2 Hz, 1H, H-4), 4.34 (s, 1H, H-5), 4.31 (dd, J=12.7, 1.8 Hz, 1H, H-6), 4.16 (dd, J=12.7, 1.8 Hz, 1H, H-6), 4.11 (d, J=17.2, 1H, CH$_2$), 4.02 (d, J=17.2 Hz, 1H, CH$_2$), 3.68 (s, 3H, CH$_3$). $^{13}$C NMR ((CD$_3$)$_2$SO, 100 MHz): δ 170.0, 136.9, 133.4, 132.2, 132.0, 131.0, 130.1, 129.4, 128.5, 125.8, 121.5, 110.0, 109.8, 100.8, 85.9, 75.1, 72.0, 69.1, 65.6, 63.5, 61.0, 52.3. HRMS calculated for [C$_{30}$H$_{25}$F$_3$Cl$_2$N$_3$O$_6$S]$^+$, 682.0793; found: 682.0792.

3,4-Dichlorophenyl 2-O-carboxymethyl-3-deoxy-3-[4-(3,4,5-trifluorophenyl)-1H-1,2,3-triazol-1-yl]-1-thio-α-D-galactopyranoside

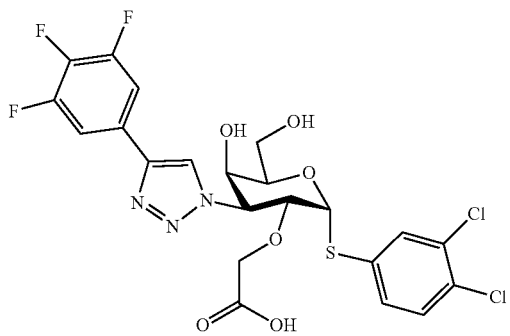

3,4-Dichlorophenyl 4,6-O-benzylidene-3-deoxy-3-[4-(3,4,5-trifluorophenyl)-1H-1,2,3-triazol-1-yl]-2-O-(methoxycarbonyl)methyl-1-thio-α-D-galactopyranoside (52 mg, 0.072 mmol) was dissolved in HOAc (90% aq., 50 mL) and left stirring at 40° C. After 19 h the heating was increased to 90° C. and the reaction left to stir for an additional 3 h before the solvent was evaporated. The remaining crude was dissolved in THF:H$_2$O (10:1, 16.5 mL) together with LiOH (40 mg, 1.67 mmol) and left stirring 1 h before being quenched by Dowex 50W-X8 (H$^+$) resin and purified using column chromatography (SiO$_2$, EtOAc:Hep 3:1) to give the title compound (33 mg, 75%) as amorphous white solid. $^1$H NMR (MeOD, 400 MHz): δ 8.79 (s, 1H, Ph), 7.82 (d, J=2.1 Hz, 1H, Ph), 7.62 (dd, J=9.0, 6.7 Hz, 2H, Ph), 7.56 (dd, J=8.4, 2.1 Hz, 1H, Ph), 7.48 (d, J=7.4 Hz, 1H, Ph), 6.24 (d, J=5.2 Hz, 1H, H-1), 5.07 (dd, J=11.3, 2.9 Hz, 1H, H-3), 4.95 (dd, J=11.3, 5.4 Hz, 1H, H-2), 4.49 (t, J=6.1 Hz, 1H, H-5), 4.27 (d, J=2.5 Hz, 1H, H-4), 4.24 (d, J=16.9 Hz, 1H, CH2), 4.18 (d, J=16.9 Hz, 1H, CH2), 3.73 (dd, J=11.6, 5.7 Hz, 1H, H-6), 3.68 (dd, J=11.6, 6.7 Hz, 1H, H-6). $^{13}$C NMR (MeOD, 100 MHz): δ 173.1, 145.3, 135.3, 135.2, 133.6, 133.4, 132.7, 131.8, 123.9, 110.9, 110.6, 87.7, 73.8, 73.3, 69.8, 66.7, 64.5, 62.1. HRMS calculated for [C$_{22}$H$_{19}$F$_3$Cl$_2$N$_3$O$_6$S]$^+$, 580.0324; found: 580.0321.

Example 7

3,4-Dichlorphenyl 2-O-carboxymethyl-3-[4-(4-chloro-3,5-difluorophenyl)-1H-1,2,3-triazol-1-yl]-3-deoxy-1-thio-α-D-galactopyranoside

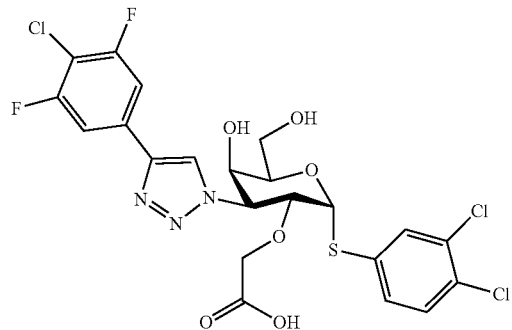

3,4-Dichlorophenyl 3-[4-(4-chloro-3,5-difluorophenyl)-1H-1,2,3-triazol-1-yl]-3-deoxy-1-thio-α-D-galactopyranoside

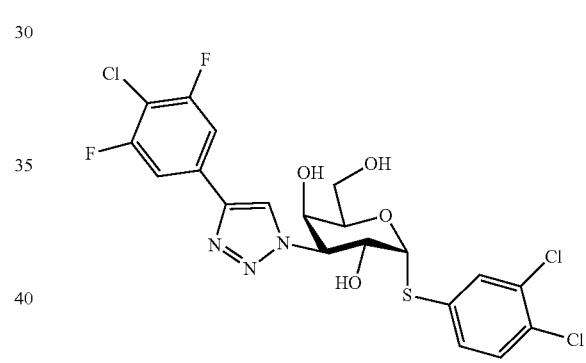

Copper(II) sulfate pentahydrate (127 mg, 0.5 mmol) was dissolved in hot water (5.0 mL) and added to (+)-sodium L-ascorbate (198 mg, 1.0 mmol). The resulting brownish dispersion was added to a mixture of 3,4-dichlorophenyl 3-azido-3-deoxy-1-thio-α-D-galactopyranoside (2.33 g, 4.7 mmol), K$_2$CO$_3$ (6.5 g, 47 mmol), and trimethyl-[2-(4-chloro-3,5-difluorophenyl)ethynyl]silane (1.40 g, 5.68 mmol) in MeOH (20 mL) and THF (20 mL). The resulting mixture was stirred 20 h at 50° C., celite was added, the mixture was filtered, and the filter cake was washed with EtOAc/MeOH. The filtrate was partitioned between EtOAc and aqueous HCl (0.5 M), the organic phase was concentrated. The residue was purified by chromatography (SiO$_2$, PE/EtOAc) and the crude was triturated in MeCN (30 mL) to give the product (1.73 g, 68%). ESI-MS m/z calcd for [C$_{20}$H$_{16}$Cl$_3$F$_2$N$_3$O$_4$S] [M+H]$^+$: 538.0; found: 538.0. $^1$H NMR (400 MHz, Methanol-d$_4$) δ 8.60 (s, 1H), 7.80 (d, J=2.0 Hz, 1H), 7.67 (d, J=8.0 Hz, 2H), 7.54 (dd, J=8.4, 2.0 Hz, 1H), 7.48 (d, J=8.4 Hz, 1H), 5.85 (d, J=5.2 Hz, 1H), 4.99 (dd, J=11.4, 2.7 Hz, 1H), 4.96-4.90 (m, 1H), 4.49 (t, J=6.0 Hz, 1H), 4.20 (d, J=1.9 Hz, 1H), 3.77-3.66 (m, 2H).

3,4-Dichlorophenyl 4,6-O-benzylidene-3-[4-(4-chloro-3,5-difluorophenyl)-1H-1,2,3-triazol-1-yl]-3-deoxy-1-thio-α-D-galactopyranoside

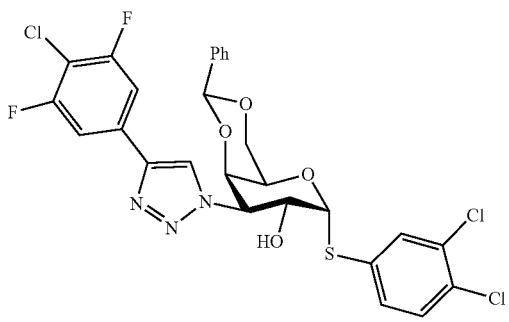

To a solution of 3,4-dichlorophenyl 3-[4-(4-chloro-3,5-difluorophenyl)-1H-1,2,3-triazol-1-yl]-3-deoxy-1-thio-α-D-galactopyranoside (1.73 g, 3.2 mmol) in MeCN (40 mL) benzaldehyde dimethylacetal (0.974 mL, 6.46 mmol) followed by p-toluenesulfonic acid monohydrate (50 mg, 0.26 mmol) were added. The suspension was stirred 72 h at rt, then cooled to 0° C. and filtered to give the product (1.876 g, 93%). $^1$H NMR (400 MHz, DMSO-$d_6$) δ 8.92 (s, 1H), 7.86-7.75 (m, 3H), 7.63 (d, J=8.5 Hz, 1H), 7.52 (dd, J=8.5, 2.0 Hz, 1H), 7.35 (dt, J=11.3, 3.9 Hz, 5H), 6.18 (d, J=5.2 Hz, 1H), 6.13 (d, J=4.7 Hz, 1H), 5.57 (s, 1H), 5.10 (dd, J=11.3, 3.2 Hz, 1H), 4.91 (dt, J=10.9, 5.0 Hz, 1H), 4.56 (d, J=3.0 Hz, 1H), 4.29 (s, 1H), 4.13 (d, J=12.1 Hz, 1H), 3.96 (d, J=12.4 Hz, 1H).

3,4-Dichlorophenyl 4,6-O-benzylidene-3-[4-(4-chloro-3,5-difluorophenyl)-1H-1,2,3-triazol-1-yl]-3-deoxy-2-O-(methoxycarbonyl)methyl-1-thio-α-D-galactopyranoside

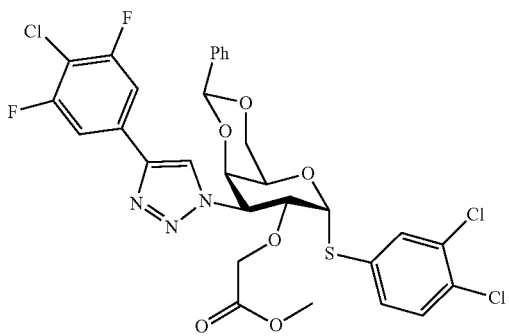

3,4-Dichlorophenyl 4,6-O-benzylidene-3-[4-(4-chloro-3,5-difluorophenyl)-1H-1,2,3-triazol-1-yl]-3-deoxy-1-thio-α-D-galactopyranoside (800 mg, 1.28 mmol) and NaH (60% in oil, 77 mg, 1.91 mmol) were stirred 5 min in DMF (3.0 mL) before methyl 2-bromoacetate (0.16 mL, 1.66 mmol) was added. The mixture was stirred 2 h at rt and was then poured onto ice cooled water (30 mL) and HCl (4 mL, 1 M). The solids were isolated by filtration and recrystallized from EtOAc/PE to give the product (746 mg, 84%). $^1$H NMR (400 MHz, DMSO-$d_6$) δ 8.97 (s, 1H), 7.86 (d, J=1.9 Hz, 1H), 7.73 (d, J=8.5 Hz, 2H), 7.66 (d, J=8.4 Hz, 1H), 7.54 (dd, J=8.3, 1.8 Hz, 1H), 7.34 (s, 5H), 6.61 (d, J=5.2 Hz, 1H), 5.59 (s, 1H), 5.23 (dd, J=11.5, 3.2 Hz, 1H), 4.87 (dd, J=11.4, 5.1 Hz, 1H), 4.61 (d, J=3.1 Hz, 1H), 4.34 (s, 1H), 4.31 (s, 2H), 4.14 (d, J=12.6 Hz, 1H), 3.99 (d, J=12.5 Hz, 1H), 3.54 (s, 3H).

3,4-Dichlorophenyl 3-[4-(4-chloro-3,5-difluorophenyl)-1H-1,2,3-triazol-1-yl]-3-deoxy-2-O-carboxymethyl-1-thio-α-D-galactopyranoside

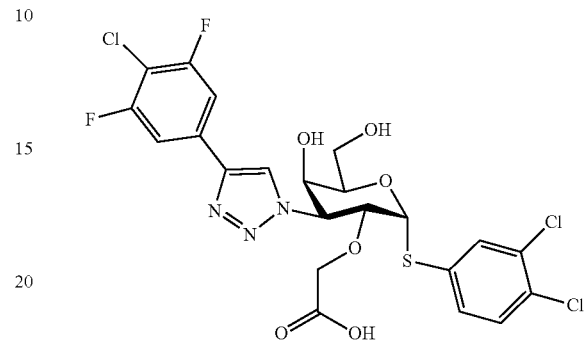

3,4-Dichlorophenyl 4,6-O-benzylidene-3-[4-(4-chloro-3,5-difluorophenyl)-1H-1,2,3-triazol-1-yl]-3-deoxy-2-O-(methoxycarbonyl)methyl-1-thio-α-D-galactopyranoside (721 mg, 1.103 mmol) was stirred 30 min in 80% aq TFA (10 mL), the mixture was concentrated and water was added, which resulted in precipitation. The precipitate was collected by filtration and then stirred 2 h in EtOH (5.0 mL) and NaOH (3.0 mL, 2 M). The mixture was neutralized with HCl (1 M), concentrated, water was added, and pH was adjusted to approximately 1 with HCl (1 M). The precipitate was collected and then triturated in MeOH/water, the solids were collected and to the crude MeOH (3.0 mL) and 28% ammonia (0.20 mL) were added. The mixture was concentrated to dryness, then triturated in $Et_2O$, the precipitate was collected, and the product was obtained as the ammonium salt (381 mg, 60%). ESI-MS m/z calcd for [$C_{22}H_{18}Cl_3F_2N_3O_6S$] [M+H]$^+$: 596.0; found: 596.1. $^1$H NMR (400 MHz, Methanol-$d_4$) δ 9.18 (s, 1H), 7.83 (d, J=1.9 Hz, 1H), 7.67 (d, J=8.1 Hz, 2H), 7.57 (dd, J=8.4, 1.8 Hz, 1H), 7.48 (d, J=8.4 Hz, 1H), 6.24 (d, J=3.9 Hz, 1H), 5.05 (m, 2H), 4.48 (t, J=6.1 Hz, 1H), 4.29 (s, 1H), 4.04 (d, J=15.7 Hz, 1H), 3.96 (d, J=15.7 Hz, 1H), 3.76-3.63 (m, 2H).

Example 8

5-Bromopyridin-3-yl 2-O-carboxymethyl-3-deoxy-3-[4-(3,4,5-trifluorophenyl)-1H-1,2,3-triazol-1-yl]-1-thio-α-D-galactopyranoside

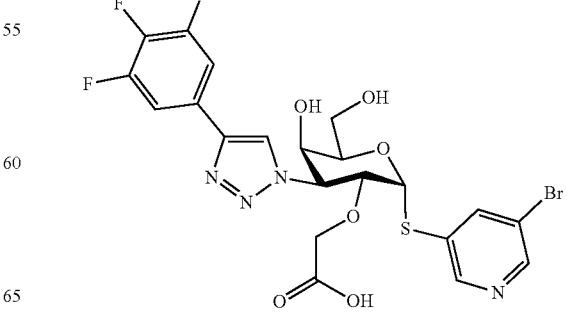

5-Bromopyridin-3-yl 4,6-O-benzylidene-3-deoxy-3-[4-(3,4,5-trifluorophenyl)-1H-1,2,3-triazol-1-yl]-1-thio-α-D-galactopyranoside (1.00 g, 1.6 mmol) and NaH (60% in oil, 100 mg, 2.4 mmol) were stirred in DMF (5 mL) for 10 min Methyl bromoacetate (230 µL, 2.4 mmol) was added, the mixture was stirred for 1 h, then poured onto ice cooled water (50 mL) and HCl (1 M, 5 mL). The solids were isolated by filtration and then stirred in a mixture of EtOH (20 ml) and 2 M NaOH (4 mL). A gel was formed, the reaction mixture was acidified with HCl and then partitioned between hot EtOAc and water, the organic phase was separated and evaporated. The residue was dissolved in a mixture of formic acid (20 mL) and water (2 mL) and stirred for 2 h at 40° C., then evaporated and hydrolyzed in a mixture of EtOH (20 mL) and 2 M NaOH (4 mL) for 1 h at 40° C. The mixture was concentrated, water was added followed by HCl (pH 1-2), the precipitate was collected by filtration and purified by chromatography (SiO₂, EtOAc/MeOH; 10/1-2/1-0/1). Fractions were collected and gave after evaporation a residue that was dissolved in a mixture of MeOH (10 mL) and ammonium hydroxide (28% aqueous solution, 1 mL). The volatiles were removed, the residue was triturated in diethyl ether and afforded the title compound as the ammonium salt (365 mg, 37%). ESI-MS calcd for $[C_{21}H_{18}BrF_3N_4O_6S]^+$ (M+H)⁺: 591.0; found: 591.1, 1H NMR (400 MHz, Methanol-d4) δ 9.06 (s, 1H), 8.69 (d, J=1.5 Hz, 1H), 8.55 (d, J=1.8 Hz, 1H), 8.36 (s, 1H), 7.72-7.60 (m, 2H), 6.33 (d, J=3.8 Hz, 1H), 5.06 (m, 2H), 4.48 (t, J=6.0 Hz, 1H), 4.29 (s, 1H), 4.05 (d, J=16.0 Hz, 1H), 3.99 (d, J=15.7 Hz, 1H), 3.69 (m, 2H).

Example 9

3,4-Dichlorphenyl 3-[4-(4-chloro-3,5-difluorophenyl)-1H-1,2,3-triazol-1-yl]-3-deoxy-2-O-[2-(methylsulfonamido)-2-oxoethyl]-1-thio-α-D-galactopyranoside

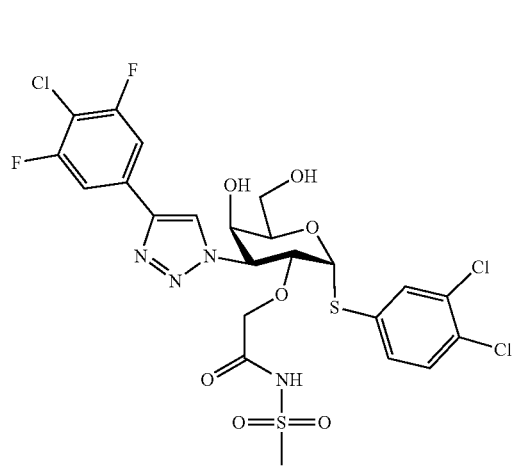

3,4-Dichlorphenyl 4,6-O-benzylidene-3-[4-(4-chloro-3,5-difluorophenyl)-1H-1,2,3-triazol-1-yl]-3-deoxy-2-O-[2-(methylsulfonamido)-2-oxoethyl]-1-thio-α-D-galactopyranoside

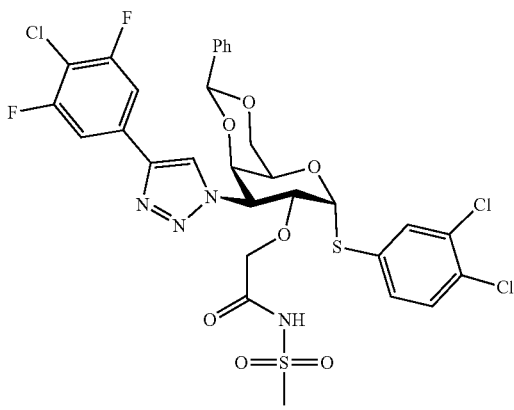

To a solution of 3,4-dichlorphenyl 4,6-O-benzylidene-3-[4-(4-chloro-3,5-difluorophenyl)-1H-1,2,3-triazol-1-yl]-3-deoxy-1-thio-α-D-galactopyranoside (130 mg, 0.21 mmol) in DMF (5.0 mL) was added NaH (19.1 mg, 0.83 mmol) at rt. The mixture was stirred for 30 min and 2-chloro-N-methylsulfonyl-acetamide (214 mg, 1.24 mmol) was added in one portion. The reaction was stirred overnight, before being extracted with EtOAc three times. The organic phases were evaporated and purified by silica gel chromatography to give the title compound (106 mg, 67%). ESI-MS calcd for $[C_{30}H_{25}Cl_3F_2N_4O_7S_2]$ [M+H]⁺:761.0; found: 760.9. ¹H NMR (400 MHz, CDCl3) δ 8.29 (s, 1H), 7.59 (s, 1H), 7.48-7.28 (m, 9H), 6.13 (d, J=5.0 Hz, 1H), 5.48 (s, 1H), 5.33-5.18 (m, 1H), 4.84 (dd, J=11.1, 5.1 Hz, 1H), 4.51 (s, 1H), 4.31 (s, 1H), 4.18 (dd, J=47.4, 12.9 Hz, 2H), 3.98 (dd, J=35.8, 16.0 Hz, 2H), 3.12 (s, 3H).

3,4-Dichlorphenyl 3-[4-(4-chloro-3,5-difluorophenyl)-1H-1,2,3-triazol-1-yl]-3-deoxy-2-O-[2-(methylsulfonamido)-2-oxoethyl]-1-thio-α-D-galactopyranoside

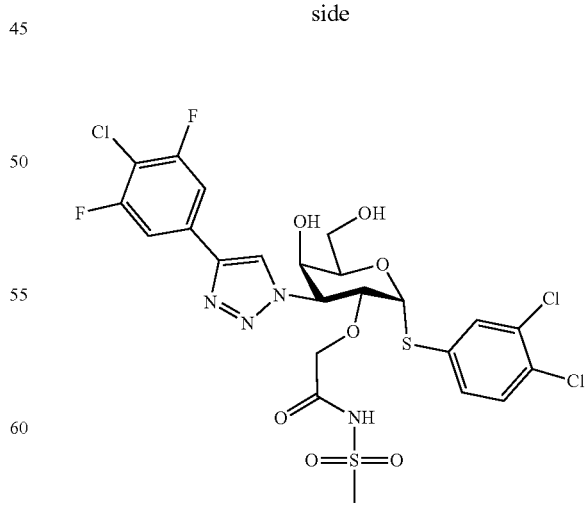

3,4-Dichlorphenyl 4,6-O-benzylidene-3-[4-(4-chloro-3,5-difluorophenyl)-1H-1,2,3-triazol-1-yl]-3-deoxy-2-O-[2-(methylsulfonamido)-2-oxoethyl]-1-thio-α-D-galactopyranoside (100 mg, 0.13 mmol) was dissolved in TFA/DCM (1/20) and the solution was stirred for 2 h at rt. The solvent was removed under vacuum and the residue was purified by preparative HPLC to give the title compound (12.0 mg, 14%). ESI-MS calcd for $[C_{23}H_{21}Cl_3F_2N_4O_7S_2]$ $[M+H]^+$: 673.0; found: 672.9. $^1$H NMR (400 MHz, MeOD) δ 8.79 (s, 1H), 7.74 (d, J=1.9 Hz, 1H), 7.59 (d, J=8.1 Hz, 2H), 7.47 (dd, J=8.4, 1.9 Hz, 1H), 7.39 (d, J=8.4 Hz, 1H), 6.14 (d, J=4.9 Hz, 1H), 4.96 (m, 2H), 4.39 (t, J=6.0 Hz, 1H), 4.15 (s, 1H), 4.05 (d, J=4.0 Hz, 2H), 3.60 (dd, J=12.1, 5.2 Hz, 2H), 3.04 (s, 3H).

Example 10

5-Bromopyridin-3-yl 3-deoxy-3-[4-(3,4,5-trifluorophenyl)-1H-1,2,3-triazol-1-yl]-2-O-(oxazol-4-ylmethyl)-1-thio-α-D-galactopyranoside

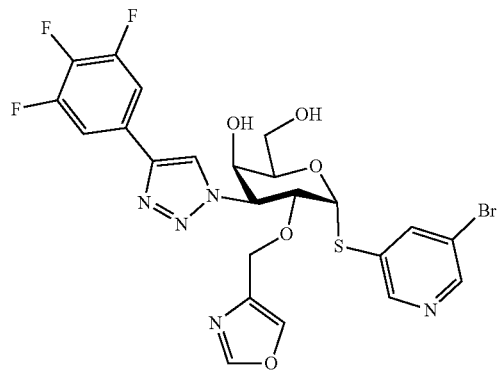

NaH (60% in oil, 38 mg, 1.0 mmol) was added to a solution of oxazol-4-ylmethanol (24 mg, 0.24 mmol) in THF (1 mL) at 0° C., after 45 min methanesulfonyl chloride (28 mg, 0.24 mmol) was added followed, after an additional 15 min, by 5-bromopyridin-3-yl 4,6-O-benzylidene-3-deoxy-3-[4-(3,4,5-trifluorophenyl)-1H-1,2,3-triazol-1-yl]-1-thio-α-D-galactopyranoside (124 mg, 0.20 mmol) in THF (1 mL). The resulting mixture reached rt in 1 h and was heated 4 h at 40° C. The mixture was diluted with EtOAc, washed with water and brine and the organic phase was dried, evaporated and the residue was purified by chromatography (SiO$_2$, petroleum ether/EtOAc, 3/1-1/1). The obtained product was treated 30 min with 80% aqueous TFA (1 mL) and the mixture was concentrated and purified by HPLC (C$_{18}$, H$_2$O/MeCN/0.1% TFA) to afford the title compound (64 mg, 52%). ESI-MS m/z calcd for $[C_{23}H_{19}BrF_3N_5O_5S]$ $[M+H]^+$: 614.0; found: 614.0, $^1$H NMR (400 MHz, Methanol-d4) δ 8.70 (d, J=1.6 Hz, 1H), 8.59 (d, J=1.9 Hz, 1H), 8.46 (s, 1H), 8.37 (t, J=1.8 Hz, 1H), 8.07 (s, 1H), 7.80 (s, 1H), 7.68-7.58 (m, 2H), 6.27 (d, J=5.3 Hz, 1H), 5.08 (dd, J=11.3, 2.7 Hz, 1H), 4.89-4.81 (m, 1H), 4.64 (d, J=12.7 Hz, 1H), 4.53 (d, J=12.7 Hz, 1H), 4.47 (t, J=5.9 Hz, 1H), 4.26-4.19 (m, 1H), 3.76-3.65 (m, 2H).

Example 11

5-Bromopyridin-3-yl 3-deoxy-3-[4-(3,4,5-trifluorophenyl)-1H-1,2,3-triazol-1-yl]-2-O-(3,5-difluoro-4-hydroxybenzyl)-1-thio-α-D-galactopyranoside

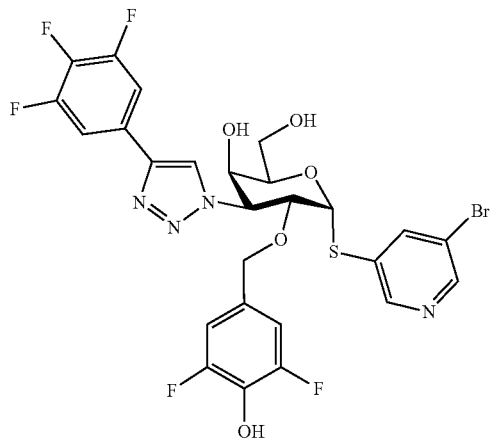

4-(Chloromethyl)-2,6-difluorophenyl methanesulfonate

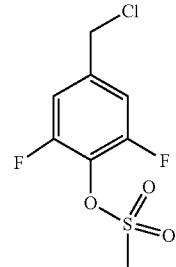

3,5-Difluoro-4-hydroxybenzoic acid (1.00 g, 5.45 mmol), imidazole (1.05 g, 15.26 mmol), and tert-butyldimethylsilyl chloride (3.12 g, 20 mmol) were stirred in DMF (6 mL) for 20 h and then partitioned between ether and water. The organic phase was evaporated, then dissolved in THF (5 mL) and treated with BH$_3$×THF (15 mL, 15 mmol) at 50° C. for 4 h. The mixture was quenched with MeOH (2 mL), evaporated, and stirred in MeOH at 50° C. for 1 h. Evaporation gave a residue that was partitioned between ether and water at pH 4. The organic phase was evaporated, the residue was dissolved in a mixture of 1 M NaOH and ethanol, aq HCl was added to adjust pH to 1-2 and the mixture was partitioned between diethyl ether and water. The organic phase was evaporated and gave 605 mg material which was mainly 3,5-difluoro-4-hydroxybenzoic acid, $^1$H NMR (400 MHz, DMSO-d6) δ 13.08 (s, 1H), 11.16 (s, 1H), 7.58-7.47 (m, 2H). This material was refluxed with lithiumaluminium hydride (2 M solution in THF, 4 mL) and THF (4 mL) for 6 h. Workup with water and acetic acid, filtration and extraction (EtOAc/water at pH 4), gave 362 mg of 3,5-difluoro-4-hydroxy-benzylalcohol sufficiently pure for further reactions. $^1$H NMR (400 MHz, DMSO-d6) δ 10.03 (bs, 1H), 6.94 (m, 2H), 5.23 (bs, 1H), 4.38 (s, 2H). This material (362 mg, 2.27 mmol) was dissolved in DCM (6 mL) and triethylamine (14 mmol, 1.94 mL). Methanesulfonyl chloride (530 μL, 6.8 mmol) was added, the mixture was stirred 18 h, then partitioned between 0.2 M HCl and EtOAc, the organic phase was separated, concentrated and purified by chromatography (SiO$_2$, EtOAc/PE: 1/1) to give the title compound (339 mg, 1.07 mmol). $^1$H NMR (400 MHz, Chloroform-d) δ 7.11 (d, J=8.1 Hz, 2H), 4.53 (s, 2H), 3.34 (s, 3H).

5-Bromopyridin-3-yl 3-deoxy-3-[4-(3,4,5-trifluorophenyl)-1H-1,2,3-triazol-1-yl]-2-O-(3,5-difluoro-4-hydroxybenzyl)-1-thio-α-D-galactopyranoside

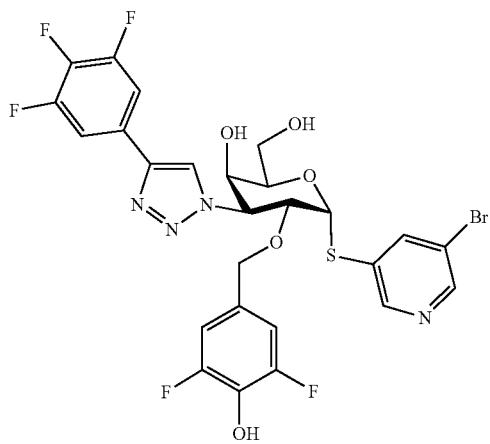

5-Bromopyridin-3-yl 4,6-O-benzylidene-3-deoxy-3-[4-(3,4,5-trifluorophenyl)-1H-1,2,3-triazol-1-yl]-1-thio-α-D-galactopyranoside (582 mg, 0.84 mmol) and NaH (60% in oil, 44 mg, 1.1 mmol) were stirred in DMF (3 mL) for 15 min. 4-(Chloromethyl)-2,6-difluorophenyl methanesulfonate (0.74 mmol, 200 mg) in DMF (1 mL) was added and the mixture was stirred for 4 h, then poured onto ice cooled water (20 mL) and HCl (1 M, 2 mL). The solids were isolated by filtration and then stirred in a mixture of MeOH (5 ml), THF (4 mL) and KOH (2 mL, 5 M) for 18 h. The mixture was acidified with HCl (pH 1-2), the solids were isolated by filtration (554 mg). This material was stirred in 80% aq TFA (4 mL) for 2 h, then partitioned between EtOAc/water, the organic phase was separated, dried, and concentrated. Further purification by chromatography (SiO$_2$, EtOAc/PE; 1/1) gave the crude title compound (111 mg). This material (110 mg) was purified by HPLC (C$_{18}$, H$_2$O/MeCN/0.1% TFA), pure fractions were analyzed by HPLC and pooled together, crystals precipitated during concentration and gave after collecting the crystals the title compound (69 mg, 14%). ESI-MS m/z calcd for [C$_{26}$H$_{20}$BrF$_5$N$_4$O$_5$S] [M+H]$^+$: 675.0; found: 675.1, $^1$H NMR (400 MHz, DMSO-d6) δ 10.10 (s, 1H), 8.75 (s, 1H), 8.71 (d, J=1.4 Hz, 1H), 8.65 (d, J=1.9 Hz, 1H), 8.35 (s, 1H), 7.84-7.71 (m, 2H), 6.73 (d, J=8.0 Hz, 2H), 6.35 (d, J=5.2 Hz, 1H), 5.64 (d, J=6.1 Hz, 1H), 4.95 (dd, J=11.4, 2.5 Hz, 1H), 4.77 (s, 1H), 4.65 (dd, J=11.4, 5.3 Hz, 1H), 4.61 (d, J=11.7 Hz, 1H), 4.39 (d, J=11.7 Hz, 1H), 4.31 (t, J=6.1 Hz, 1H), 4.09 (s, 1H), 3.52 (s, 1H), 3.49-3.38 (m, 1H).

Example 12

5-Bromopyridin-3-yl 3-deoxy-3-[4-(3,4,5-trifluorophenyl)-1H-1,2,3-triazol-1-yl]-2-O-[(1H-tetrazol-5-yl)methyl]-1-thio-α-D-galactopyranoside

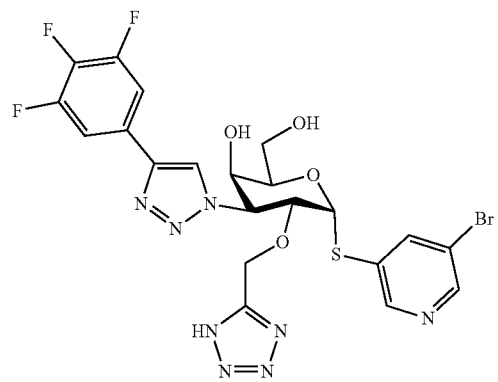

5-Bromopyridin-3-yl 4,6-O-benzylidene-3-deoxy-3-[4-(3,4,5-trifluorophenyl)-1H-1,2,3-triazol-1-yl]-1-thio-α-D-galactopyranoside (200 mg, 0.32 mmol) and NaH (60% in oil, 19 mg, 0.48 mmol) were stirred in DMF (2 mL) for 30 min. A solution of 5-(chloromethyl)tetrazole (50 mg, 0.42 mmol) in DMF (1 mL) was added and the mixture was stirred 2 h at rt, then diluted with EtOAc and washed with water and brine. The organic phase was dried, evaporated and the residue was stirred 1 h at rt in 80% aq TFA (3 mL). The mixture was concentrated and purified by HPLC (C$_{18}$, H$_2$O/MeCN/0.1% TFA) to afford the title compound (87 mg, 44%). ESI-MS m/z calcd for [C$_{21}$H$_{18}$BrF$_3$N$_8$O$_4$S] [M+H]$^+$: 615.0; found: 615.1, $^1$H NMR (400 MHz, Methanol-d$_4$) δ 8.66 (s, 1H), 8.60 (s, 1H), 8.42 (s, 1H), 8.35 (s, 1H), 7.62-7.55 (m, 2H), 6.29 (d, J=5.3 Hz, 1H), 5.13 (dd, J=11.3, 2.7 Hz, 1H), 5.07 (d, J=13.6 Hz, 1H), 5.01-4.93 (m, 2H), 4.49 (t, J=6.0 Hz, 1H), 4.21 (d, J=2.4 Hz, 1H), 3.71 (d, J=6.2 Hz, 2H).

Example 13

3,4-Dichlorphenyl 3-[4-(4-chloro-3,5-difluorophenyl)-1H-1,2,3-triazol-1-yl]-3-deoxy-2-O-[(1H-tetrazol-5-yl)methyl]-1-thio-α-D-galactopyranoside

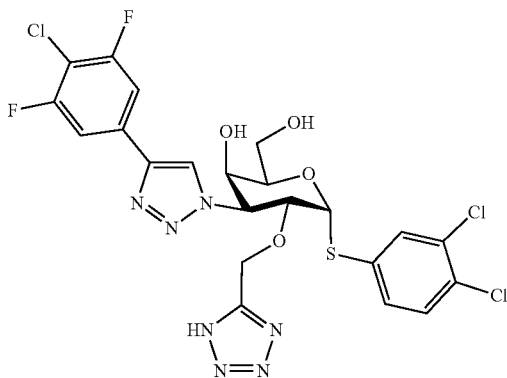

3,4-Dichlorophenyl 4,6-O-benzylidene-3-[4-(4-chloro-3,5-difluorophenyl)-1H-1,2,3-triazol-1-yl]-3-deoxy-1-thio-α-D-galactopyranoside (200 mg, 0.32 mmol) and NaH (60% in oil, 31 mg, 0.81 mmol) were stirred in DMF (2 mL) for 15 min. A solution of 5-(chloromethyl)tetrazole (189 mg, 1.60 mmol) in DMF (1.5 mL) was added and the mixture was stirred 4 h at 50° C., then diluted with EtOAc and washed with water and brine. The organic phase was dried, evaporated and the residue was stirred 1 h at rt in 80% aq TFA (4 mL). The mixture was concentrated and purified by HPLC ($C_{18}$, $H_2O$/MeCN/0.1% TFA) to afford the title compound (17 mg, 9%). ESI-MS calcd for $[C_{22}H_{18}Cl_3F_2N_7O_4S]$ $[M+H]^+$: 620.0; found: 620.1, $^1$H NMR (400 MHz, Methanol-d4) δ 8.47 (s, 1H), 7.78 (s, 1H), 7.60 (d, J=8.0 Hz, 2H), 7.49 (s, 2H), 6.19 (d, J=5.3 Hz, 1H), 5.11 (dd, J=11.4, 2.7 Hz, 1H), 5.04 (d, J=13.6 Hz, 1H), 4.98-4.92 (m, 2H), 4.49 (t, J=6.0 Hz, 1H), 4.20 (s, 1H), 3.76-3.66 (m, 2H).

Example 14

3,4-Dichlorphenyl 3-deoxy-3-[4-(3,4,5-trifluorophenyl)-1H-1,2,3-triazol-1-yl]-2-O-[(1H-tetrazol-5-yl)methyl]-1-thio-α-D-galactopyranoside

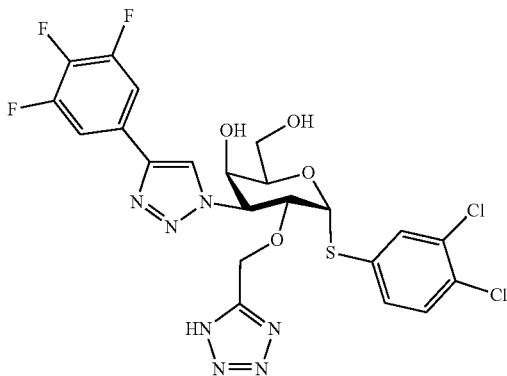

3,4-Dichlorophenyl 4,6-O-benzylidene-3-deoxy-3-[4-(3,4,5-trifluorophenyl)-1H-1,2,3-triazol-1-yl]-1-thio-α-D-galactopyranoside (200 mg, 0.33 mmol) and NaH (60% in oil, 63 mg, 1.64 mmol) were stirred in DMF (2.5 mL) for 30 min A solution of 5-(chloromethyl)tetrazole (58 mg, 0.49 mmol) in DMF (0.5 mL) was added and the mixture was stirred 1 h at 50° C., then diluted with EtOAc and washed with water and brine. The organic phase was dried, evaporated and the residue was stirred 1 h in at rt 80% aq TFA (4 mL). The mixture was concentrated and purified by HPLC ($C_{18}$, $H_2O$/MeCN/0.1% TFA) to afford the title compound (10 mg, 5%). ESI-MS calcd for $[C_{22}H_{18}C_{12}F_3N_7O_4S]$ $[M+H]^+$: 604.1; found: 604.1, $^1$H NMR (400 MHz, Methanol-$d_4$) δ 8.42 (s, 1H), 7.77 (s, 1H), 7.64-7.55 (m, 2H), 7.50-7.47 (m, 2H), 6.19 (d, J=5.3 Hz, 1H), 5.10 (dd, J=11.3, 2.6 Hz, 1H), 5.04 (d, J=13.6 Hz, 1H), 4.98-4.91 (m, 2H), 4.49 (t, J=6.0 Hz, 1H), 4.20 (d, J=2.6 Hz, 1H), 3.76-3.66 (m, 2H).

Example 15

5-Bromopyridin-3-yl 3-deoxy-3-[4-(3,4,5-trifluorophenyl)-1H-1,2,3-triazol-1-yl]-2-O-[(1H-imidazol-2-yl)methyl]-1-thio-α-D-galactopyranoside

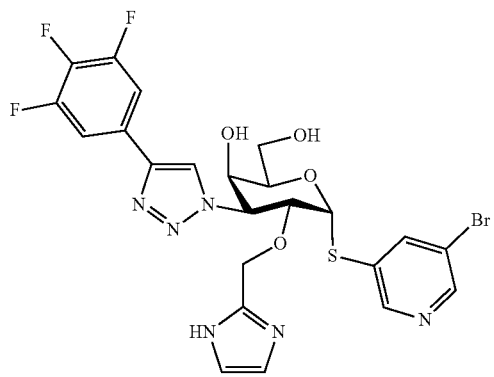

5-Bromopyridin-3-yl 4,6-O-benzylidene-3-deoxy-3-[4-(3,4,5-trifluorophenyl)-1H-1,2,3-triazol-1-yl]-1-thio-α-D-galactopyranoside (150 mg, 0.24 mmol) and NaH (60% in oil, 46 mg, 1.21 mmol) were stirred in DMF (3 mL) 10 min, before 2-(chloromethyl)-1H-imidazole hydrochloride (101 mg, 0.60 mmol) was added. The mixture was stirred 2 h at 40° C., then diluted with EtOAc and washed with water and brine. The organic phase was dried, evaporated and the residue was stirred 1 h at rt in 80% aq TFA (3 mL). The mixture was concentrated and purified by HPLC ($C_{18}$, $H_2O$/MeCN/0.1% TFA) to afford the title compound (4 mg, 3%). ESI-MS calcd for $[C_{23}H_{20}BrF_3N_6O_4S]$ $[M+H]^+$: 613.0; found: 613.1, $^1$H NMR (400 MHz, Methanol-d4) δ 8.67 (s, 1H), 8.60 (s, 1H), 8.50 (s, 1H), 8.35 (t, J=1.9 Hz, 1H), 7.64-7.57 (m, 2H), 7.44 (s, 2H), 6.26 (d, J=5.3 Hz, 1H), 5.16 (dd, J=11.3, 2.8 Hz, 1H), 5.08-5.00 (m, 2H), 4.88-4.87 (m, 1H), 4.51 (t, J=5.9 Hz, 1H), 4.23 (s, 1H), 3.76-3.67 (m, 2H).

Example 16

5-Bromopyridin-3-yl 3-deoxy-3-[4-(3,4,5-trifluorophenyl)-1H-1,2,3-triazol-1-yl]-2-O-[(1-methyl-1H-imidazol-2-yl)methyl]-1-thio-α-D-galactopyranoside

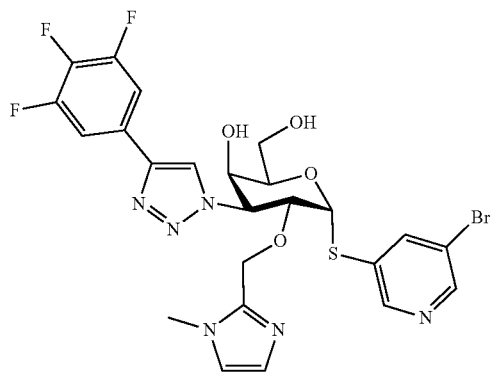

SOCl$_2$ (106 µL, 1.45 mmol) was added slowly to a solution of (1-methylimidazol-2-yl)methanol hydrochloride (59 mg, 0.36 mmol) in DCM (1 mL) and stirred 10 min at rt. The mixture was evaporated and dried under vacuum. The residue was dissolved in DMF (1 mL) and added to a stirred solution of 5-bromopyridin-3-yl 4,6-O-benzylidene-3-deoxy-3-[4-(3,4,5-trifluorophenyl)-1H-1,2,3-triazol-1-yl]-1-thio-α-D-galactopyranoside (150 mg, 0.24 mmol) and NaH (60% in oil, 46 mg, 1.21 mmol) were stirred in DMF (2 mL). The mixture was stirred 3 h at 40° C., then diluted with EtOAc and washed twice with water. The organic phase was dried, evaporated and the residue was stirred 40 min at rt in 80% aq TFA (3 mL). The mixture was concentrated and purified by HPLC (C$_{18}$, H$_2$O/MeCN/0.1% TFA) to afford the title compound (9 mg, 6%). ESI-MS calcd for [C$_{24}$H$_{22}$BrF$_3$N$_6$O$_4$S] [M+H]$^+$: 627.1; found: 627.1, $^1$H NMR (400 MHz, Methanol-d$_4$) δ 8.70 (s, 1H), 8.62 (s, 1H), 8.55 (s, 1H), 8.38 (s, 1H), 7.67-7.61 (m, 2H), 7.48 (s, 1H), 7.46 (s, 1H), 6.32 (d, J=5.3 Hz, 1H), 5.17-5.09 (m, 2H), 5.04 (dd, J=11.1, 5.6 Hz, 1H), 4.88-4.87 (m, 1H), 4.51 (t, J=5.9 Hz, 1H), 4.24 (s, 1H), 3.73 (d, J=6.4 Hz, 2H), 3.62 (d, J=4.0 Hz, 3H).

Example 17

5-Bromopyridin-3-yl 3-deoxy-3-[4-(3,4,5-trifluorophenyl)-1H-1,2,3-triazol-1-yl]-2-O-[(oxazol-2-yl)methyl]-1-thio-α-D-galactopyranoside

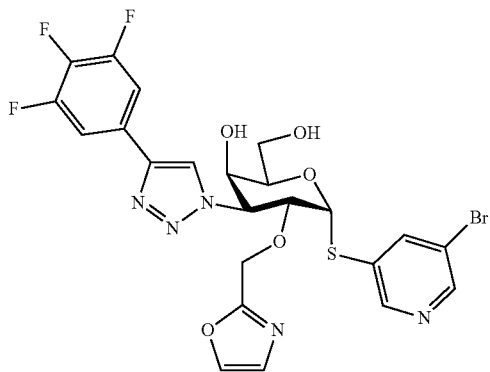

5-Bromopyridin-3-yl 4,6-O-benzylidene-3-deoxy-3-[4-(3,4,5-trifluorophenyl)-1H-1,2,3-triazol-1-yl]-1-thio-α-D-galactopyranoside (150 mg, 0.24 mmol) and NaH (60% in oil, 37 mg, 0.97 mmol) were stirred 5 min in DMF (3 mL), before 2-(chloromethyl)oxazole (62 mg, 0.48 mmol) was added. The mixture was stirred 90 min at 40° C., then diluted with EtOAc and washed with water. The organic phase was dried, evaporated and the residue was stirred 30 min at rt in 80% aq TFA (3 mL). The mixture was concentrated and purified by HPLC (C$_{18}$, H$_2$O/MeCN/0.1% TFA) to afford the title compound (16 mg, 11%). ESI-MS m/z calcd for [C$_{23}$H$_{19}$BrF$_3$N$_5$O$_5$S] [M+H]$^+$: 614.0; found: 614.1, $^1$H NMR (400 MHz, Methanol-d$_4$) δ 8.68 (d, J=1.9 Hz, 1H), 8.60 (d, J=2.1 Hz, 1H), 8.49 (s, 1H), 8.365 (t, J=2.0 Hz, 1H), 7.80-7.77 (m, 1H), 7.63 (dd, J=8.8, 6.6 Hz, 2H), 7.10 (s, 1H), 6.23 (d, J=5.3 Hz, 1H), 5.09 (dd, J=11.3, 2.8 Hz, 1H), 4.94 (dd, J=11.3, 5.3 Hz, 1H), 4.76 (d, J=13.3 Hz, 1H), 4.68 (d, J=13.3 Hz, 1H), 4.48 (t, J=5.9 Hz, 1H), 4.21 (s, 1H), 3.73-3.69 (m, 2H).

Example 18

5-Bromopyridin-3-yl 3-deoxy-3-[4-(3,4,5-trifluorophenyl)-1H-1,2,3-triazol-1-yl]-2-O-[(oxazol-5-yl)methyl]-1-thio-α-D-galactopyranoside

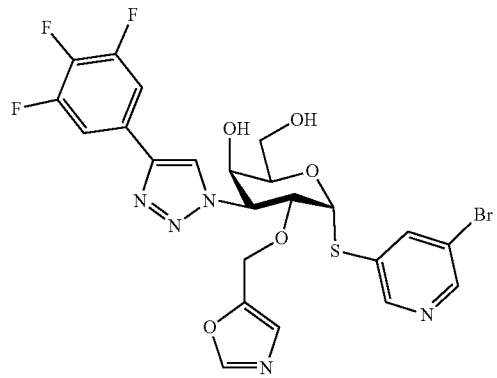

To a solution of 5-bromopyridin-3-yl 4,6-O-benzylidene-3-deoxy-3-[4-(3,4,5-trifluorophenyl)-1H-1,2,3-triazol-1-yl]-1-thio-α-D-galactopyranoside (300 mg, 0.48 mmol) and NaH (60% in oil, 56 mg, 1.45 mmol) in DMF (2 mL) 5-(bromomethyl)oxazole (195 mg, 1.21 mmol) in DMF (0.5 mL) was added. The mixture was stirred 3 h at 50° C., then diluted with EtOAc and washed with water and brine. The organic phase was dried, evaporated and the residue was purified by chromatography (SiO$_2$, EtOAc/PE). The product was stirred 1 h at rt in 80% aq TFA (4 mL). The mixture was concentrated and purified by HPLC (Cis, H$_2$O/MeCN/0.1% TFA) to afford the title compound (121 mg, 41%). ESI-MS m/z calcd for [C$_{23}$H$_{19}$BrF$_3$N$_5$O$_5$S] [M+H]$^+$: 614.0; found: 614.1, $^1$H NMR (400 MHz, Methanol-d$_4$) δ 8.70-8.67 (m, 1H), 8.60-8.57 (m, 1H), 8.41-8.39 (m, 1H), 8.37-8.33 (m, 1H), 8.01 (s, 1H), 7.64-7.59 (m, 2H), 7.09 (s, 1H), 6.23 (d, J=5.3 Hz, 1H), 5.07 (dd, J=11.2, 2.7 Hz, 1H), 4.87 (obscured by water, 1H), 4.75 (d, J=13.4 Hz, 1H), 4.62 (d, J=13.4 Hz, 1H), 4.46 (t, J=6.0 Hz, 1H), 4.20 (d, J=2.9 Hz, 1H), 3.76-3.63 (m, 2H).

Example 19

5-Bromopyridin-3-yl 3-deoxy-3-[4-(3,4,5-trifluorophenyl)-1H-1,2,3-triazol-1-yl]-2-O-[(isoxazol-3-yl)methyl]-1-thio-α-D-galactopyranoside

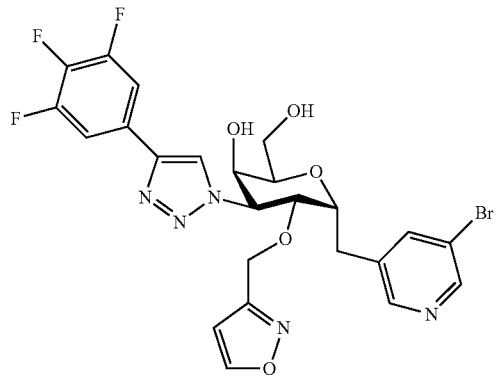

To a solution of 5-bromopyridin-3-yl 4,6-O-benzylidene-3-deoxy-3-[4-(3,4,5-trifluorophenyl)-1H-1,2,3-triazol-1-yl]-1-thio-α-D-galactopyranoside (352 mg, 0.54 mmol), NaI (82 mg, 0.54 mmol) and 3-(chloromethyl)isoxazole (100 mg, 0.81 mmol) in DMF (2 mL) NaH (60% in oil, 65 mg, 1.62 mmol) was added. The mixture was stirred 2.5 h at 50° C., then poured onto ice cooled water (20 mL) and HCl (1 M, 5 mL). The solids were isolated by filtration and crystallized in MeOH (3 mL), water (1 mL) and 28% NH$_3$ (one drop). The crystals were isolated and then stirred 1 h at rt in 80% aq TFA (3 mL). The mixture was poured onto ice and NaOH (5 M, 16 mL). The precipitate was isolated by filtration and purified by chromatography (SiO$_2$, EtOAc/PE). Crystallization of the product from EtOAc/PE gave the title compound (105 mg, 31%). ESI-MS m/z calcd for [C$_{23}$H$_{19}$BrF$_3$N$_5$O$_5$S] [M+H]$^+$: 614.0; found: 614.1, $^1$H NMR (400 MHz, Methanol-d$_4$) δ 8.68 (d, J=1.7 Hz, 1H), 8.58 (d, J=2.0 Hz, 1H), 8.49 (s, 1H), 8.34 (t, J=2.0 Hz 1H), 7.63 (m, 2H), 6.26 (d, J=5.3 Hz, 1H), 6.20 (s, 1H), 5.11 (dd, J=11.3, 2.8 Hz, 1H), 4.88 (dd, J=11.3, 5.3 Hz, 1H), 4.83 (d, J=12.6 Hz, 1H), 4.66 (d, J=12.6 Hz, 1H), 4.49 (t, J=6.0 Hz, 1H), 4.21 (d, J=2.6 Hz, 1H), 3.76-3.65 (m, 2H).

Example 20

3,4-Dichlorphenyl 3-[4-(4-chloro-3,5-difluorophenyl)-1H-1,2,3-triazol-1-yl]-3-deoxy-2-O-[(oxazol-4-yl)methyl]-1-thio-α-D-galactopyranoside

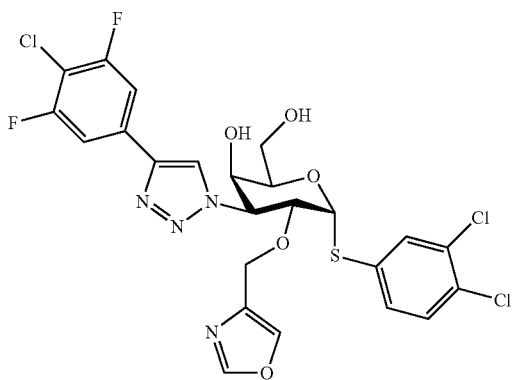

Oxazol-4-ylmethanol (40 mg, 0.38 mmol) was dissolved in THF (1 mL) and cooled to 0° C. before NaH (60% in oil, 61 mg, 1.60 mmol) was added. After 45 min methanesulfonyl chloride (30 μL, 0.38 mmol) was added and after an additional 15 min 3,4-dichlorophenyl 4,6-O-benzylidene-3-[4-(4-chloro-3,5-difluorophenyl)-1H-1,2,3-triazol-1-yl]-3-deoxy-1-thio-α-D-galactopyranoside (200 mg, 0.32 mmol) and THF (1 mL) were added. The mixture reached rt in 1 h and was then stirred 4 h at 40° C. The mixture was diluted with EtOAc (20 mL), washed with water (20 mL) and brine (20 mL) and the organic phase was dried and evaporated. The residue was stirred 1 h at rt in 80% aq TFA (3 mL). Cold water was added and decanted, the residue was coevaporated from isopropanol. The residue was purified by chromatography (SiO$_2$, EtOAc/PE). The product was further purified by HPLC (Cis, H$_2$O/MeCN/0.1% TFA) to afford the title compound (36 mg, 16%). ESI-MS m/z calcd for [C$_{24}$H$_{19}$Cl$_3$F$_2$N$_4$O$_5$S] [M+H]$^+$: 619.0; found: 619.1, $^1$H NMR (400 MHz, Methanol-d$_4$) δ 8.74 (s, 1H), 8.25 (s, 1H), 7.91 (s, 1H), 7.86 (d, J=2.0 Hz, 1H), 7.79 (d, J=8.3 Hz, 2H), 7.62 (d, J=8.4 Hz, 1H), 7.54 (dd, J=8.4, 2.0 Hz, 1H), 6.34 (d, J=5.1 Hz, 1H), 5.59 (d, J=6.2 Hz, 1H), 4.90 (dd, J=11.4, 2.7 Hz, 1H), 4.76-4.67 (m, 3H), 4.59 (d, J=12.6 Hz, 1H), 4.50 (d, J=12.6 Hz, 1H), 4.27 (t, J=5.9 Hz, 1H), 4.12-4.03 (m, 1H), 3.52 (m, 1H), 3.43 (m, 1H).

Example 21

5-Bromopyridin-3-yl 3-deoxy-3-[4-(3,4,5-trifluorophenyl)-1H-1,2,3-triazol-1-yl]-2-O-[(thiazol-4-yl)methyl]-1-thio-α-D-galactopyranoside

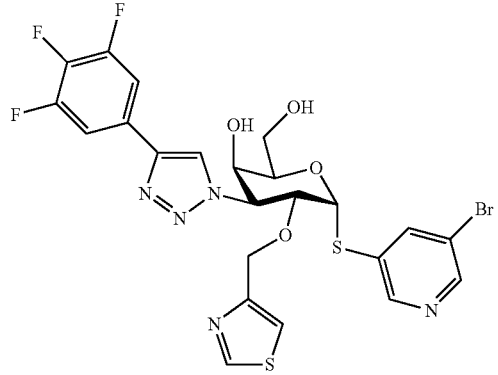

5-Bromopyridin-3-yl 4,6-O-benzylidene-3-deoxy-3-[4-(3,4,5-trifluorophenyl)-1H-1,2,3-triazol-1-yl]-1-thio-α-D-galactopyranoside (200 mg, 0.32 mmol) and NaH (60% in oil, 49 mg, 1.29 mmol) were stirred 10 min in DMF (3 mL), before 4-(chloromethyl)thiazole hydrochloride (90 mg, 0.48 mmol) was added. The mixture was stirred 3 h at 40° C., then diluted with EtOAc and washed with water and brine. The organic phase was dried, evaporated and the residue was stirred 1 h at rt in 80% aq TFA (3 mL). The mixture was concentrated and purified by chromatography (SiO$_2$, EtOAc/PE). The product was further purified by HPLC (C$_{18}$, H$_2$O/MeCN/0.1% TFA) to afford the title compound (75 mg, 37%). ESI-MS m/z calcd for [C$_{23}$H$_{19}$BrF$_3$N$_5$O$_4$S$_2$] [M+H]$^+$: 630.0; found: 630.1, $^1$H NMR (400 MHz, Methanol-d$_4$) δ 8.89 (d, J=1.9 Hz, 1H), 8.68 (d, J=1.9 Hz, 1H), 8.59 (d, J=2.1 Hz, 1H), 8.35 (d, J=1.9 Hz 1H), 7.64-7.57 (m, 2H), 6.22 (d, J=5.3 Hz, 1H), 5.10 (dd, J=11.3, 2.7 Hz, 1H), 4.91-4.86 (m, 1H), 4.71 (d, J=12.5 Hz, 1H), 4.48 (t, J=6.0 Hz, 1H), 4.22 (s, 1H), 3.75-3.65 (m, 2H).

Example 22

5-Bromopyridin-3-yl 3-deoxy-3-[4-(3,4,5-trifluorophenyl)-1H-1,2,3-triazol-1-yl]-2-O-[(thiazol-5-yl)methyl]-1-thio-α-D-galactopyranoside

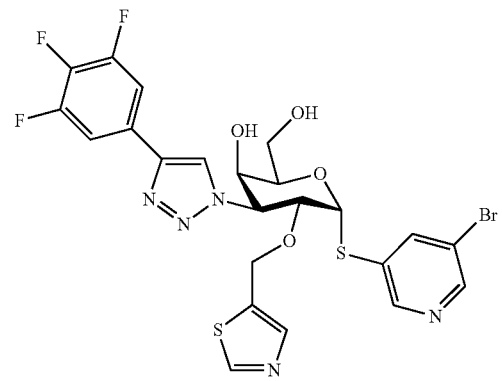

5-Hydroxymethylthiazole (131 mg, 1.08 mmol) was stirred in DCM (1.5 mL), thionyl chloride (300 μL, 4.0 mmol) was added and the mixture was stirred 10 min at rt. The mixture was evaporated, dried and stirred 5 min together with 5-bromopyridin-3-yl 4,6-O-benzylidene-3-deoxy-3-[4-(3,4,5-trifluorophenyl)-1H-1,2,3-triazol-1-yl]-1-thio-α-D-galactopyranoside (335 mg, 0.54 mmol) and NaI (162 mg, 1.08 mmol) in DMF (3.0 mL). The mixture was cooled to 0° C. and NaH (60% in oil, 132 mg, 3.3 mmol) was added. The mixture was stirred 2 h at rt, then poured onto ice cooled water (30 mL) and HCl (1 M, 5 mL). The solids were isolated by filtration and then stirred overnight in MeOH (4 mL), water (1 mL) and NH$_3$ (one drop). The precipitate was isolated by filtration and was then stirred 30 min in 80% aq TFA (4 mL). The mixture was concentrated to approximately 2 mL volume, then poured onto ice and NaOH (1 M, 20 mL). The precipitate was isolated by filtration and then stirred in EtOAc, which resulted in crystallization. The crystals were isolated and recrystallized from HOAc and water to afford the title compound (63 mg, 19%). ESI-MS m/z calcd for [C$_{23}$H$_{19}$BrF$_3$N$_5$O$_4$S$_2$] [M+H]$^+$: 630.0; found: 630.1, $^1$H NMR (400 MHz, Methanol-d4) δ 8.84 (s, 1H), 8.69 (s, 1H), 8.58 (d, J=1.7 Hz, 1H), 8.44 (s, 1H), 8.34 (s, 1H), 7.76-7.57 (m, 2H), 6.25 (d, J=5.3 Hz, 1H), 5.10 (dd, J=11.3, 2.7 Hz, 1H), 5.01 (d, J=12.6 Hz, 1H), 4.86 (dd, J=11.3, 5.3 Hz, 1H), 4.79 (d, J=12.5 Hz, 1H), 4.48 (t, J=6.0 Hz, 1H), 4.21 (s, 1H), 3.76-3.65 (m, 2H).

Example 23

5-Bromopyridin-3-yl 3-deoxy-3-[4-(3,4,5-trifluorophenyl)-1H-1,2,3-triazol-1-yl]-2-O-[(thiazol-2-yl)methyl]-1-thio-α-D-galactopyranoside

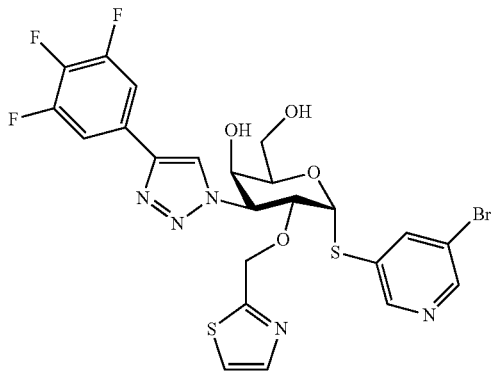

1,3-Thiazol-2ylmethanol (132 mg, 1.08 mmol) was stirred in DCM (2 mL), thionyl chloride (300 μL, 4.0 mmol) was added and the mixture was stirred 5 min at rt. The mixture was evaporated, dried and stirred together with 5-bromopyridin-3-yl 4,6-O-benzylidene-3-deoxy-3-[4-(3,4,5-trifluorophenyl)-1H-1,2,3-triazol-1-yl]-1-thio-α-D-galactopyranoside (224 mg, 0.36 mmol) in DMF (3.0 mL). NaH (60% in oil, 160 mg, 4.0 mmol) was added. The mixture was stirred 18 h at rt, then poured onto ice cooled water (20 mL) and HCl (1 M, 5 mL). The solids were isolated by filtration and then purified by chromatography (SiO$_2$, EtOAc/PE). The product was stirred 1 h in 80% aq TFA (1.5 mL). The mixture was concentrated and purified by HPLC (C$_{18}$, H$_2$O/MeCN/0.1% TFA) to afford the title compound (35 mg, 13%). ESI-MS m/z calcd for [C$_{23}$H$_{19}$BrF$_3$N$_5$O$_4$S$_2$] [M+H]$^+$: 630.0; found: 629.7, $^1$H NMR (400 MHz, Methanol-d$_4$) δ 8.70 (d, J=1.9 Hz, 1H), 8.59 (d, J=2.1 Hz, 1H), 8.54 (s, 1H), 8.37 (t, J=2.0 Hz, 1H), 7.69 (d, J=3.3 Hz, 1H), 7.66-7.58 (m, 2H), 7.48 (d, J=3.3 Hz, 1H), 6.29 (d, J=5.3 Hz, 1H), 5.15 (dd, J=11.4, 2.8 Hz, 1H), 5.07 (d, J=13.1 Hz, 1H), 4.98 (dd, J=11.3, 5.3 Hz, 1H), 4.83 (d, J=13.1 Hz, 1H), 4.50 (t, J=5.9 Hz, 1H), 4.23 (d, J=2.0 Hz, 1H), 3.77-3.67 (m, 2H).

Example 24

4-Chloro-N,N-dimethyl-benzamide-2-yl 3-deoxy-3-[4-(3,4,5-trifluorophenyl)-1H-1,2,3-triazol-1-yl]-2-O-[(thiazol-4-yl)methyl]-1-thio-α-D-galactopyranoside

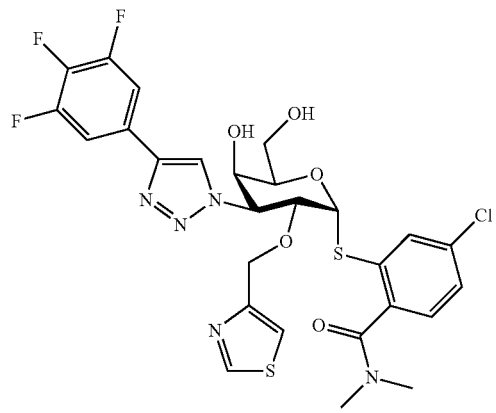

5-Chloro-2-cyanophenyl 2,4,6-tri-O-acetyl-3-azido-3-deoxy-1-thio-α-D-galactopyranoside

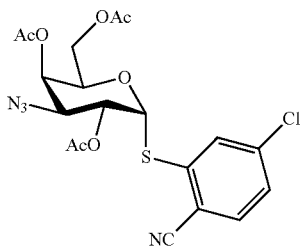

2,4,6-Tri-0-acetyl-3-azido-3-deoxy-β-D-galactopyranosyl chloride (WO2016120403) (9.6 g, 27.3 mmol), 4-chloro-2-sulfanylbenzonitrile (5.1 g, 30.1 mmol), Cs$_2$CO$_3$ (17.8 g, 54.7 mmol) and DMF (40 mL) were stirred 20 h at rt. The mixture was partitioned between diethyl ether/EtOAc/aq HCl/water, the organic phase was separated, concentrated, and the residue was subjected to chromatography (SiO$_2$, PE/EtOAc) to afford the product (5.63 g, 42%). $^1$H NMR (400 MHz, Chloroform-d) δ 7.69 (d, J=1.7 Hz, 1H), 7.61 (d, J=8.3 Hz, 1H), 7.39 (dd, J=8.3, 1.9 Hz, 1H), 6.07 (d, J=5.5 Hz, 1H), 5.51 (d, J=2.2 Hz, 1H), 5.31 (dd, J=11.0, 5.5 Hz, 1H), 4.68-4.60 (m, 1H), 4.14 (dd, J=11.7, 5.1 Hz, 1H), 4.05 (dd, J=11.6, 7.6 Hz, 1H), 3.99 (dd, J=11.0, 3.2 Hz, 1H), 2.23 (s, 3H), 2.17 (s, 3H), 2.02 (s, 3H).

5-Chloro-2-cyanophenyl 3-deoxy-3-[4-(3,4,5-trifluorophenyl)-1H-1,2,3-triazol-1-yl]-1-thio-α-D-galactopyranoside

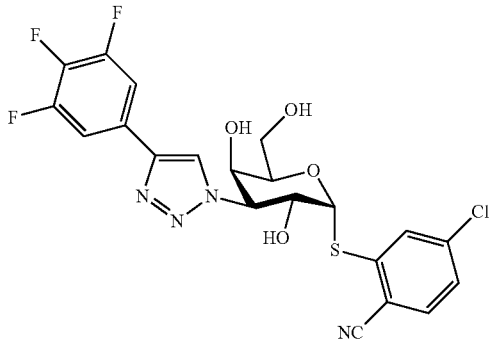

5-Chloro-2-cyanophenyl 2,4,6-tri-O-acetyl-3-azido-3-deoxy-1-thio-α-D-galactopyranoside (454 mg, 0.94 mmol), trimethyl-[2-(3,4,5-trifluorophenyl)ethynyl]silane (429 mg, 1.88 mmol) and K$_2$CO$_3$ (1.30 g, 9.41 mmol) were weighed into a glass flask and purged with nitrogen. MeOH (5.0 mL) and THF (5.0 mL) were added followed by a solution of copper(II) sulfate pentahydrate (40 mg, 0.16 mmol) and (+)-sodium L-ascorbate (70 mg, 0.35 mmol) in water (2.5 mL). The mixture was stirred 8 h at 60° C. and then copper(II) sulfate pentahydrate (40 mg, 0.16 mmol) and (+)-sodium L-ascorbate (70 mg, 0.35 mmol) were added. Stirring was continued for 4 h at 60° C. The mixture was filtered through a pad of silica eluted with EtOAc and concentrated. The residue was purified by chromatography (SiO$_2$, PE/EtOAc) to afford a residue that was recrystallized first from EtOAc/hexanes and then from EtOH and water to give the product (248 mg, 51%). ESI-MS m/z calcd for [C$_{21}$H$_{16}$ClF$_3$N$_4$O$_4$S] [M+H]$^+$: 513.06; found: 513.1. $^1$H NMR (400 MHz, Methanol-d$_4$) δ 8.55 (s, 1H), 7.98 (d, J=1.8 Hz, 1H), 7.74 (d, J=8.4 Hz, 1H), 7.71-7.61 (m, 2H), 7.47 (dd, J=8.4, 1.9 Hz, 1H), 6.13 (d, J=5.1 Hz, 1H), 5.06 (dd, J=11.4, 2.6 Hz, 1H), 4.99 (dd, J=11.4, 5.2 Hz, 1H), 4.42 (t, J=6.1 Hz, 1H), 4.23 (d, J=2.4 Hz, 1H), 3.71 (dd, J=11.4, 5.6 Hz, 1H), 3.64 (dd, J=11.3, 6.6 Hz, 1H).

2-Carboxy-5-chlorophenyl 3-deoxy-3-[4-(3,4,5-trifluorophenyl)-1H-1,2,3-triazol-1-yl]-1-thio-α-D-galactopyranoside

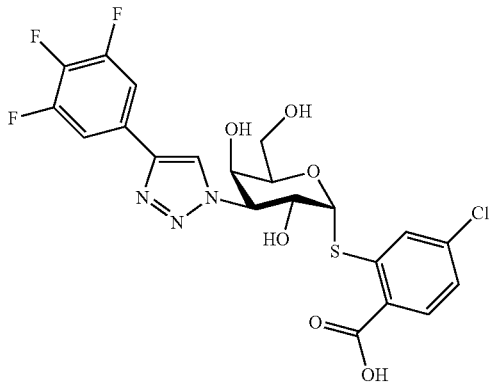

5-Chloro-2-cyanophenyl 3-deoxy-3-[4-(3,4,5-trifluorophenyl)-1H-1,2,3-triazol-1-yl]-1-thio-α-D-galactopyranoside (717 mg, 1.39 mmol) was stirred 5 h under nitrogen at 80° C. in a mixture of EtOH (36 mL) and NaOH (18 mL, 3 M). The mixture was concentrated to approximately 25 mL and acidified to approximately pH 1 with HCl (5 M). The precipitate was isolated by filtration and gave the product (702 mg, 95%). $^1$H NMR (400 MHz, Methanol-d$_4$) δ 8.55 (s, 1H), 7.96-7.88 (m, 2H), 7.70-7.59 (m, 2H), 7.29 (d, J=8.4 Hz, 1H), 6.00 (d, J=5.4 Hz, 1H), 5.09 (dd, J=11.5, 2.7 Hz, 1H), 4.99 (dd, J=11.4, 5.4 Hz, 1H), 4.42 (t, J=6.2 Hz, 1H), 4.22 (s, 1H), 3.76 (dd, J=11.3, 6.0 Hz, 1H), 3.67 (dd, J=11.2, 6.3 Hz, 1H).

4-Chloro-N,N-dimethyl-benzamide-2-yl 3-deoxy-3-[4-(3,4,5-trifluorophenyl)-1H-1,2,3-triazol-1-yl]-1-thio-α-D-galactopyranoside

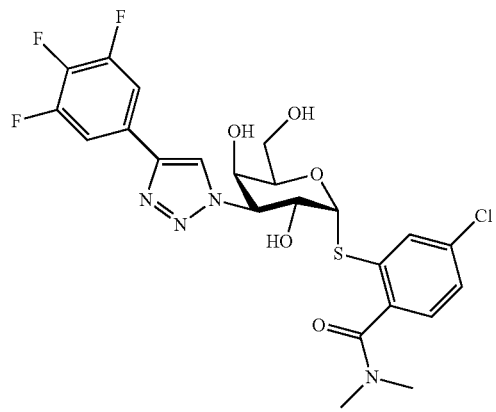

2-Carboxy-5-chlorophenyl 3-deoxy-3-[4-(3,4,5-trifluorophenyl)-1H-1,2,3-triazol-1-yl]-1-thio-α-D-galactopyranoside (473 mg, 0.82 mmol), 1-hydroxybenzotriazole hydrate (195 mg, 1.23 mmol) and N-β-dimethylaminopropyl)-N'-ethylcarbodiimide hydrochloride (243 mg, 1.23 mmol) were stirred in DMF (3 mL) and dimethylamine (0.82 mL, 2M solution in THF, 1.64 mmol) was added followed by DIEA (0.14 mL, 0.82 mmol). The mixture was stirred 6 h at rt, then water (20 mL) was added and decanted. The residue was stirred in EtOH (5 mL) and NaOH (1.0 mL, 2 M) 1 h at rt, then poured onto ice/water and HCl. The precipitate was collected by filtration and purified by chromatography (SiO$_2$, PE/EtOAc) to afford the product (268 mg, 58%). ESI-MS m/z calcd for [C$_{23}$H$_{22}$ClF$_3$N$_4$O$_5$S] [M+H]$^+$: 559.1; found: 558.7. $^1$H NMR (400 MHz, Methanol-d$_4$) δ 8.53 (s, 1H), 7.86 (s, 1H), 7.65 (m, 2H), 7.42 (d, J=8.2 Hz, 1H), 7.27 (d, J=8.2 Hz, 1H), 5.92 (d, J=5.0 Hz, 1H), 4.96 (dd, J=11.4, 2.5 Hz, 1H), 4.90 (dd, J=11.4, 5.0 Hz, 1H), 4.48 (t, J=6.1 Hz, 1H), 4.19 (s, 1H), 3.71 (m, 2H), 3.13 (s, 3H), 2.90 (s, 3H).

4-Chloro-N,N-dimethyl-benzamide-2-yl 4,6-O-benzylidene-3-deoxy-3-[4-(3,4,5-trifluorophenyl)-1H-1,2,3-triazol-1-yl]-1-thio-α-D-galactopyranoside

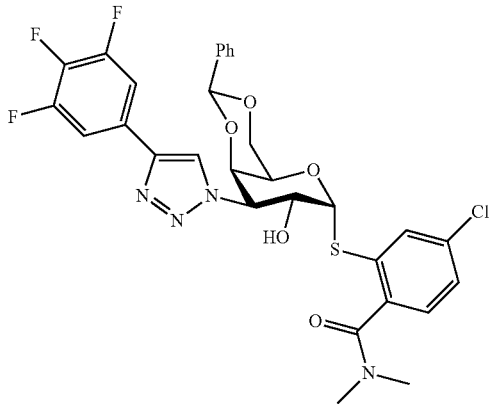

A solution of 4-chloro-N,N-dimethyl-benzamide-2-yl 3-deoxy-3-[4-(3,4,5-trifluorophenyl)-1H-1,2,3-triazol-1-yl]-thio-α-D-galactopyranoside (200 mg, 0.36 mmol), benzaldehyde dimethylacetal (110 µL, 1.36 mmol) and p-toluenesulfonic acid monohydrate (5 mg, 0.026 mmol) in MeCN (10 mL) were stirred 20 h at rt. The mixture was concentrated and purified by chromatography (SiO$_2$, PE/EtOAc) to afford the title compound (216 mg, 93%). ESI-MS calcd for [C$_{30}$H$_{26}$ClF$_3$N$_4$O$_5$S] [M+NH$_3$]$^+$: 663.2; found: 663.2. $^1$H NMR (400 MHz, Chloroform-d) δ 8.04 (d, J=2.4 Hz, 1H), 7.73 (d, J=2.0 Hz, 1H), 7.47-7.41 (m, 2H), 7.39 (dd, J=8.1, 2.1 Hz, 2H), 7.36 (s, 5H), 7.18 (d, J=8.2 Hz, 1H), 5.91 (d, J=4.8 Hz, 1H), 5.49 (s, 1H), 5.14 (dd, J=11.3, 3.1 Hz, 1H), 4.88 (dd, J=11.3, 4.9 Hz, 1H), 4.55 (d, J=2.5 Hz, 1H), 4.41 (d, J=12.7 Hz, 1H), 4.31 (s, 1H), 4.18 (d, J=13.9 Hz, 1H), 3.12 (s, 3H), 2.87 (s, 3H).

4-Chloro-N,N-dimethyl-benzamide-2-yl 3-deoxy-3-[4-(3,4,5-trifluorophenyl)-1H-1,2,3-triazol-1-yl]-2-O-[(thiazol-4-yl)methyl]-1-thio-α-D-galactopyranoside

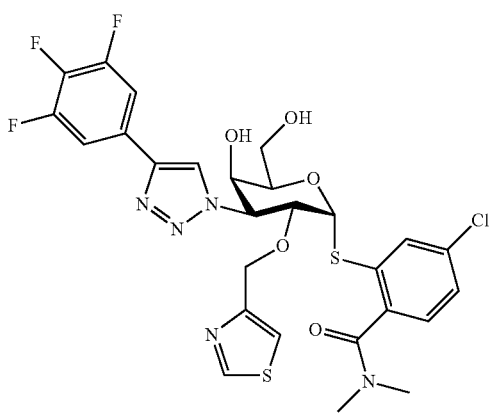

4-Chloro-N,N-dimethyl-benzamide-2-yl 4,6-O-benzylidene-3-deoxy-3-[4-(3,4,5-trifluorophenyl)-1H-1,2,3-triazol-1-yl]-1-thio-α-D-galactopyranoside (74 mg, 0.11 mmol) and NaH (60% in oil, 17 mg, 0.45 mmol) were stirred 10 min in DMF (1.5 mL), before 4-(chloromethyl)thiazole hydrochloride (31 mg, 0.17 mmol) was added. The mixture was stirred 2 h at 40° C., then diluted with EtOAc and washed with water and brine. The organic phase was dried, evaporated and the residue was stirred 1 h at rt in 80% aq TFA (2 mL). The mixture was concentrated and purified by HPLC (C$_{18}$, H$_2$O/MeCN/0.1% TFA) to afford the title compound (24 mg, 32%). ESI-MS m/z calcd for [C$_{27}$H$_{25}$ClF$_3$N$_5$O$_5$S$_2$] [M+NH$_3$]$^+$: 672.1; found: 671.8, $^1$H NMR (400 MHz, Methanol-d$_4$) δ 8.92 (d, J=1.8 Hz, 1H), 8.45 (s, 1H), 7.87 (s, 1H), 7.61 (d, J=8.0 Hz, 2H), 7.47 (d, J=8.5 Hz, 1H), 7.41 (s, 1H), 7.30 (d, J=8.1 Hz, 1H), 6.25 (d, J=4.7 Hz, 1H), 5.07 (dd, J=11.4, 2.7 Hz, 1H), 4.90-4.86 (m, 1H), 4.81 (dd, J=10.8, 5.2 Hz, 4H), 4.69 (d, J=12.5 Hz, 1H), 4.59-4.52 (m, 1H), 4.23 (s, 1H), 3.76-3.70 (m, 2H), 3.05 (s, 3H), 2.87 (s, 3H).

Example 25

4-Chloro-N,N-dimethyl-benzamide-2-yl 3-deoxy-3-[4-(3,4,5-trifluorophenyl)-1H-1,2,3-triazol-1-yl]-2-O-[(1H-tetrazol-5-yl)methyl]-1-thio-α-D-galactopyranoside

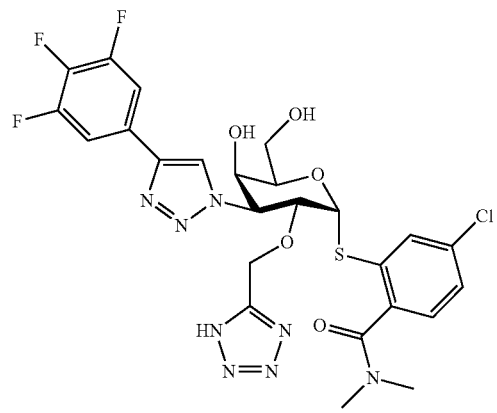

To a solution of 4-chloro-N,N-dimethyl-benzamide-2-yl 3-deoxy-3-[4-(3,4,5-trifluorophenyl)-1H-1,2,3-triazol-1-yl]-1-thio-α-D-galactopyranoside (53 mg, 0.095 mmol) and p-toluenesulfonic acid monohydrate (3.6 mg, 0.019 mmol) in MeCN (3 mL) benzaldehyde dimethylacetal (29 µL, 0.19 mmol) was added and the mixture was stirred 4 h at rt. The mixture was neutralized with triethylamine (6.5 µL, 0.047 mmol) and concentrated. The residue and NaH (60% in oil, 11 mg, 0.28 mmol) were stirred 20 min in DMF (3 mL), before 5-(chloromethyl)1H-tetrazole (23 mg, 0.19 mmol) was added. The mixture was stirred 2 h at 40° C., then diluted with EtOAc and washed with water and brine. The organic phase was dried, evaporated and the residue was stirred 1 h at rt in 80% aq TFA (2 mL). The mixture was concentrated and purified by HPLC (C$_{18}$, H$_2$O/MeCN/0.1% TFA) to afford the title compound (20 mg, 33%). ESI-MS m/z calcd for [C$_{25}$H$_{24}$ClF$_3$N$_8$O$_5$S] [M+H]$^+$: 641.1; found: 641.2, $^1$H NMR (400 MHz, Methanol-d$_4$) δ 8.42 (s, 1H), 7.89 (s, 1H), 7.62-7.56 (m, 2H), 7.47 (d, J=7.6 Hz, 1H), 7.30 (d, J=8.1 Hz, 1H), 6.28 (d, J=3.2 Hz, 1H), 5.12-5.05 (m, 2H), 4.96-4.88 (m, 2H), 4.57 (t, J=5.2 Hz, 1H), 4.21 (d, J=2.2 Hz, 1H), 3.74 (d, J=6.0 Hz, 2H), 2.99 (s, 3H), 2.83 (s, 3H).

Example 26

5-Bromopyridin-3-yl 2-O-carboxypropyl-3-deoxy-3-[4-(3,4,5-trifluorophenyl)-1H-1,2,3-triazol-1-yl]-1-thio-α-D-galactopyranoside

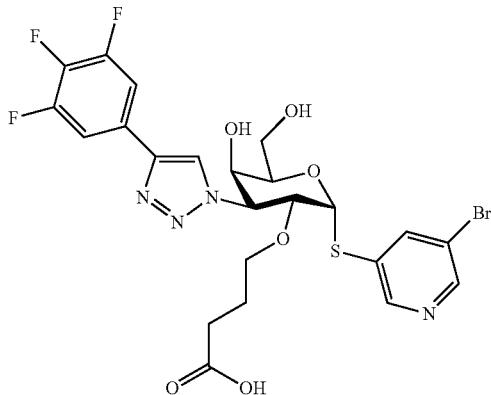

To a solution of 5-bromopyridin-3-yl 4,6-O-benzylidene-3-deoxy-3-[4-(3,4,5-trifluorophenyl)-1H-1,2,3-triazol-1-yl]-1-thio-α-D-galactopyranoside (888 mg, 1.42 mmol), NaI (454 mg, 3.0 mmol) and tert-butyl 4-bromobutanoate (460 mg, 2.0 mmol) in DMF (10 mL) NaH (60% in oil, 120 mg, 2.86 mmol) was added. The mixture was stirred 20 h at rt, then poured onto ice cooled water (80 mL) and HCl (1 M, 10 mL). The solids were isolated by filtration, then partitioned between EtOAc and water. The organic phase was dried, evaporated and purified by chromatography (SiO$_2$, EtOAc/PE). The obtained material was triturated in EtOAc/PE (1:1) to give a product that was stirred 45 min at rt in 80% aq TFA (3 mL). The mixture was concentrated and purified by HPLC (C$_{18}$, H$_2$O/MeCN/0.1% TFA) to afford the title compound (23 mg, 3%). ESI-MS m/z calcd for [C$_{23}$H$_{22}$BrF$_3$N$_4$O$_6$S] [M+H]$^+$: 619.0; found: 619.1, $^1$H NMR (400 MHz, DMSO-d6) δ 11.91 (s, 1H), 8.85 (s, 1H), 8.68 (s, 1H), 8.63 (s, 1H), 8.33 (s, 1H), 7.86-7.74 (m, 2H), 6.36 (d, J=5.2 Hz, 1H), 5.59 (d, J=6.1 Hz, 1H), 4.89 (d, J=11.5 Hz, 1H), 4.76 (s, 1H), 4.57 (dd, J=11.3, 5.2 Hz, 1H), 4.28 (d, J=6.1 Hz, 1H), 4.06 (s, 1H), 3.79-3.67 (m, 1H), 3.59-3.47 (m, 1H), 3.47-3.34 (m, 2H), 2.00 (t, J=7.3 Hz, 2H), 1.54 (q, J=6.8 Hz, 2H).

Examples 27 and 28

5-Bromopyridin-3-yl 2-O-(1-carboxy)ethyl)-3-deoxy-3-[4-(3,4,5-trifluorophenyl)-1H-1,2,3-triazol-1-yl]-1-thio-α-D-galactopyranoside (Diastereomer 1)

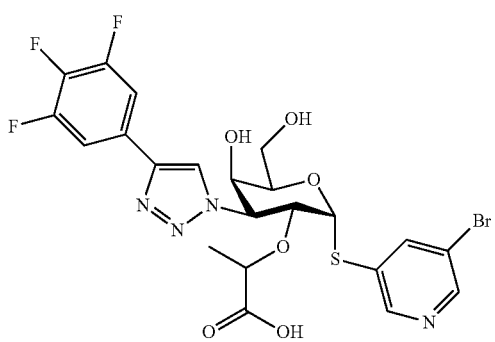

Diastereoisomer 1

5-Bromopyridin-3-yl 2-O-(1-carboxy)ethyl)-3-deoxy-3-[4-(3,4,5-trifluorophenyl)-1H-1,2,3-triazol-1-yl]-1-thio-α-D-galactopyranoside (Diastereomer 2)

Diastereoisomer 2

To a solution of 5-bromopyridin-3-yl 4,6-O-benzylidene-3-deoxy-3-[4-(3,4,5-trifluorophenyl)-1H-1,2,3-triazol-1-yl]-1-thio-α-D-galactopyranoside (150 mg, 0.24 mmol) and NaH (60% in oil, 14 mg, 0.36 mmol) in DMF (2 mL) 2-bromopropanoate (35 μL, 0.31 mmol) was added. The mixture was stirred 1 h at rt, then diluted with EtOAc and washed with water and brine. The organic phase was dried, evaporated and the residue was stirred 1 h at rt in 80% aq TFA (3 mL). The mixture was concentrated and dissolved together with LiOHxH$_2$O (50 mg, 1.21 mmol) in THF/H$_2$O (3.5 mL, 9:1). After stirring 3 h at rt the mixture was concentrated and purified by HPLC (C$_{18}$, H$_2$O/MeCN/0.1% TFA). The two diastereomers were isolated without determining the exact stereochemistry of the 2-O-(1-carboxy) ethyl) substituent. Diastereomer 1 (36 mg, 25%) was eluted first on the C$_{18}$ column in the HPLC and diastereomer 2 (34 mg, 23%) eluted second.

5-Bromopyridin-3-yl 2-O-(1-carboxy)ethyl)-3-deoxy-3-[4-(3,4,5-trifluorophenyl)-1H-1,2,3-triazol-1-yl]-1-thio-α-D-galactopyranoside (Diastereomer 1)

ESI-MS m/z calcd for [C$_{22}$H$_{20}$BrF$_3$N$_4$O$_6$S] [M+H]$^+$: 605.0; found: 605.1, $^1$H NMR (400 MHz, Methanol-d$_4$) δ 8.71-8.67 (m, 2H), 8.57 (d, J=1.6 Hz, 1H), 8.36-8.34 (m, 1H), 7.70-7.63 (m, 2H), 6.24 (d, J=5.3 Hz, 1H), 5.09 (dd, J=11.2, 2.6 Hz, 1H), 4.87-4.83 (m, 1H), 4.49 (t, J=6.0 Hz, 1H), 4.23 (d, J=2.2 Hz, 1H), 3.95 (q, J=6.8 Hz, 1H), 3.76-3.68 (m, 2H), 1.04 (d, J=6.8 Hz, 3H).

5-Bromopyridin-3-yl 2-O-(1-carboxy)ethyl)-3-deoxy-3-[4-(3,4,5-trifluorophenyl)-1H-1,2,3-triazol-1-yl]-1-thio-o-D-galactopyranoside (Diastereomer 2)

ESI-MS calcd for [C$_{22}$H$_{20}$BrF$_3$N$_4$O$_6$S] [M+H]$^+$: 605.0; found: 605.1, $^1$H NMR (400 MHz, Methanol-d4) δ 8.79 (s, 1H), 8.71 (d, J=1.8 Hz, 1H), 8.60 (d, J=2.0 Hz, 1H), 8.39 (t, J=2.0 Hz, 1H), 7.60 (dd, J=8.7, 6.6 Hz, 2H), 6.35 (d, J=5.1 Hz, 1H), 5.11 (dd, J=11.3, 2.8 Hz, 1H), 5.00 (dd, J=11.3, 5.2 Hz, 1H), 4.50-4.45 (m, 1H), 4.43 (q, J=6.8 Hz, 1H), 4.25 (d, J=2.2 Hz, 1H), 3.74-3.63 (m, 2H), 1.38 (d, J=6.8 Hz, 3H).

REFERENCES

Aits S, Kricker J, Liu B, Ellegaard A M, Hamalisto S, Tvingsholm S, Corcelle-Termeau E, Høgh S, Farkas T, Holm Jonassen A, Gromova I, Mortensen M, Jäättelä M. (2015) Sensitive detection of lysosomal membrane permeabilization by lysosomal galectin puncta assay Autophagy. 2015; 11(8):1408-24.

Almkvist, J., Faldt, J., Dahlgren, C., Leffler, H., and Karlsson, A. (2001) Lipopolysaccharide-induced gelatinase granule mobilization primes neutrophils for activation by galectin-3 and f-Met-Leu-Phe. *Infect. Immun.* Vol. 69: 832-837.

Arthur C M, Baruffi M D, Cummings R D, Stowell S R. (2015) Evolving mechanistic insights into galectin functions. Methods Mol Biol. 1207:1-35.

Blanchard H, Yu X, Collins P M, Bum-Erdene K. (2014) Galectin-3 inhibitors: a patent review (2008-present). Expert Opin Ther Pat. 2014 October; 24(10):1053-65.

Blidner A G, Méndez-Huergo S P, Cagnoni A J, Rabinovich G A. (2015) Re-wiring regulatory cell networks in immunity by galectin-glycan interactions. FEBS Lett. 2015 Sep. 6. pii: S0014-5793(15)00807-8.

Chen, W.-S., Leffler H., Nilsson, U. J., Panjwani, N. (2012). Targeting Galectin-1 and Galectin-3 Attenuates VEGF-A-induced Angiogenesis; *Mol. Biol. Cell* (suppl), Abstract No. 2695.

Clare D K, Magescas J, Piolot T, Dumoux M, Vesque C, Pichard E, Dang T, Duvauchelle B, Poirier F, Delacour D. (2014) Basal foot MTOC organizes pillar MTs required for coordination of beating cilia. Nat Commun. 5:4888.

Cumpstey, I., Carlsson, S., Leffler, H. and Nilsson, U. J. (2005) Synthesis of a phenyl thio-ß-D-galactopyranoside library from 1,5-difluoro-2,4-dinitrobenzene: discovery of efficient and selective monosaccharide inhibitors of galectin-7. *Org. Biomol. Chem.* 3: 1922-1932.

Cumpstey, I., Sundin, A., Leffler, H. and Nilsson, U. J. (2005) $C_2$-Symmetrical thiodigalactoside bis-benzamido derivatives as high-affinity inhibitors of galectin-3: Efficient lectin inhibition through double arginine-arene interactions. *Angew. Chem. Int. Ed.* 44: 5110-5112.

Cumpstey, I., Salomonsson, E., Sundin, A., Leffler, H. and Nilsson, U. J. (2008) Double affinity amplification of galectin-ligand interactions through arginine-arene interactions: Synthetic, thermodynamic, and computational studies with aromatic diamido-thiodigalactosides. *Chem. Eur. J.* 14: 4233-4245.

Delaine, T., Cumpstey, I., Ingrassia, L., Le Mercier, M., Okechukwu, P., Leffler, H., Kiss, R., and Nilsson, U. J. (2008). Galectin-Inhibitory Thiodigalactoside Ester Derivatives Have Anti-Migratory Effects in Cultured Lung and Prostate Cancer Cells. *J Med Chem* 51; 8109-8114.

Demotte, N., Wieers, G., van der Smissen, P., Moser, M., Schmidt, C., Thielemans, K., et al., (2010). *Cancer Res.* 70; 7476-7488.

Ebrahim A H, Alalawi Z, Mirandola L, Rakhshanda R, Dahlbeck S, Nguyen D, Jenkins M I, Grizzi F, Cobos E, Figueroa J A, Chiriva-Internati M (2014) Galectins in cancer: carcinogenesis, diagnosis and therapy. Ann Transl Med. 2014 September; 2(9):88.

Elola M T, Blidner A G, Ferragut F, Bracalente C, Rabinovich G A. (2015) Assembly, organization and regulation of cell-surface receptors by lectin-glycan complexes. Biochem J. 2015 Jul. 1; 469(1):1-16.

Farkas, I.; Szabó, I. F.; Bognár, R.; Anderle, D. Carbohydr. Res. 1976, 48, 136-138.

Funasaka T, Raz A, Nangia-Makker P. (2014) Nuclear transport of galectin-3 and its therapeutic implications. Semin Cancer Biol. 2014 August; 27:30-8.

Giguère, D.; Bonin, M.-A.; Cloutier, P.; Patnam, R.; St-Pierre, C.; Sato, S.; Roy, R. Bioorganic & Medicinal Chemistry 2008, 16, 7811-7823.

Giguère, D.; André, S.; Bonin, M.-A.; Bellefleur, M.-A.; Provencal, A.; Cloutier, P.; Pucci, B.; Roy, R.; Gabius, H.-J. Bioorganic & Medicinal Chemistry 2011, 19, 3280-3287

Giguere, D., Patnam, R., Bellefleur, M.-A., St.-Pierre, C., Sato, S., and Roy, R. (2006). Carbohydrate triazoles and isoxazoles as inhibitors of galectins-1 and -3. *Chem Commun:* 2379-2381.

Glinsky, G. V., Price, J. E., Glinsky, V. V., Mossine, V. V., Kiriakova, G., and Metcalf, J. B. (1996). *Cancer Res* 56: 5319-5324.

Synthetic Galectin-3 Inhibitor Increases Metastatic Cancer Cell Sensitivity to Taxol-Induced Apoptosis In Vitro and In Vivo. Neoplasia 11; 901-909.

Huflejt, M. E. and Leffler, H. (2004) Galectin-4 in normal tissues and cancer. *Glycoconj. J.* 20: 247-255.

Ingrassia et al. (2006) A Lactosylated Steroid Contributes in Vivo Therapeutic Benefits in Experimental Models of Mouse Lymphoma and Human Glioblastoma. *J. Med. CHem.* 49: 1800-1807.

John, C. M., Leffler, H, Kahl-Knutsson, B., Svensson, I., and Jarvis, G. A. (2003) Truncated Galectin-3 Inhibits Tumor Growth and Metastasis in Orthotopic Nude Mouse Model of Human Breast Cancer. *Clin. Cancer Res.* 9: 2374-2383.

Kouo, T., Huang, L., Pucsek, A. B., Cao, M., Solt, S., Armstrong, T., Jaffee, E. (2015) *Cancer Immnonol. Res.* 3: 412-23

Leffler, H. and Barondes, S. H. (1986) Specificity of binding of three soluble rat lung lectins to substituted and unsubstituted mammalian beta-galactosides. *J. Biol. Chem.* 261: 10119-10126.

Leffler, H. Galectins Structure and Function—A Synopsis in Mammalian Carbohydrate Recognition Systems (Crocker, P. ed.) Springer Verlag, Heidelberg, 2001 pp. 57-83.

Leffler, H., Carlsson, S., Hedlund, M., Qian, Y. and Poirier, F. (2004) Introduction to galectins. *Glycoconj. J.* 19: 433-440.

Lepur A, Salomonsson E, Nilsson U J, Leffler H. (2012) Ligand induced galectin-3 protein self-association. J Biol Chem. 2012 Jun. 22; 287(26):21751-6.

Li L C, Li J, Gao J. (2014) Functions of galectin-3 and its role in fibrotic diseases. J Pharmacol Exp Ther. 2014 November; 351(2):336-43.

MacKinnon, A. C., Farnworth, S. L., Henderson, N. C., Hodkinson, P. S., Kipari, T., Leffler, H., Nilsson, U. J., Haslett, C., Hughes, J., and Sethi T. (2008). Regulation of alternative macrophage activation by Galectin-3. *J. Immun.* 180; 2650-2658.

Mackinnon, A., Gibbons, M., Farnworth, S., Leffler, H., Nilsson, U. J., Delaine, T., Simpson, A., Forbes, S., Hirani, N., Gauldie, J., and Sethi T. (2012). Regulation of TGF-β1 driven lung fibrosis by Galectin-3. *Am. J. Resp. Crit. Care Med., in press.*

Massa, S. M., Cooper, D. N. W., Leffler, H., Barondes, S. H. (1993) L-29, an endogenous lectin, binds to glycoconjugate ligands with positive cooperativity. *Biochemistry* 32: 260-267.

Melero, I., Berman, D. M., Aznar, M. A., Korman, A. J., Gracia, J. L. P., Haanen, J. (2015) *Nature Reviews Cancer,* 15: 457-472

Partridge, E. A., Le Roy, C., Di Guglielmo, G. M., Pawling, J., Cheung, P., Granovsky, M., Nabi, I. R., Wrana, J. L., and Dennis, J. W. (2004). Regulation of cytokine receptors by Golgi N-glycan processing and endocytosis. *Science* 306: 120-124.

Pienta, Naik, H., Akhtar, A., Yamazaki, K., Reploge, T. S., Lehr, J., Donat, T. L., Tait, L., Hogan, V., and Raz, A. (1995). Inhibition of spontaneous metastasis in a rat prostate cancer model by oral administration of modified citrus pectin. *J Natl Cancer Inst* 87, 348-353.

Ramos-Soriano, J.; Niss, U.; Angulo, J.; Angulo, M.; Moreno-Vargas, A. J.; Carmona, A. T.; Ohlson, S.; Robina, I. Chem. Eur. J. 2013, 19, 17989-18003.

Ruvolo, P. P. *Biochim. Biophys Acta*. Molecular cell research (2015) E-pub ahead of print, title: Galectin-3 as a guardian of the tumor microenvironment, published on-line 8 Apr. 2015: (http://www.sciencedirect.com/science/article/pii/S0167488915002700), Salameh, B. A., Leffler, H. and Nilsson, U. J. (2005) *Bioorg. Med. Chem. Lett.* 15: 3344-3346.

Salameh, B. A., Cumpstey, I., Sundin, A., Leffler, H., and Nilsson, U. J. (2010). 1H-1,2,3-Triazol-1-yl thiodigalactoside derivatives as high affinity galectin-3 inhibitors. *Bioorg Med Chem* 18: 5367-5378.

Salomonsson, E., Larumbe, A., Tejler, J., Tullberg, E., Rydberg, H., Sundin, A., Khabut, A., Frejd, T., Lobsanov, Y. D., Rini, J. M., Nilsson, U. J., and Leffler, H (2010). Monovalent interactions of galectin-1. *Biochemistry* 49: 9518-9532.

Sörme, P., Qian, Y., Nyholm, P.-G., Leffler, H., Nilsson, U. J. (2002) Low micromolar inhibitors of galectin-3 based on 3'-derivatization of N-acetyllactosamine *ChemBioChem* 3:183-189.

Sörme, P., Kahl-Knutsson, B., Wellmar, U., Nilsson, U. J., and Leffler H. (2003a) Fluorescence polarization to study galectin-ligand interactions. *Meth. Enzymol.* 362: 504-512.

Sörme, P., Kahl-Knutsson, B., Wellmar, U., Magnusson, B.-G., Leffler H., and Nilsson, U. J. (2003b) Design and synthesis of galectin inhibitors. *Meth. Enzymol.* 363: 157-169.

Sörme, P., Kahl-Knutsson, B., Huflejt, M., Nilsson, U. J., and Leffler H. (2004) Fluorescence polarization as an analytical tool to evaluate galectin-ligand interactions. *Anal. Biochem.* 334: 36-47.

Thijssen V L, Heusschen R, Caers J, Griffioen A W. (2015) Galectin expression in cancer diagnosis and prognosis: A systematic review. Biochim Biophys Acta. 2015 April; 1855(2):235-47.

Toscano, M. A., Bianco, G. A., Ilarregui, J. M., Croci, D. O., Correale, J., Hernandez, J. D., Zwirner, N. W., Poirier, F., Riley, E. M., Baum, L. G., et al. (2007). Differential glycosylation of TH1, TH2 and TH-17 effector cells selectively regulates susceptibility to cell death. *Nat Immunol* 8: 825-834.

Viguier M, Advedissian T, Delacour D, Poirier F, Deshayes F. (2014) Galectins in epithelial functions. Tissue Barriers. 2014 May 6; 2:e29103.

We claim:

1. A compound having formula II

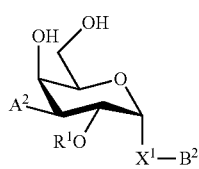

wherein the pyranose ring is a-D-galactopyranose, wherein:

$A^2$ is selected from

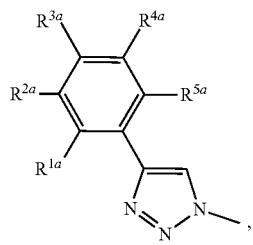

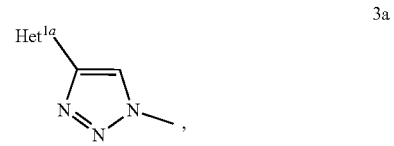

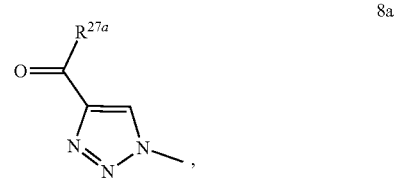

wherein $Het^{1a}$ is selected from a five or six membered heteroaromatic ring, optionally substituted with a group selected from Br; F; Cl; CN; $NR^{19a}R^{20a}$, wherein $R^{19a}$ and $R^{20a}$ are independently selected from H, $C_{1-3}$ alkyl, cyclopropyl, iso-propyl, —C(=O)—$R^{21a}$, wherein $R^{21a}$ is selected from H and $C_{1-3}$ alkyl; $C_{1-3}$ alkyl, optionally substituted with a F; cyclopropyl, optionally substituted with a F; iso-propyl, optionally substituted with a F; O-cyclopropyl optionally substituted with a F; O-isopropyl optionally substituted with a F; and $OC_{1-3}$ alkyl optionally substituted with a F;

wherein $R^{1a}$-$R^{5a}$ are independently selected from H, CN, $NH_2$, Cl, F, methyl optionally substituted with a F, and $OCH_3$ optionally substituted with a F;

wherein $R^{6a}$ is selected from $C_{1-6}$ alkyl optionally substituted with a halogen, branched $C_{3-6}$ alkyl and $C_{3-7}$ cycloalkyl;

$X^1$ is selected from S, SO, $SO_2$, O, C=O, and $CR^{32a}R^{33a}$ wherein $R^{32a}$ and $R^{33a}$ are independently selected from hydrogen, OH, or halogen;

wherein $R^{27a}$ is selected from a $C_{1-6}$ alkyl, branched $C_{3-6}$ alkyl, $C_{1-6}$ alkoxy and branched $C_{3-6}$ alkoxy;

$B^2$ is selected from d) a pyridinyl, optionally substituted with a group selected from a halogen; CN; —COOH; —CONR$^{24a}$R$^{25a}$, wherein $R^{24a}$ and $R^{25a}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; $OC_{1-3}$ alkyl, optionally substituted with a F; O-cyclopropyl, optionally substituted with a F; O-isopropyl, optionally substituted with a F; $NR^{30a}R^{31a}$, wherein $R^{30a}$ and $R^{31a}$ are independently selected from H, $C_{1-3}$ alkyl and isopropyl; OH; and $R^{18a}$—CONH-wherein $R^{18a}$ is selected from $C_{1-3}$ alkyl and cyclopropyl; and $R^1$ is selected from the group consisting of a phosphate, a sulphate and a methyl substituted with a group selected from a phosphate, an oxy phosphonyl, a —$CONHR^2$ wherein $R^2$ is methylsulphonyl; oxazolyl; tetrazolyl; a phenyl substituted with at least one from the group consisting of a halogen and hydroxy; or a pharmaceutically acceptable salt thereof.

2. The compound of claim 1 having formula II

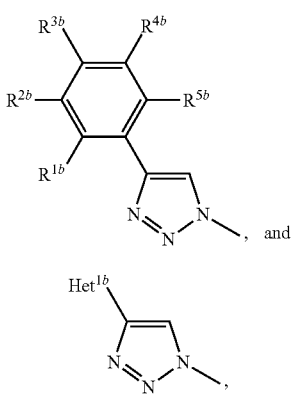

wherein the pyranose ring is α-D-galactopyranose, wherein:

$A^2$ is selected from

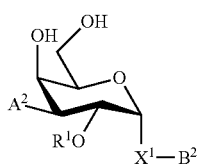, and

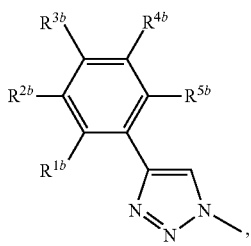

wherein $Het^{1b}$ is selected from a pyridinyl, optionally substituted with a group selected from H, CN, Br, Cl, I, F, methyl optionally substituted with a F, $OCH_3$ optionally substituted with a F, and $SCH_3$ optionally substituted with a F; or a pyrimidyl, optionally substituted with a group selected from H, CN, Br, Cl, I, F, methyl optionally substituted with a F, $OCH_3$ optionally substituted with a F, and $SCH_3$ optionally substituted with a F;

wherein $R^{1b}$-$R^{5b}$ are independently selected from a group consisting of H, CN, Br, Cl, I, F, methyl optionally substituted with a F, $OCH_3$ optionally substituted with a F, and $SCH_3$ optionally substituted with a F;

$X^1$ is selected from S, SO, and $SO_2$;

$B^2$ is selected from d) a pyridinyl, optionally substituted with a group selected from a halogen; CN; —COOH; —$CONR^{24b}R^{25b}$, wherein $R^{24b}$ and $R^{25b}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; $OC_{1-3}$ alkyl, optionally substituted with a F; O-cyclopropyl, optionally substituted with a F; O-isopropyl, optionally substituted with a F; $NR^{30b}R^{31b}$, wherein $R^{30b}$ and $R^{31b}$ are independently selected from H, $C_{1-3}$ alkyl and isopropyl; OH; and $R^{18b}$-CONH-wherein $R^{18b}$ is selected from $C_{1-3}$ alkyl and cyclopropyl; and $R^1$ is as defined previously; or a pharmaceutically acceptable salt thereof.

3. The compound of claim 2, wherein $A^2$ is

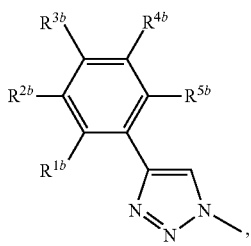

Wherein
$R^{1b}R^{5b}$ are independently selected from a group consisting of H, CN, Br, Cl, I, F, methyl optionally substituted with a F, $OCH_3$ optionally substituted with a F, and $SCH_3$ optionally substituted with a F;

$X^1$ is S;

$B^2$ is selected from; d) a pyridinyl, optionally substituted with a group selected from a halogen; CN; —COOH; —$CONR^{24b}R^{25b}$, wherein $R^{24b}$ and $R^{25b}$ are independently selected from H, $C_{1-3}$ alkyl, cyclopropyl, and iso-propyl; $C_{1-3}$ alkyl, optionally substituted with a F;

cyclopropyl, optionally substituted with a F; isopropyl, optionally substituted with a F;

$OC_{1-3}$ alkyl, optionally substituted with a F; O-cyclopropyl, optionally substituted with a F; O-isopropyl, optionally substituted with a F; $NR^{30b}R^{31b}$, wherein $R^{30b}$ and $R^{31b}$ are independently selected from H, $C_{1-3}$ alkyl and isopropyl; OH; and $R^{18b}$-CONH-wherein $R^{18b}$ is selected from $C_{1-3}$ alkyl and cyclopropyl; and $R^1$ is as defined previously; or a pharmaceutically acceptable salt thereof.

4. The compound of claim 3, wherein $A^2$ is

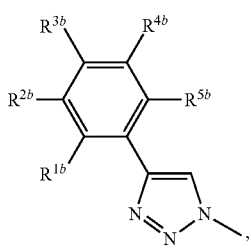

wherein
$R^{1b}$-$R^{5b}$ are independently selected from a group consisting of H, Cl and F;

$X^1$ is S;

$B^2$ is selected from pyridinyl substituted with a halogen;

$R^1$ is as defined previously; or a pharmaceutically acceptable salt thereof.

5. The compound of claim 4,
wherein A² is

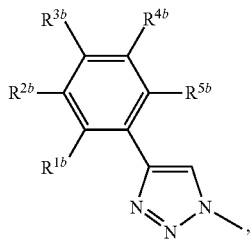
2b wherein
R$^{1b}$ and R$^{5b}$ are hydrogen, and at least one of R$^{2b}$-R$^{4b}$ is independently selected from Cl and F and the rest is hydrogen;
X$^1$ is S;
B² is d) a pyridinyl substituted with a Br;
R$^1$ is as previously defined; or a pharmaceutically acceptable salt thereof.

6. The compound of claim 1 having formula II

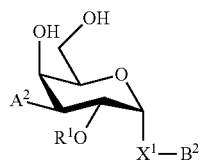

wherein the pyranose ring is α-D-galactopyranose,
A2 is

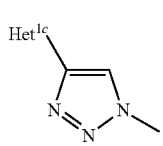
3c wherein Het$^{1c}$ is a five or six membered heteroaromatic ring selected from the group consisting of formulas 2 to 9:

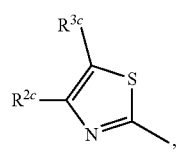
2c

3c

-continued

4c

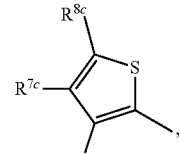

5c

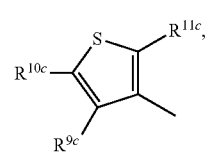

6c

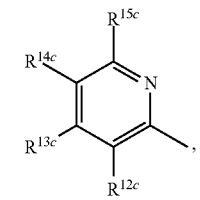

7c

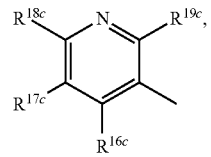

8c, and

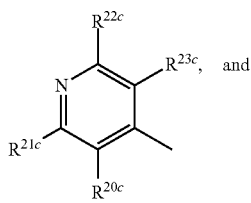

9c

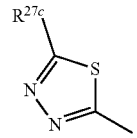

wherein R$^{2c}$ to R$^{23c}$ and R$^{27c}$ are independently selected from H; halogen; OH; CN; SH; S—C$_{1-3}$ alkyl; C$_{1-3}$ alkyl, optionally substituted with a F; cyclopropyl, optionally substituted with a F; iso-propyl, optionally substituted with a F; O-cyclopropyl optionally substituted with a F; O-isopropyl optionally substituted with a F; OC$_{1-3}$ alkyl optionally substituted with a F; NR$^{24c}$R$^{25c}$, wherein R$^{24c}$ is selected from H, and C$_{1-3}$ alkyl, and R$^{25c}$ is selected from H, C$_{1-3}$ alkyl, and COR$^{26c}$, wherein R$^{26c}$ is selected from H, and C$_{1-3}$ alkyl;
X$^1$ is selected from S, SO, SO$_2$;
B² is selected from d) a pyridinyl, optionally substituted with a group selected from a halogen; CN; —COOH; —CONR$^{35c}$R$^{36c}$, wherein R$^{35c}$ and R$^{36c}$ are independently selected from H, C$_{1-3}$ alkyl, cyclopropyl, and iso-propyl; C$_{1-3}$ alkyl, optionally substituted with a F; cyclopropyl, optionally substituted with a F; isopropyl, optionally substituted with a F; OC$_{1-3}$ alkyl, optionally substituted with a F; O-cyclopropyl, optionally substituted with a F; O-isopropyl, optionally substituted with a F; NR$^{37c}$R$^{38c}$, wherein R$^{37c}$ and R$^{38c}$ are independently selected from H, $C_{1-3}$ alkyl and isopropyl; OH; and $R^{39c}$-CONH- wherein $R^{39c}$ is selected from $C_{1-3}$ alkyl and cyclopropyl; and $R^1$ is as defined previously; or a pharmaceutically acceptable salt thereof.

7. The compound of claim 1 having formula II

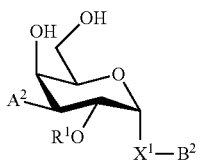

wherein the pyranose ring is α-D-galactopyranose, $A^2$ is

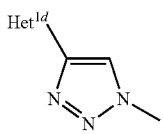 3d wherein the pyranose ring is α-D-galactopyranose, $Het^{1d}$ is selected from the group consisting of

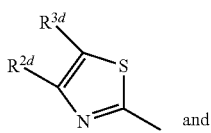 2d and

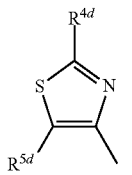 3d wherein $R^{2d}$ is selected from the group consisting of OH and halogen;

$R^{3d}$ is selected from the group consisting of hydrogen, $C_{1-6}$ alkyl and halogen;

$R^{4d}$ is selected from the group consisting of OH and halogen;

$R^{5d}$ is selected from the group consisting of hydrogen, $C_{1-6}$ alkyl and halogen;

$X^1$ is S;

$B^2$ is selected from b) a pyridinyl, optionally substituted with a group selected from a halogen; CN; —COOH; —CONR$^{35d}$R$^{36d}$, wherein R$^{35d}$ and R$^{36d}$ are independently selected from H, $C_{1-3}$ alkyl, cyclopropyl, and iso-propyl; $C_{1-3}$ alkyl, optionally substituted with a F; cyclopropyl, optionally substituted with a F; isopropyl, optionally substituted with a F; OC$_{1-3}$ alkyl, optionally substituted with a F; O-cyclopropyl, optionally substituted with a F; SC$_{1-3}$ alkyl, optionally substituted with a F; O-isopropyl, optionally substituted with a F; NR$^{37d}$R$^{38d}$, wherein R$^{37d}$ and R$^{38d}$ are independently selected from H, $C_{1-3}$ alkyl and isopropyl; OH; and R$^{39d}$-CONH- wherein R$^{39d}$ is selected from $C_{1-3}$ alkyl and cyclopropyl; and $R^1$ is as defined above; or a pharmaceutically acceptable salt thereof.

8. The compound of claim 1, selected from the group consisting of:
5-Bromopyridin-3-yl 3-deoxy-3-[4-(3,4,5-trifluorophenyl)-1H-1,2,3-triazol-1-yl]-2-O-phospho-1-thio-α-D-galactopyranoside,
5-Bromopyridin-3-yl 3-Deoxy-3-[4-(3,4,5-trifluorophenyl)-1H-1,2,3-triazol-1-yl]-2-O-sulfo-1-thio-α-D-galactopyranoside,
5-Bromopyridin-3-yl 3-deoxy-3-[4-(3,4,5-trifluorophenyl)-1H-1,2,3-triazol-1-yl]-2-O-[(phosphonooxy)methyl]-1-thio-α-D-galactopyranoside,
5-Bromopyridin-3-yl 3-Deoxy-3-[4-(3,4,5-trifluorophenyl)-1H-1,2,3-triazol-1-yl]-2-O-(oxazol-4-ylmethyl)-1-thio-α-D-galactopyranoside,
5-Bromopyridin-3-yl 3-Deoxy-3-[4-(3,4,5-difluorophenyl)-1H-1,2,3-triazol-1-yl]-2-O-(3,5-difluoro-4-hydroxybenzyl)-1-thio-α-D-galactopyranoside,
5-Bromopyridin-3-yl 3-Deoxy-3-[4-(3,4,5-trifluorophenyl)-1H-1,2,3-triazol-1-yl]-2-O-[(1H-tetrazol-5-yl)methyl]-1-thio-α-D-galactopyranoside,
5-Bromopyridin-3-yl 3-deoxy-3-[4-(3,4,5-trifluorophenyl)-1H-1,2,3-triazol-1-yl]-2-O-[(1H-imidazol-2-yl)methyl]-1-thio-α-D-galactopyranoside,
5-Bromopyridin-3-yl 3-deoxy-3-[4-(3,4,5-trifluorophenyl)-1H-1,2,3-triazol-1-yl]-2-O-[(1-methyl-1H-imidazol-2-yl) methyl]-1-thio-α-D-galactopyranoside,
5-Bromopyridin-3-yl 3-deoxy-3-[4-(3,4,5-trifluorophenyl)-1H-1,2,3-triazol-1-yl]-2-O-[(oxazol-2-yl)methyl]-1-thio-α-D-galactopyranoside,
5-Bromopyridin-3-yl 3-deoxy-3-[4-(3,4,5-trifluorophenyl)-1H-1,2,3-triazol-1-yl]-2-O-[(oxazol-5-yl)methyl]-1-thio-α-D-galactopyranoside,
5-Bromopyridin-3-yl 3-deoxy-3-[4-(3,4,5-trifluorophenyl)-1H-1,2,3-triazol-1-yl]-2-O-[(isoxazol-3-yl)methyl]-1-thio-α-D-galactopyranoside,
5-Bromopyridin-3-yl 3-deoxy-3-[4-(3,4,5-trifluorophenyl)-1H-1,2,3-triazol-1-yl]-2-O-[(thiazol-4-yl)methyl]-1-thio-α-D-galactopyranoside,
5-Bromopyridin-3-yl 3-deoxy-3-[4-(3,4,5-trifluorophenyl)-1H-1,2,3-triazol-1-yl]-2-O-[(thiazol-5-yl)methyl]-1-thio-α-D-galactopyranoside,
5-Bromopyridin-3-yl 3-deoxy-3-[4-(3,4,5-trifluorophenyl)-1H-1,2,3-triazol-1-yl]-2-O-[(thiazol-2-yl)methyl]-1-thio-α-D-galactopyranoside,
5-Bromopyridin-3-yl 2-O-carboxypropyl-3-deoxy-3-[4-(3,4,5-trifluorophenyl)-1H-1,2,3--[(thiazol-2-yl)methyl]-1-thio-α-D-galactopyranoside;
or a pharmaceutically acceptable salt thereof.

9. The compound of claim 1 for use as a medicine.

10. A pharmaceutical composition comprising the compound of claim 1 and optionally a pharmaceutically acceptable additive.

11. A method for treatment of a disorder relating to the binding of a galectin-3 to a ligand in a mammal, wherein a therapeutically effective amount of at least one compound according to claim 1 is administered to a mammal in need of said treatment; wherein said disorder is selected from the group consisting of inflammation; fibrosis; scarring; keloid formation; aberrant scar formation; surgical adhesions; septic shock; cancer; metastasising cancers; autoimmune diseases; metabolic disorders; heart disease; heart failure; pathological angiogenesis; and eye diseases; atherosclerosis; metabolic diseases; type 2 diabetes; insulin resistens; obesity; Diastolic HF; asthma and other interstitial lung diseases, including Hermansky-Pudlak syndrome, mesothelioma; liver disorders.

12. The method of claim 11 wherein the disorder is selected from pulmonary fibrosis, liver fibrosis, kidney fibrosis, ophthalmological fibrosis and fibrosis of the skin and heart, carcinomas, sarcomas, leukemias, lymphomas, T-cell lymphomas, psoriasis, rheumatoid arthritis, Crohn's disease, ulcerative colitis, ankylosing spondylitis, systemic lupus erythematosus, ocular angiogenesis or a disease or condition associated with ocular angiogenesis, neovascularization related to cancer, age-related macular degeneration and corneal neovascularization, diabetes, and non-alcoholic steatohepatitis.

* * * * *